(12) United States Patent
Kawano

(10) Patent No.: US 12,283,887 B2
(45) Date of Patent: Apr. 22, 2025

(54) CONTROLLER CIRCUIT AND CONTROL METHOD FOR RESONANT SWITCHED CAPACITOR CONVERTER

(71) Applicant: ROHM CO., LTD., Kyoto (JP)

(72) Inventor: Akihiro Kawano, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 197 days.

(21) Appl. No.: 17/865,518

(22) Filed: Jul. 15, 2022

(65) Prior Publication Data
US 2023/0024198 A1 Jan. 26, 2023

(30) Foreign Application Priority Data

| Jul. 15, 2021 | (JP) | 2021-117340 |
| Jul. 15, 2021 | (JP) | 2021-117341 |
| Jul. 15, 2021 | (JP) | 2021-117342 |
| Jul. 20, 2021 | (JP) | 2021-119892 |
| Jul. 28, 2021 | (JP) | 2021-123648 |

(51) Int. Cl.
| H02M 3/157 | (2006.01) |
| H02M 1/00 | (2006.01) |
| H02M 3/07 | (2006.01) |
| H02M 3/158 | (2006.01) |

(52) U.S. Cl.
CPC .......... *H02M 3/158* (2013.01); *H02M 1/0058* (2021.05); *H02M 3/07* (2013.01)

(58) Field of Classification Search
CPC ...... H02M 3/158; H02M 3/157; H02M 3/155; H02M 1/0058; H02M 3/07
See application file for complete search history.

(56) References Cited

U.S. PATENT DOCUMENTS

| 9,917,517 B1 | 3/2018 | Jiang et al. | |
| 2019/0334434 A1* | 10/2019 | Jong | H02M 3/158 |
| 2020/0119635 A1* | 4/2020 | Rahimi | H02M 1/08 |
| 2020/0313550 A1* | 10/2020 | Chen | H02M 3/07 |
| 2021/0203222 A1* | 7/2021 | Ilic | H02M 7/537 |
| 2023/0216399 A1* | 7/2023 | Wijekoon | H02M 7/4833 323/271 |

FOREIGN PATENT DOCUMENTS

| JP | 2017229140 A | 12/2017 |
| WO | 2021024255 A1 | 2/2021 |
| WO | 2021024362 A1 | 2/2021 |
| WO | 2021113351 A1 | 6/2021 |

OTHER PUBLICATIONS

JPO Notification of Reasons for Refusal for corresponding JP Application No. 2021-117340; dated Mar. 11, 2025.
JPO Notification of Reasons for Refusal for corresponding JP Application No. 2021-117342; dated Mar. 11, 2025.
JPO Notification of Reasons for Refusal for corresponding JP Application No. 2021-119892; dated Mar. 11, 2025.

* cited by examiner

*Primary Examiner* — Adolf D Berhane
(74) *Attorney, Agent, or Firm* — CANTOR COLBURN LLP

(57) ABSTRACT

A controller IC for a resonant switched capacitor converter includes a drive circuit and a frequency controller. The frequency controller controls a switching frequency based on an output voltage of the resonant switched capacitor converter.

5 Claims, 63 Drawing Sheets

CONTROLLER CIRCUIT AND CONTROL METHOD FOR RESONANT SWITCHED CAPACITOR CONVERTER

CROSS REFERENCES TO RELATED APPLICATIONS

The present invention claims priority under 35 U.S.C. § 119 to Japanese Application No. 2021-123648, filed on Jul. 28, 2021; Japanese Application No. 2021-117340, filed on Jul. 15, 2021; Japanese Application No. 2021-119892, filed on Jul. 20, 2022; Japanese Application No. 2021-117341, filed on Jul. 15, 2021; and, Japanese Application No. 2021-117342, filed on Jul. 15, 2021; all of which entire contents are incorporated herein by reference.

BACKGROUND

1. Technical Field

The present disclosure relates to a resonant switched capacitor converter.

2. Description of the Related Art

A DC/DC converter or a charge pump is used to generate a voltage higher or lower than the power supply voltage. A DC/DC converter using an inductor as an element for storing energy has a problem that an output voltage can be controlled by the inductor, but efficiency is reduced by a switching operation.

In applications where high efficiency is required, switched capacitor converters (charge pumps) that do not require an inductor as an energy storage element are used. As one of the switched capacitor converters, there is known a switched capacitor converter in which a resonant inductor is added in series with a flying capacitor to perform a resonant operation (referred to as a resonant switched capacitor converter). According to the resonant switched capacitor converter, zero current switching (soft switching) can be realized, so that a highly efficient operation can be realized.

As one form of the resonant switched capacitor converter, a configuration in which an inductor is added to a Dixon-type charge pump (switched tank converter) is also known.

The resonant frequency of the resonant switched capacitor converter varies depending on manufacturing variations of the inductor and the capacitor and operating conditions such as voltage and temperature. When the switching frequency of the resonant switched capacitor converter is lower than the resonant frequency, hard switching occurs and efficiency is reduced.

SUMMARY

The present disclosure has been made in such a situation.
1. An embodiment of the present disclosure relates to a controller circuit for a resonant switched capacitor converter. The controller circuit includes a frequency controller that controls a switching frequency based on an output voltage of a resonant switched capacitor converter.

Another embodiment of the present disclosure is a method for controlling a resonant switched capacitor converter, the method including: detecting an output voltage of the resonant switched capacitor converter; and changing a switching frequency based on the output voltage.

2. An embodiment of the present disclosure relates to a controller circuit for a resonant switched capacitor converter. The resonant switched capacitor converter includes a first switch and a second switch connected in series between an input line and an output line, a third switch and a fourth switch connected in series between the output line and a ground line, and a capacitor and an inductor connected in series across the second switch and the third switch. In a first mode, the controller circuit sequentially repeats a first state in which the first switch and the third switch are turned on and the second switch and the fourth switch are turned off, a second state in which the second switch and the fourth switch are turned on and the first switch and the third switch are turned off, and a third state in which the first switch, the second switch, the third switch, and the fourth switch are turned off.

3. An embodiment of the present disclosure relates to a controller circuit for a resonant switched capacitor converter. The controller circuit includes an oscillator that generates a clock signal, a drive circuit that drives a plurality of switches constituting a switch circuit of a resonant switched capacitor converter according to the clock signal, and an overcurrent protection circuit that changes a frequency of the clock signal in a direction away from a resonant frequency when an overcurrent state of the resonant switched capacitor converter is detected.

Another embodiment of the present disclosure is a method for controlling a resonant switched capacitor converter, the method including: detecting an output current of the resonant switched capacitor converter; and changing a switching frequency of the resonant switched capacitor converter in a direction away from a resonant frequency when the output current exceeds a predetermined threshold.

4. An embodiment of the present disclosure relates to a controller circuit of a three-level converter. The three-level converter includes a first switch, a second switch, a third switch, and a fourth switch connected in series between an input line and a ground line, a capacitor connected across the second switch and the third switch, and an inductor connected between a connection node of the second switch and the third switch and an output line. The controller circuit can switch between a first state in which the first switch and the second switch are turned on, a second state in which the first switch and the third switch are turned on, a third state in which the third switch and the fourth switch are turned on, and a fourth state in which the second switch and the fourth switch are turned on, and repeats the first state, the second state, the third state, the first state, the fourth state, and the third state in this order.

5. An embodiment of the present disclosure relates to a controller circuit of a switched capacitor converter. The switched capacitor converter includes: an input line; an output line; a ground line; m (m≥3) switches connected in series between the input line and the output line; n (n≥2) LC circuits, each of the LC circuits including a capacitor and an inductor connected in series, a first end of each of the LC circuits being connected to an odd-numbered corresponding one of connection nodes of the m switches; k (k≥1, k+n=m−1) capacitors, a first end of each of the k capacitors being connected to an even-numbered corresponding one of connection nodes of the m switches; a first switching circuit that applies an output voltage of the output line or a ground voltage of the ground line to a second end of each of the k capacitors; and a second switching circuit that applies an output voltage or a ground voltage of a ground line to a second end of each of the n LC circuits. The controller circuit includes: a first drive unit that alternately switches between (i) a state in which an odd-numbered switch among the m switches is turned on, an even-numbered switch is turned off, and the first switching circuit applies a ground voltage, and (ii) a state in which an odd-numbered switch among the m switches is turned off, an even-numbered switch is turned on, and the first switching circuit applies an output voltage, according to a first clock; a second drive unit that alternately switches between a state in which the second switching circuit applies the output voltage and a state in which the second switching circuit applies the ground voltage, according to a second clock; and a phase difference controller that controls a phase difference between the first clock and the second clock.

Another embodiment of the present disclosure relates to a switched capacitor converter. The switched capacitor converter includes: an input line; an output line; a ground line; a first transistor, a second transistor, a third transistor, and a fourth transistor connected in series between the input line and the output line; a first capacitor and a first inductor connected in series between a connection node of the first transistor and the second transistor and a first switching node; a second capacitor connected between a connection node of the second transistor and the third transistor and a second switching node; a third capacitor and a second inductor connected in series between a connection node of the third transistor and the fourth transistor and a third switching node; a fifth transistor connected between the output line and the first switching node; a sixth transistor connected between the first switching node and the ground line; a seventh transistor connected between the output line and the second switching node; an eighth transistor connected between the second switching node and the ground line; a ninth transistor connected between the output line and the third switching node; and a tenth transistor connected between the third switching node and the ground line; and a first drive unit that switches a set of the first transistor and the third transistor and a set of the second transistor and the fourth transistor in opposite phases; a second drive unit that switches a set of the fifth transistor, the seventh transistor, and the ninth transistor and a set of the sixth transistor, the eighth transistor, and the tenth transistor in opposite phases; and a phase difference controller that controls a phase difference between the switchings of the first drive unit and the second drive unit Still another embodiment of the present disclosure relates to a method for controlling a switched capacitor converter. The switched capacitor converter includes: an input line; an output line; a ground line; m (m≥3) switches connected in series between the input line and the output line; n (n≥2) LC circuits, each of the LC circuits including a capacitor and an inductor connected in series, a first end of each of the LC circuits being connected to an odd-numbered corresponding one of connection nodes of the m switches; k (k≥1, k+n=m−1) capacitors, a first end of each of the k capacitors being connected to an even-numbered corresponding one of connection nodes of the m switches; a first switching circuit that applies an output voltage of the output line or a ground voltage of the ground line to a second end of each of the k capacitors; and a second switching circuit that applies an output voltage or a ground voltage of a ground line to a second end of each of the n LC circuits. The control method includes: alternately switching between (i) a state in which an odd-numbered switch among the m switches is turned on, an even-numbered switch is turned off, and the first switching circuit applies a ground voltage, and (ii) a state in which an odd-numbered switch among the m switches is turned off, an even-numbered switch is turned on, and the first switching circuit applies an output voltage, according to a first clock; alternately switching between a state in which the second switching circuit applies the output voltage and a state in which the second switching circuit applies the ground voltage, according to a second clock; and controlling a phase difference between the first clock and the second clock.

It is to be noted that any arbitrary combination or rearrangement of the above-described structural components and so forth is effective as and encompassed by the present embodiments. Moreover, all of the features described in this summary are not necessarily required by embodiments so that the embodiment may also be a sub-combination of these described features. In addition, embodiments may have other features not described above.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Overview of Embodiment

Figure 1:
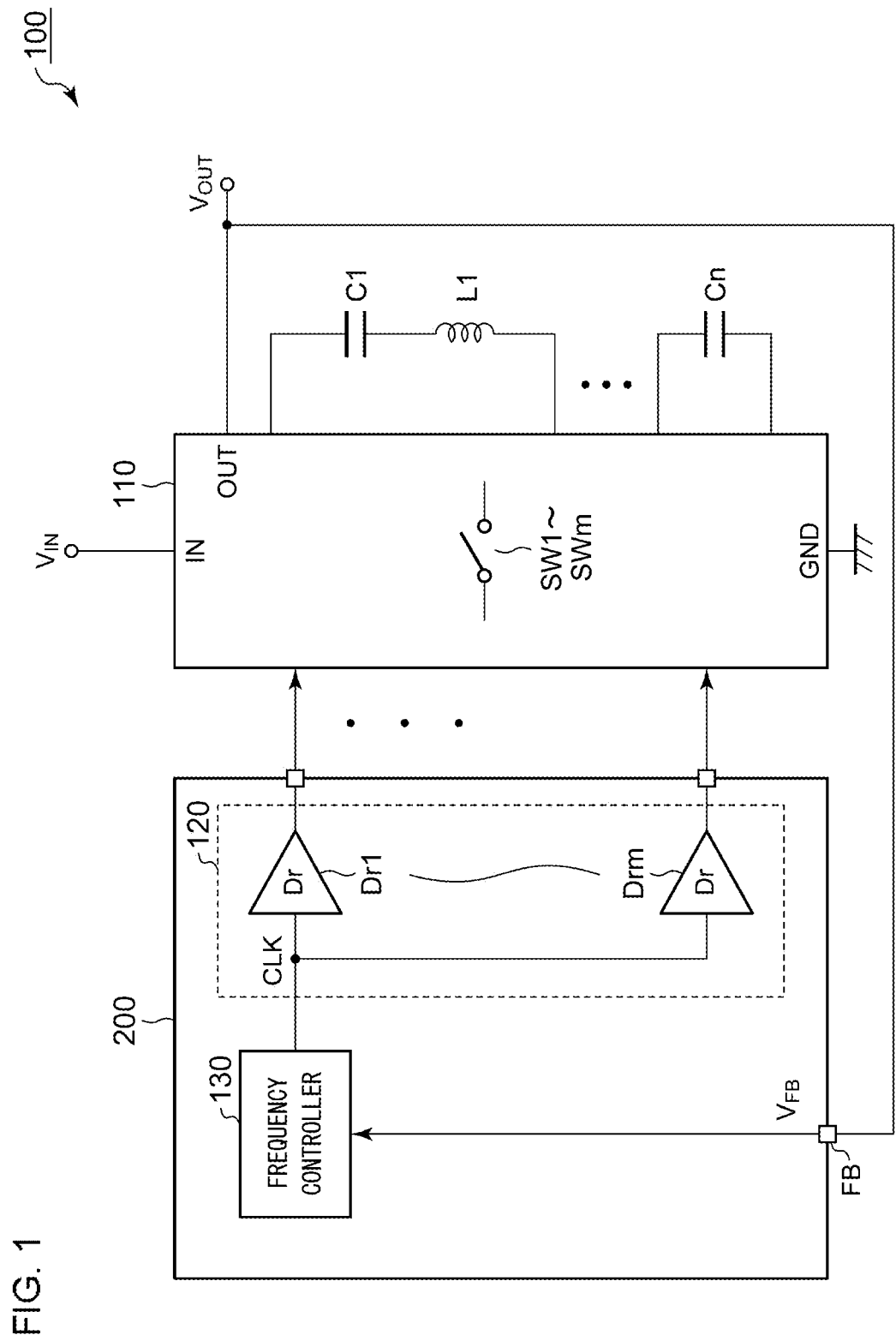
FIG. 1 is a circuit diagram of a resonant switched capacitor converter according to Embodiment 1.

An overview of some example embodiments of the present disclosure will be described. This overview describes some concepts of one or more embodiments in a simplified manner for the purpose of basic understanding of the embodiments as a prelude to the detailed description that follows and does not limit the breadth of the invention or disclosure. This overview is not a comprehensive overview of all possible embodiments and is not intended to identify key elements of all embodiments or delineate the scope of some or all aspects. For convenience, "one embodiment" may be used to refer to one embodiment (example or modification) or a plurality of embodiments (examples or modifications) disclosed in the present specification.

1. A controller circuit for a resonant switched capacitor converter according to one embodiment includes a frequency controller that controls a switching frequency based on an output voltage of the resonant switched capacitor converter.

According to this configuration, by optimizing the switching frequency according to the output voltage of the resonant switched capacitor converter, even when the resonant frequency fluctuates, the resonant switched capacitor converter can be caused to perform a soft switching operation, and the efficiency can be improved.

In one embodiment, the frequency controller may control the switching frequency such that the output voltage of the resonant switched capacitor converter approaches a maximum value. As a result, zero current switching (ZCS) can be realized.

In one embodiment, the frequency controller may change the switching frequency in a first direction in a next frequency control cycle when the output voltage of the resonant switched capacitor converter increases as a result of changing the switching frequency in the first direction and may change the switching frequency in a second direction opposite to the first direction in a next frequency control cycle when the output voltage of the resonant switched capacitor converter decreases.

In one embodiment, the frequency controller may change the switching frequency in a region where the switching frequency is higher than the resonant frequency of the resonant switched capacitor converter. In this case, efficiency can be improved by zero voltage switching (ZVS).

In one embodiment, the frequency controller may change the switching frequency such that the output voltage of the resonant switched capacitor converter approaches a target voltage. As a result, the output voltage can be set to an arbitrary voltage level.

In one embodiment, the controller circuit may be integrally integrated on one semiconductor substrate. The term "integrally integrated" includes a case where all components of a circuit are formed on a semiconductor substrate and a case where main components of the circuit are integrally integrated, and some resistors, capacitors, and the like may be provided outside the semiconductor substrate for adjustment of circuit constants. By integrating the circuits on one chip, the circuit area can be reduced, and the characteristics of the circuit elements can be kept uniform.

2. A controller circuit according to one embodiment controls a resonant switched capacitor converter. The resonant switched capacitor converter includes a first switch and a second switch connected in series between an input line and an output line, a third switch and a fourth switch connected in series between the output line and a ground line, and a capacitor and an inductor connected in series across the second switch and the third switch. In a first mode, the controller circuit sequentially repeats a first state in which the first switch and the third switch are turned on and the second switch and the fourth switch are turned off, a second state in which the second switch and the fourth switch are turned on and the first switch and the third switch are turned off, and a third state in which the first switch, the second switch, the third switch, and the fourth switch are turned off.

According to this configuration, by operating the controller circuit in the first mode in the light load state, zero voltage switching can be maintained, and efficiency can be improved.

In one embodiment, in the second mode, the controller circuit sequentially repeats a state in which the first switch and the fourth switch are turned on and the second switch and the third switch are turned off, a state in which the first switch and the third switch are turned on and the second switch and the fourth switch are turned off, a state in which the second switch and the third switch are turned on and the first switch and the fourth switch are turned off, and a state in which the second switch and the fourth switch are turned on and the first switch and the third switch are turned off.

In one embodiment, the controller circuit may switch between the first mode and the second mode according to the state of a load.

In one embodiment, the controller circuit may transition to the first mode when the output electric current of the resonant switched capacitor converter is zero.

In one embodiment, during operation in the first mode, the controller circuit may transition to the first state when the output voltage of the resonant switched capacitor converter drops to a threshold voltage in the third state.

In one embodiment, during operation in the first mode, the length of the first state may be fixed.

In one embodiment, during operation in the first mode, when the current of the inductor goes to zero in the second state, it may transition to the third state.

In one embodiment, the controller circuit may be integrally integrated on one semiconductor substrate. The term "integrally integrated" includes a case where all components of a circuit are formed on a semiconductor substrate and a case where main components of the circuit are integrally integrated, and some resistors, capacitors, and the like may be provided outside the semiconductor substrate for adjustment of circuit constants. By integrating the circuits on one chip, the circuit area can be reduced, and the characteristics of the circuit elements can be kept uniform.

3. A controller circuit for a resonant switched capacitor converter according to one embodiment includes: an oscillator that generates a clock signal; a drive circuit that drives a plurality of switches constituting a switch circuit of the resonant switched capacitor converter according to a clock signal; and an overcurrent protection circuit that changes a frequency of the clock signal in a direction away from a resonant frequency when an overcurrent state of the resonant switched capacitor converter is detected.

According to this configuration, by changing the switching frequency away from the resonant frequency, the gain of the resonant switched capacitor converter can be reduced, the output voltage can be reduced, and the output current can be reduced.

In one embodiment, the controller circuit may further include a frequency controller that, in the steady state, controls an oscillation frequency of the oscillator according to the output voltage of the resonant switched capacitor converter.

According to this configuration, by optimizing the switching frequency according to the output voltage of the resonant switched capacitor converter, even when the resonant frequency fluctuates, the resonant switched capacitor converter can be caused to perform a soft switching operation, and the efficiency can be improved. In addition, in the overcurrent state, the frequency control by the frequency controller can be disabled to move the switching frequency away from the resonant frequency.

In one embodiment, the frequency controller may control the oscillation frequency of the oscillator such that, in the steady state, the output voltage of the resonant switched capacitor converter approaches a maximum value. As a result, zero current switching (ZCS) can be realized.

In one embodiment, the frequency controller may change the oscillation frequency of the oscillator in a first direction in a next frequency control cycle when the output voltage of the resonant switched capacitor converter increases as a result of changing the oscillation frequency of the oscillator in the first direction, and may change the oscillation frequency of the oscillator in a second direction opposite to the first direction in a next frequency control cycle when the output voltage of the resonant switched capacitor converter decreases.

In one embodiment, the frequency controller may change the oscillation frequency of the oscillator in a region where the oscillation frequency of the oscillator is higher than the resonant frequency of the resonant switched capacitor converter in the steady state. In this case, efficiency can be improved by zero voltage switching (ZVS).

In one embodiment, the frequency controller may change the oscillation frequency of the oscillator such that, in the steady state, the output voltage of the resonant switched capacitor converter approaches a target voltage. As a result, the output voltage can be set to an arbitrary voltage level.

In one embodiment, the controller circuit may be integrally integrated on one semiconductor substrate. The term "integrally integrated" includes a case where all components of a circuit are formed on a semiconductor substrate and a case where main components of the circuit are integrally integrated, and some resistors, capacitors, and the like may be provided outside the semiconductor substrate for adjustment of circuit constants. By integrating the circuits on one chip, the circuit area can be reduced, and the characteristics of the circuit elements can be kept uniform.

4. A controller circuit according to one embodiment controls a three-level converter. The three-level converter to be controlled includes: a first switch, a second switch, a third switch, and a fourth switch connected in series between an input line and a ground line; a capacitor connected across the second switch and the third switch; and an inductor connected between a connection node of the second switch and the third switch and an output line. The controller circuit can switch between a first state in which the first switch and the second switch are turned on, a second state in which the first switch and the third switch are turned on, a third state in which the third switch and the fourth switch are turned on, and a fourth state in which the second switch and the fourth switch are turned on, and repeats the first state, the second state, the third state, the first state, the fourth state, and the third state in this order.

With this control sequence, zero voltage switching can be realized and efficiency can be improved.

In one embodiment, the time of the first state and the time of the third state may be equal, and the time of the second state and the time of the fourth state may be equal. This simplifies the control and simplifies the configuration of the controller circuit.

In one embodiment, the controller circuit may be capable of controlling the time of the first state and the time of the third state according to the state of a load. By controlling the lengths of the first state and the third state, the average value of the coil current flowing through the inductor can be controlled.

In one embodiment, the controller circuit may include a feedback controller that feedback-controls at least the lengths of the first state and the third state so as to reduce an error between the output voltage generated in the output line and a target level. As a result, the output voltage can be stabilized at the target level.

In one embodiment, the feedback controller may include: an error amplifier that amplifies an error between the output voltage generated in the output line and the target level; a pulse modulator that generates a pulse signal according to the output of the error amplifier; and a state control unit that switches from the first state to the fourth state according to the pulse signal.

In one embodiment, the controller circuit may be integrally integrated on one semiconductor substrate. The term "integrally integrated" includes a case where all components of a circuit are formed on a semiconductor substrate and a case where main components of the circuit are integrally integrated, and some resistors, capacitors, and the like may be provided outside the semiconductor substrate for adjustment of circuit constants. By integrating the circuits on one chip, the circuit area can be reduced, and the characteristics of the circuit elements can be kept uniform.

5. A controller circuit according to one embodiment controls a switched capacitor converter. The switched capacitor converter to be controlled includes: an input line; an output line; a ground line; m (m≥3) switches connected in series between the input line and the output line; n (n≥2) LC circuits, each of which includes a capacitor and an inductor connected in series, a first end of each of which is connected to an odd-numbered corresponding one of connection nodes of the m switches; k (k≥1, k+n=m−1) capacitors, a first end of each of which is connected to an even-numbered corresponding one of connection nodes of the m switches; a first switching circuit that applies an output voltage of the output line or a ground voltage of the ground line to a second end of each of the k capacitors; and a second switching circuit that applies the output voltage or the ground voltage of the ground line to a second end of each of the n LC circuits. The controller circuit includes: a first drive unit that alternately switches between (i) a state in which an odd-numbered switch among the m switches is turned on, an even-numbered switch is turned off, and the first switching circuit applies a ground voltage, and (ii) a state in which an odd-numbered switch among the m switches is turned off, an even-numbered switch is turned on, and the first switching circuit applies an output voltage, according to a first clock; a second drive unit that alternately switches between a state in which the second switching circuit applies the output voltage and a state in which the second switching circuit applies the ground voltage, according to a second clock; and a phase difference controller that controls a phase difference between the first clock and the second clock.

According to this configuration, not the resonant condition but the condition of zero voltage switching (ZVS) is satisfied, so that high efficiency can be achieved.

In one embodiment, the phase difference controller may feedback-control the phase difference such that an error between a feedback signal and a reference signal according to the output of the switched capacitor converter approaches zero. As a result, when the input voltage or the load fluctuates, the output of the switched capacitor converter can be maintained in a target state. The output may be an output voltage, an output current, or another state.

In one embodiment, the phase difference controller may include: a pulse width modulator that generates a pulse width modulation signal whose pulse width changes so that an error between the feedback signal corresponding to the output of the switched capacitor converter and the reference signal approaches zero; and a phase shift logic circuit that generates a first clock and a second clock having a phase difference corresponding to the pulse width of the pulse width modulation signal.

In one embodiment, M may be 4. In this case, an output voltage that is ¼ times the input voltage $V_{IN}$ can be generated.

In one embodiment, the first switching circuit may include k first inverter circuits. Each of the k first inverter circuits may include: an output node connected to a corresponding second end of the k capacitors; a high-side transistor connected between the output node and the output line; and a low-side transistor connected between the output node and the ground line.

In one embodiment, the second switching circuit may include n second inverter circuits. Each of the n second inverter circuits may include: an output node connected to the corresponding second end of the n LC circuits; a high-side transistor connected between the output node and the output line; and a low-side transistor connected between the output node and the ground line.

In one embodiment, the m switches may be N-channel MOSFETs (Metal Oxide Semiconductor Field Effect Transistor).

In one embodiment, the controller circuit may be integrally integrated on one semiconductor substrate. The term "integrally integrated" includes a case where all components of a circuit are formed on a semiconductor substrate and a case where main components of the circuit are integrally integrated, and some resistors, capacitors, and the like may be provided outside the semiconductor substrate for adjustment of circuit constants. By integrating the circuits on one chip, the circuit area can be reduced, and the characteristics of the circuit elements can be kept uniform.

A switched capacitor converter according to one embodiment includes: an input line; an output line; a ground line; a first transistor, a second transistor, a third transistor, and a fourth transistor connected in series between the input line and the output line; a first capacitor and a first inductor connected in series between a connection node of the first transistor and the second transistor and a first switching node; a second capacitor connected between a connection node of the second transistor and the third transistor and a second switching node; a third capacitor and a second inductor connected in series between a connection node of the third transistor and the fourth transistor and a third switching node; a fifth transistor connected between the output line and the first switching node; a sixth transistor connected between the first switching node and the ground line; a seventh transistor connected between the output line and the second switching node; an eighth transistor connected between the second switching node and the ground line; a ninth transistor connected between the output line and the third switching node; a tenth transistor connected between the third switching node and the ground line; a first drive unit that switches a set of the first transistor and the third transistor and a set of the second transistor and the fourth transistor in opposite phases; a second drive unit that switches a set of the fifth transistor, the seventh transistor, and the ninth transistor and a set of the sixth transistor, the eighth transistor, and the tenth transistor in opposite phases; and a phase difference controller that controls a phase difference between the switchings of the first drive unit and the second drive unit.

According to this configuration, not the resonant condition but the condition of zero voltage switching (ZVS) is satisfied, so that high efficiency can be achieved.

In one embodiment, the phase difference controller may feedback-control the phase difference such that an error between an output of the switched capacitor converter and a target state of the output approaches zero.

In one embodiment, the phase difference controller may include a pulse width modulator that generates a pulse width modulation signal whose pulse width changes such that an error between the output of the switched capacitor converter and a target state of the output approaches zero and may control the phase difference according to the pulse width of the pulse width modulation signal.

EMBODIMENT

Hereinafter, the present disclosure will be described with reference to the drawings based on some preferred embodiments. For each embodiment, the same or equivalent components, members, and processes illustrated in the drawings are denoted by the same reference numerals, and redundant description is omitted as appropriate. In addition, the embodiment is not intended to limit the invention but is an example, and all features described in the embodiment and combinations thereof are not necessarily essential to the invention.

In the present specification, "a state in which a member A is connected to a member B" includes not only a case where the member A and the member B are physically and directly connected to each other, but also a case where the member A and the member B are indirectly connected to each other via another member which does not substantially affect an electrical connection state between the member A and the member B or which does not impair a function or an effect exhibited by the connection between the member A and the member B.

Similarly, "a state in which a member C is provided between the member A and the member B" includes not only a case where the member A and the member C, or the member B and the member C are directly connected to each other, but also a case where the members are indirectly connected to each other via another member which does not substantially affect an electrical connection state between the members or which does not impair a function or an effect exhibited by the connection between the members.

In addition, "signal A (voltage, current) corresponds to signal B (voltage, current) means that the signal A has a correlation with the signal B. Specifically, it means (i) the signal A is the signal B, (ii) the signal A is proportional to the signal B, (iii) the signal A is obtained by level-shifting the signal B, (iv) the signal A is obtained by amplifying the signal B, (v) the signal A is obtained by inverting the signal B, or (vi) any combination thereof. It is understood by a person skilled in the art that the range of "corresponding to" is determined by the types and applications of the signals A and B.

The vertical axis and the horizontal axis of the waveform diagram and the time chart referred to in the present specification are appropriately enlarged and reduced for easy understanding, and each waveform shown is simplified or exaggerated or emphasized for easy understanding.

Embodiment 1

FIG. 1 is a circuit diagram of a resonant switched capacitor converter 100 according to Embodiment 1. The resonant switched capacitor converter 100 includes at least one of capacitors C1 to Cn, an inductor L, a switch circuit 110, a drive circuit 120 that drives the switch circuit 110, and a frequency controller 130. Among them, at least the drive circuit 120 and the frequency controller 130 are integrated in one semiconductor chip (hereinafter, a controller integrated circuit (IC)) 200. The switch circuit 110 may be integrated in the controller IC 200.

The topology of the resonant switched capacitor converter 100 is not particularly limited, and the gain, that is, the voltage division ratio or the step-up ratio of the resonant switched capacitor converter 100 is also not particularly limited.

The inductor L1 is connected in series with one (flying capacitor) of the capacitors C1 to Cn to form an LC resonant circuit. A plurality of inductors may be provided corresponding to the plurality of flying capacitors.

The switch circuit 110 includes an input node IN, an output node OUT, a ground node GND, and a plurality of switches SW. An input voltage $V_{IN}$ of the resonant switched capacitor converter 100 is supplied to the input node IN, and an output voltage $V_{OUT}$ of the resonant switched capacitor converter 100 is generated in the output node OUT. The ground node GND is grounded.

The drive circuit 120 includes drivers Dr1 to Drm that drive the plurality of switches SW1 to SWm constituting the switch circuit 110.

A feedback voltage $V_{FB}$ corresponding to the output voltage $V_{OUT}$ is fed back to the feedback pin FB of the controller IC 200. The feedback voltage $V_{FB}$ may be the output voltage $V_{OUT}$ or a voltage obtained by dividing the output voltage $V_{OUT}$.

The feedback voltage $V_{FB}$ is input to the frequency controller 130. The frequency controller 130 controls the switching frequency of the switch circuit 110 based on the feedback voltage $V_{FB}$, that is, based on the output voltage $V_{OUT}$. For example, the frequency controller 130 includes a frequency-controllable oscillator, and the oscillation frequency of the oscillator is controlled according to the feedback voltage $V_{FB}$. The drive circuit 120 is controlled by the clock CLK based on the output of the oscillator.

The controller IC 200 and the resonant switched capacitor converter 100 are configured as described above. Next, the operation will be described.

Figure 2:
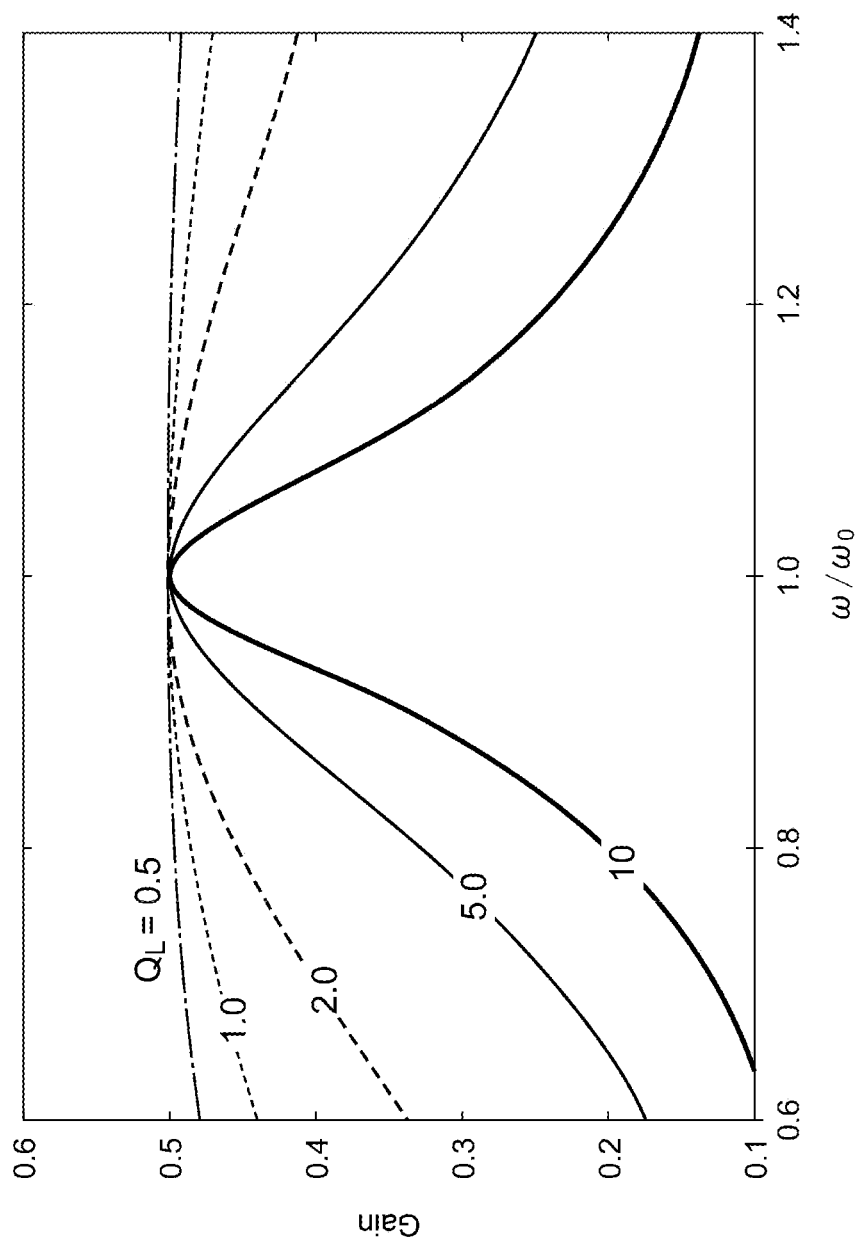
FIG. 2 is a diagram illustrating a relationship between a gain and a switching frequency ω of the resonant switched capacitor converter.

FIG. 2 is a diagram illustrating a relationship between a gain and a switching frequency co of the resonant switched capacitor converter 100. Here, a switched capacitor converter having the gain of ½ times will be described as an example. A characteristic of the switched capacitor converter is expressed by the following equation.

$$G = \frac{V_{out}}{V_{in}} = \frac{1}{\sqrt{4 + Q_L^2 \left(\frac{\omega}{\omega_0} - \frac{\omega_0}{\omega}\right)^2}}$$

$$Q_L = \frac{\omega_0 L_r}{R} = \frac{1}{\omega_0 C_r R} = \frac{Z_0}{R}$$

$$\omega_0 = 2\pi f_r = \frac{1}{\sqrt{L_r C_r}}$$

$$Z_0 = \omega_0 L_r = \frac{1}{\omega_0 C_r} = \sqrt{\frac{L_r}{C_r}}$$

$\omega_0$ is a resonant frequency, and when the switching frequency $\omega$ coincides with the resonant frequency $\omega_0$, the gain G becomes a maximum value of ½, and decreases as deviating therefrom. In particular, when the switching frequency $\omega$ becomes lower than the resonant frequency $\omega_0$, hard switching occurs, and a decrease in efficiency becomes a problem. R represents the impedance of the load of the resonant switched capacitor converter 100. $Q_L$ is a Q value of the circuit, and $Z_0$ is a characteristic impedance.

When a heavy load is applied (when R decreases), the Q value increases, and the gain drop when the switching frequency $\omega$ deviates from the resonant frequency $\omega_0$ increases.

Since the resonant frequency $\omega_0$ is determined according to the capacitance C of the flying capacitor and the inductance L of the inductor in series with the capacitance C, the resonant frequency $\omega_0$ shifts when the circuit constant fluctuates. Therefore, in the configuration in which the switch circuit 110 is operated based on the clock CLK generated by the oscillator oscillating at the same frequency as the design value of the resonant frequency $\omega_0$, when the resonant frequency $\omega_0$ deviates from the design value, the expected output voltage $V_{OUT}$ cannot be obtained, and the efficiency also decreases.

According to the controller IC 200 of FIG. 1, while monitoring the output voltage $V_{OUT}$, the switching frequency $\omega$ can be adjusted such that the expected output voltage $V_{OUT}$ is obtained or the operation is performed with high efficiency, and thus the efficiency can be improved. In particular, since the hard switching operation is performed in the region of $\omega<\omega_0$ and the efficiency is lowered, the controller IC 200 preferably operates the resonant switched capacitor converter 100 in the region of $\omega \geq \omega_0$, so that the efficiency can be improved.

The present disclosure extends to various devices and methods understood as the block diagram or the circuit diagram of FIG. 1 or derived from the above-described description, and is not limited to a specific configuration. Hereinafter, more specific configuration examples and examples will be described in order not to narrow the scope of the present disclosure but to help understanding of the essence and operation of the present disclosure and the present invention and to clarify them.

Example 1.1

Figure 3:
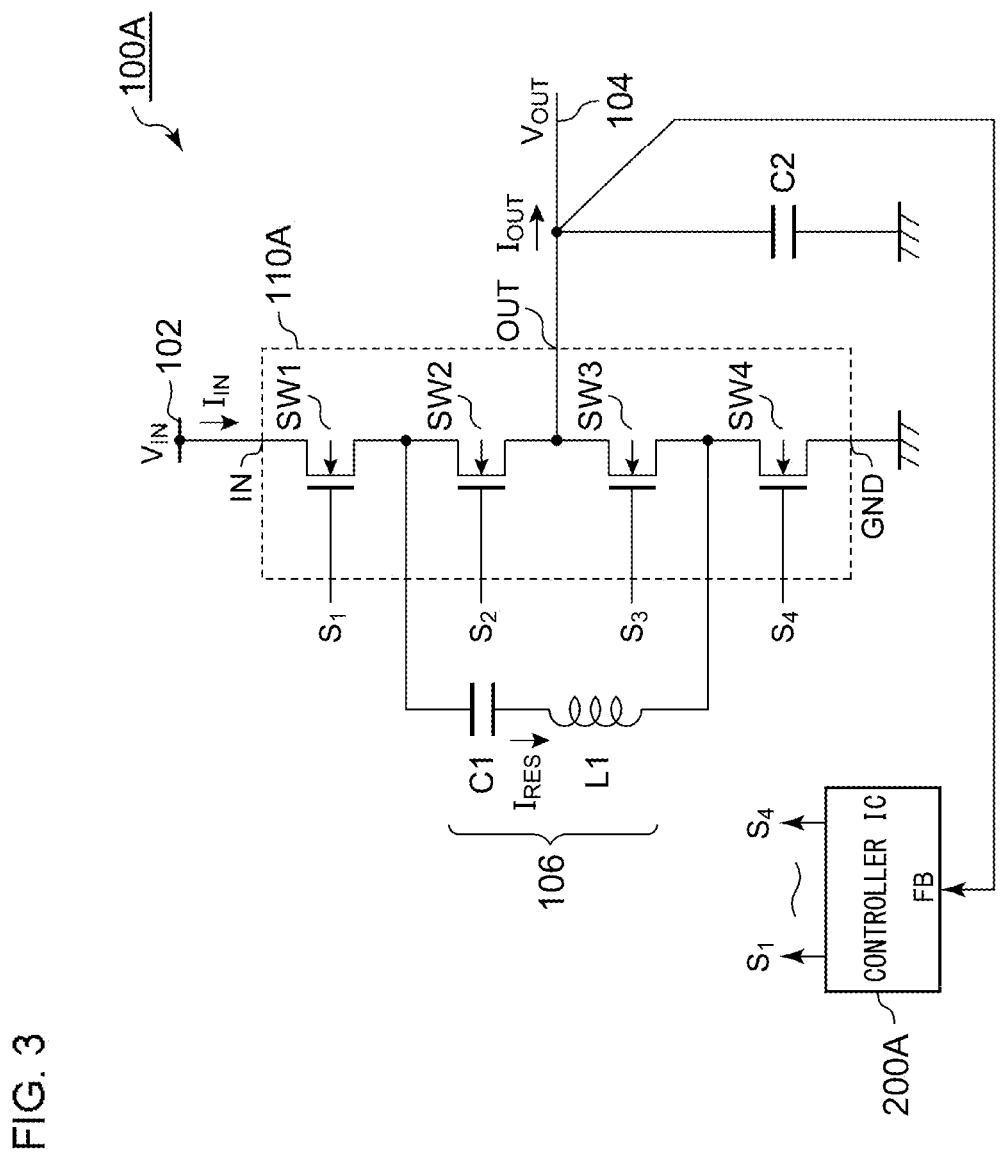
FIG. 3 is a circuit diagram of a resonant switched capacitor converter according to Example 1.1.

FIG. 3 is a circuit diagram of a resonant switched capacitor converter 100A according to Example 1.1. The resonant switched capacitor converter 100A has a gain of ½ times, steps down the input voltage $V_{IN}$ of an input line 102 by ½ times, and generates an output voltage $V_{OUT}=V_{IN}/2$ in an output line 104. The resonant switched capacitor converter 100A includes two capacitors C1 and C2, one inductor L1, and a controller IC 200A. The switch circuit 110A includes switches SW1 to SW4. The resonant switched capacitor converter 100A has a configuration in which an inductor is added in series with a flying capacitor of a charge pump having the gain of ½ times.

The switches SW1 to SW4 are driven by the controller IC 200A. In this example, the plurality of switches SW1 to SW4 are N-channel MOSFETs (Metal Oxide Semiconductor Field Effect Transistor). The drive signal of the i-th switch SWi is expressed as $S_i$. When $S_i$ is H (high), the switch SWi is turned on. When $S_i$ is L (low), the switch SWi is turned off.

The resonant switched capacitor converter 100A can switch between the first state φ1 and the second state φ2. In the first state φ1, the first switch SW1 and the third switch SW3 are turned on, and the second switch SW2 and the fourth switch SW4 are turned off. At this time, an LC resonant circuit 106 including the capacitor C1 and the inductor L1 and the capacitor C2 are connected in series, and the input voltage $V_{IN}$ is applied thereacross. When C1=C2, the voltage across the capacitors C1 and C2 is charged to $V_{IN}/2$.

In the second state φ2, the first switch SW1 and the third switch SW3 are turned off, and the second switch SW2 and the fourth switch SW4 are turned on. At this time, the LC resonant circuit 106 including the capacitor C1 and the inductor L1 and the capacitor C2 are connected in parallel, and $V_{OUT}=V_{IN}/2$ is generated in the output line 104.

Figure 4:
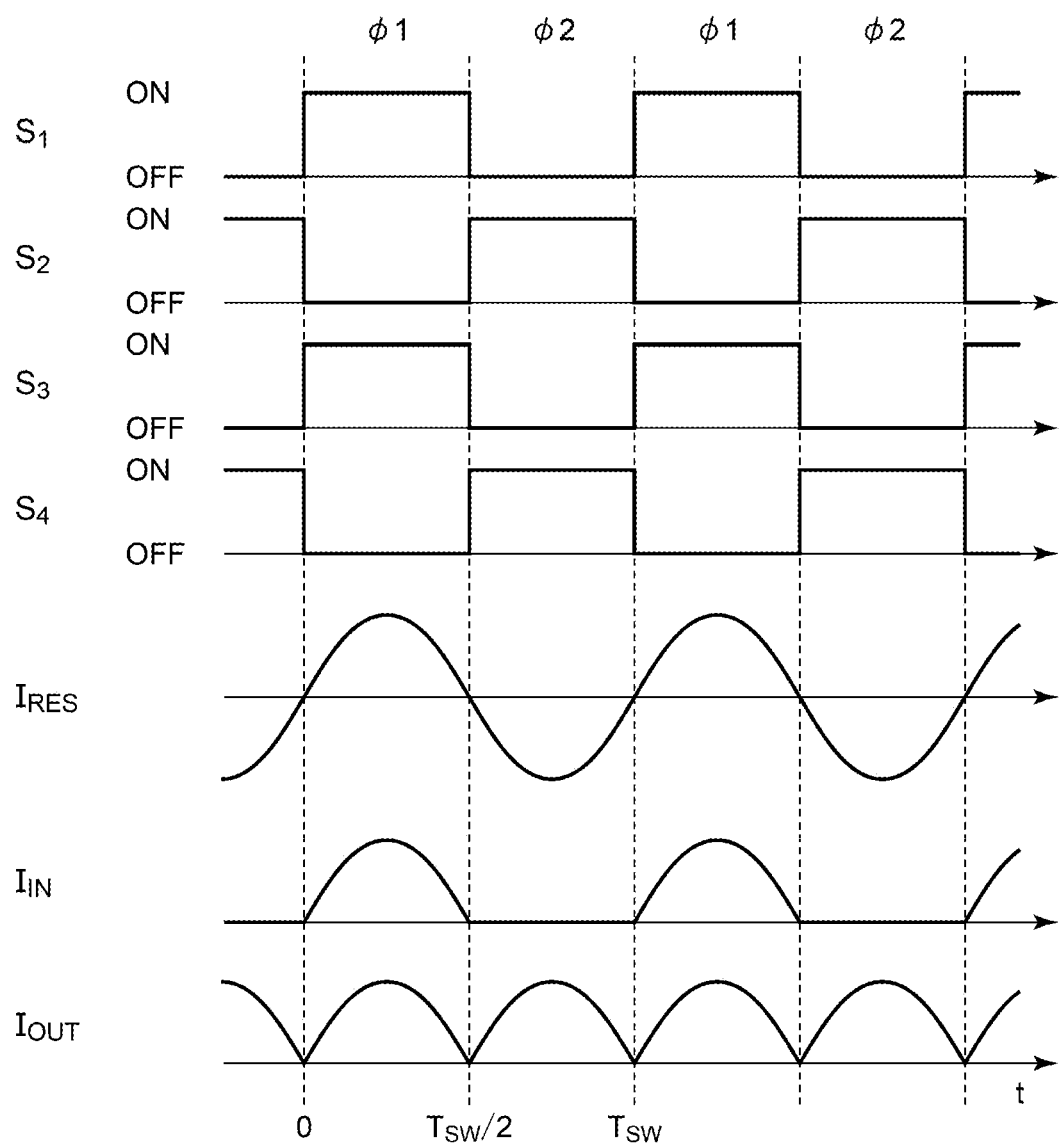
FIG. 4 is a time chart for explaining an operation of the resonant switched capacitor converter.

FIG. 4 is a time chart illustrating an operation of the resonant switched capacitor converter 100A. FIG. 4 illustrates the drive signals $S_1$ to $S_4$, and the resonant current $I_{RES}$, the input current $I_{in}$, and the output current $I_{OUT}$ flowing through the LC resonant circuit 106.

When the frequency (resonant frequency) of the resonant current $I_{RES}$ coincides with the switching frequency, the zero current switching (soft switching) state is realized, so that a highly efficient operation can be performed. $T_{SW}$ is a switching cycle, which is a cycle of the clock CLK generated in the controller IC 200A, and represents the reciprocal of the switching frequency.

Next, a configuration of the controller IC 200A will be described.

Figure 5:
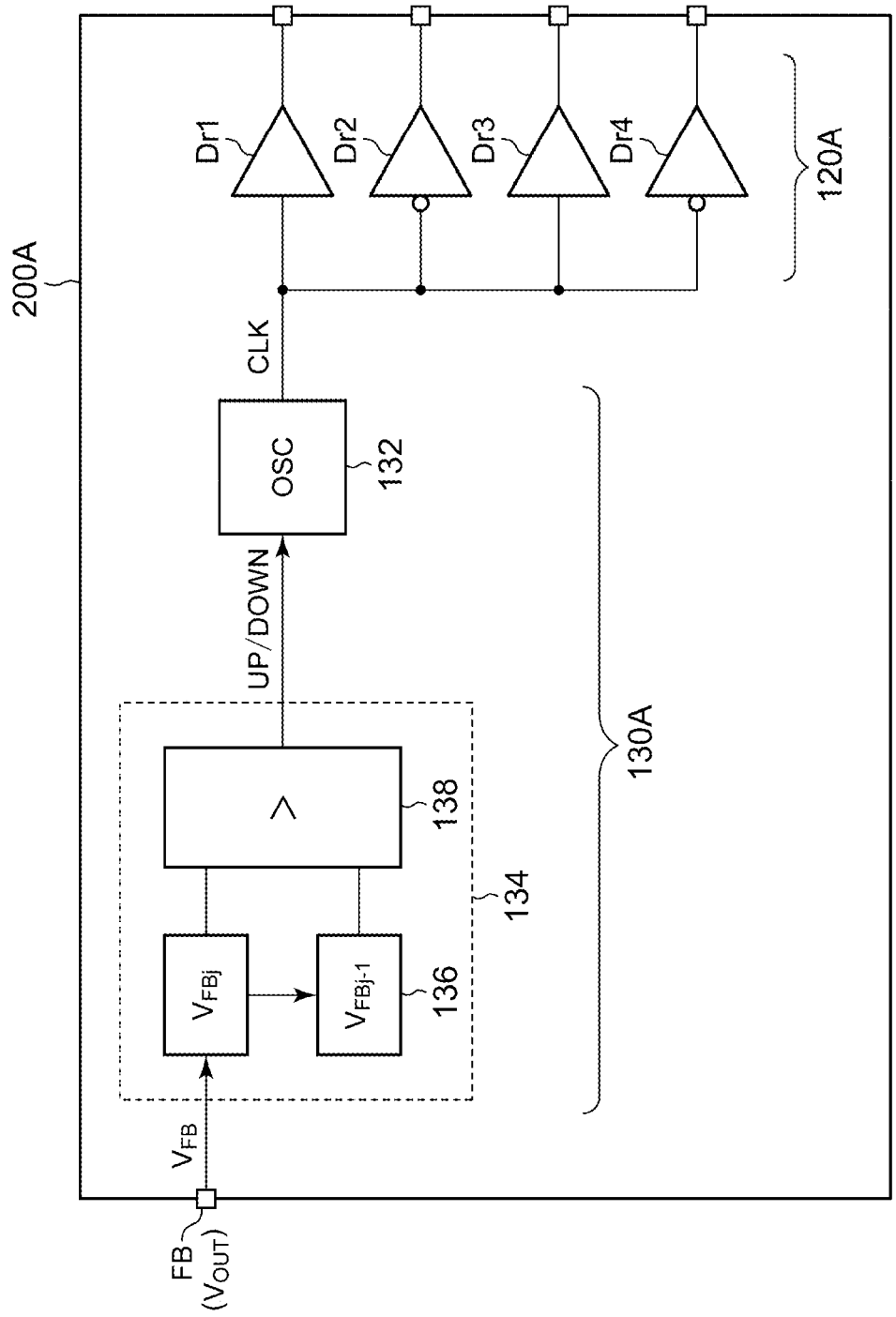
FIG. 5 is a circuit diagram of a controller IC according to Example 1.1.

FIG. 5 is a circuit diagram of the controller IC 200A according to Example 1.1. The controller IC 200A includes a drive circuit 120A and a frequency controller 130A. The drive circuit 120A includes four drivers Dr1 to Dr4 corresponding to the four switches SW1 to SW4. The drivers Dr1 and Dr3 operate in the same phase as the clock CLK, and the drivers Dr2 and Dr4 operate in the opposite phase to the clock CLK.

The frequency controller 130A includes a frequency variable oscillator 132 and a frequency adjusting unit 134. The frequency adjusting unit 134 adaptively controls the frequency of the frequency variable oscillator 132 based on the feedback voltage $V_{FB}$ (output voltage $V_{OUT}$) input to the feedback pin FB.

Specifically, the frequency adjusting unit 134 controls the frequency of the frequency variable oscillator 132 for each frequency control cycle j so that the output voltage $V_{OUT}$ approaches the maximum value. The frequency adjusting unit 134 is configured to be able to compare the current value $V_{FBj}$ of the feedback voltage $V_{FB}$ with the past value $V_{FB(j-1)}$ of the feedback voltage $V_{FB}$. The frequency adjusting unit 134 includes a storage unit 136 such as a sample hold circuit or a memory that holds the past value $V_{FBj-1}$ of the feedback voltage $V_{FB}$, and a comparison circuit 138.

In a certain frequency control cycle j, the frequency adjusting unit 134 changes the switching frequency, that is, the frequency of the frequency variable oscillator 132, in the first direction (for example, the rising direction). The resultant feedback voltage $V_{FBj}$ and the past feedback voltage $V_{FBj-1}$ are compared by the comparison circuit 138. As a result of the comparison, when the output voltage $V_{OUT}$ (feedback voltage $V_{FB}$) increases, the frequency of the frequency variable oscillator 132 is changed in the first direction (rising direction) also in the next frequency control cycle j+1. Conversely, when the output voltage $V_{OUT}$ (feedback voltage $V_{FB}$) decreases, the frequency of the frequency variable oscillator 132 is changed in a second direction (descending direction) opposite to the first direction in the next frequency control cycle j+1. The current value $V_{FBj}$ in the frequency control cycle j is the past value $V_{FBj}$ in the next frequency control cycle j+1.

The frequency adjusting unit 134 can maximize the output voltage $V_{OUT}$ by repeating this frequency control cycle. As can be seen from FIG. 2, when the output voltage $V_{OUT}$ takes a maximum value, the switching frequency ω and the resonant frequency $ω_0$ coincide with each other, so that zero current switching can be performed and efficiency can be increased.

Example 1.2

Figure 6:
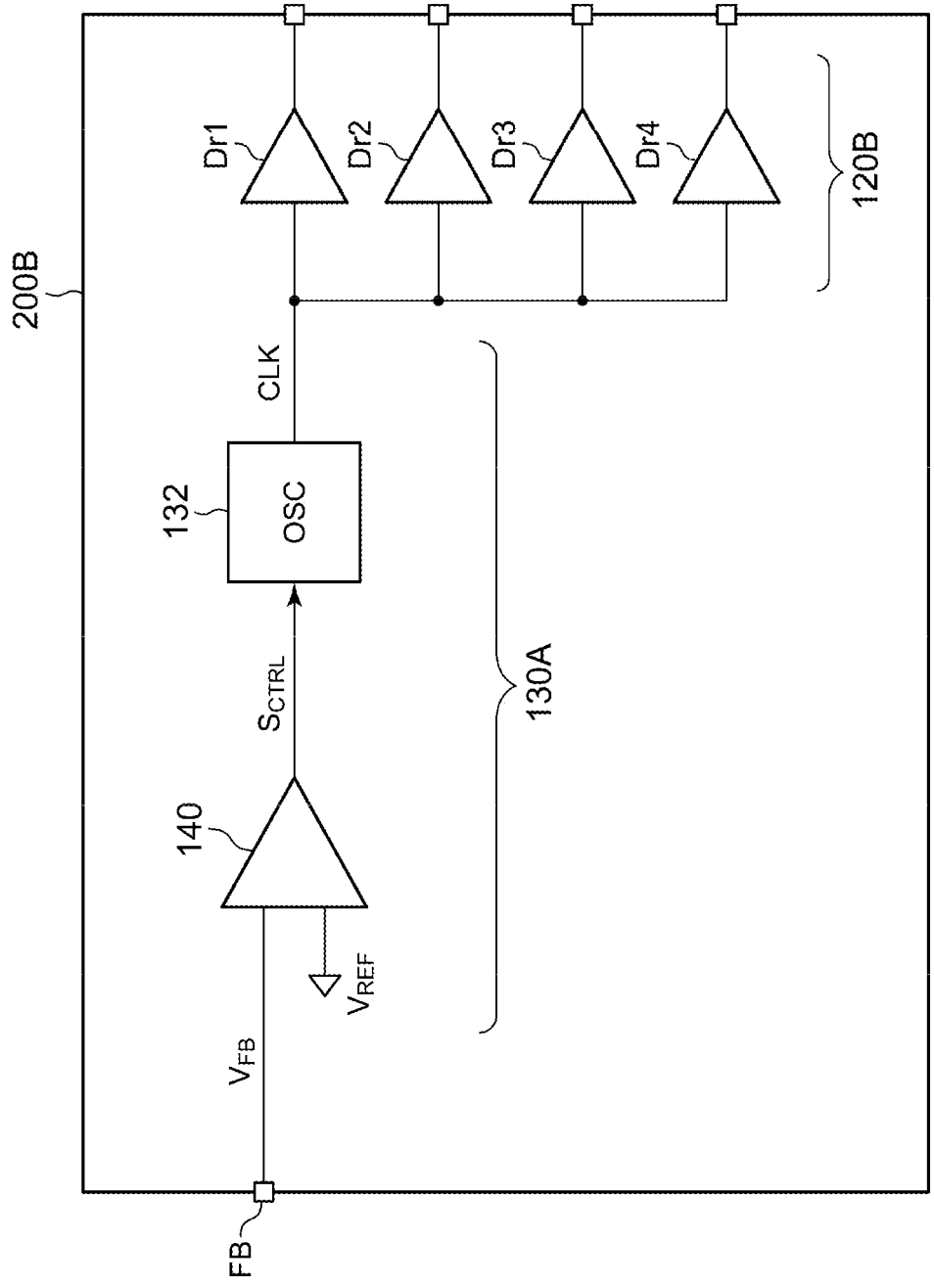
FIG. 6 is a circuit diagram of a controller IC according to Example 1.2.

FIG. 6 is a circuit diagram of a controller IC 200B according to Example 1.2. The controller IC 200B can be used as an alternative to the controller IC 200A in the resonant switched capacitor converter 100A of FIG. 3.

The controller IC 200B includes a drive circuit 120B and a frequency controller 130B. The configuration of the drive circuit 120B is similar to that of the drive circuit 120A in FIG. 5.

The frequency controller 130B includes a frequency variable oscillator 132 and a feedback circuit 140.

The frequency variable oscillator 132 is a voltage controlled oscillator (VCO) or a digital controlled oscillator (DCO), and oscillates at a frequency corresponding to the signal level of a control signal $S_{CTRL}$.

A reference voltage $V_{REF}$ that defines a target level $V_{OUT(REF)}$ of the output voltage $V_{OUT}$ is input to the feedback circuit 140. When the output voltage $V_{OUT}$ is directly set to the feedback voltage $V_{FB}$, the target level $V_{OUT(REF)}$ of the output voltage $V_{OUT}$ becomes the reference voltage $V_{REF}$.

The feedback circuit 140 controls the frequency of the frequency variable oscillator 132 within a range in which $ω>ω_0$ holds. Since the resonant switched capacitor converter 100A operates in the range of $ω>ω_0$, it operates in a region where the gain is smaller than ½, and the target level $V_{OUT(REF)}$ of the output voltage $V_{OUT}$ is determined to be lower than $V_{IN}/2$.

The feedback circuit 140 controls the frequency of the frequency variable oscillator 132 such that an error between the feedback voltage $V_{FB}$ and the reference voltage $V_{REF}$ approaches 0. The feedback circuit 140 can be configured by an analog circuit or a digital circuit. For example, the feedback circuit 140 includes an error amplifier that amplifies an error between the feedback voltage $V_{FB}$ and the reference voltage $V_{REF}$, and supplies a control signal $S_{CTRL}$ based on an output of the error amplifier to the frequency variable oscillator 132. Alternatively, the feedback circuit 140 may be configured by a digital circuit including a proportional-integral (PI) controller or a proportional-integral-derivative (PID) controller.

Figure 7:
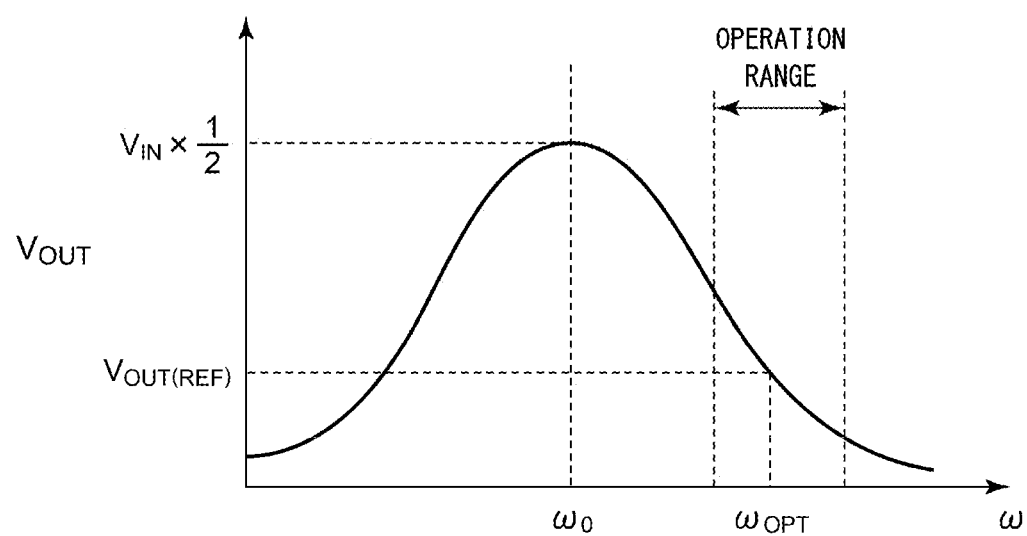
FIG. 7 is a diagram for explaining an operation of the frequency controller of FIG. 6.

FIG. 7 is a diagram for explaining the operation of the frequency controller 130B of FIG. 6. The operating range of the resonant switched capacitor converter 100A is limited to a range of $ω>ω_0$ within which the target level $V_{OUT(REF)}$ of the output voltage $V_{OUT}$ is determined.

As a result of the feedback control of the frequency controller 130B, the frequency of the frequency variable oscillator 132, that is, the switching frequency ω of the resonant switched capacitor converter 100A is stabilized to an optimum frequency $ω_{OPT}$ where $V_{OUT}=V_{OUT(REF)}$.

The controller IC 200B operates as described above. In Example 1.1, the zero current switching is realized by operating at $ω=ω_0$, whereas in Example 1.2, the zero voltage switching can be realized by operating at $ω>ω_0$, whereby a highly efficient operation can be realized.

In Example 1.1, since the output voltage $V_{OUT}$ is stabilized at a voltage level of ½ of the input voltage $V_{IN}$, when the input voltage $V_{IN}$ fluctuates, the output voltage $V_{OUT}$ also fluctuates. On the other hand, according to Example 1.2, even if the input voltage $V_{IN}$ fluctuates, the output voltage $V_{OUT}$ can be stabilized at the target level determined according to the reference voltage $V_{REF}$.

Example 1.3

Figure 8:
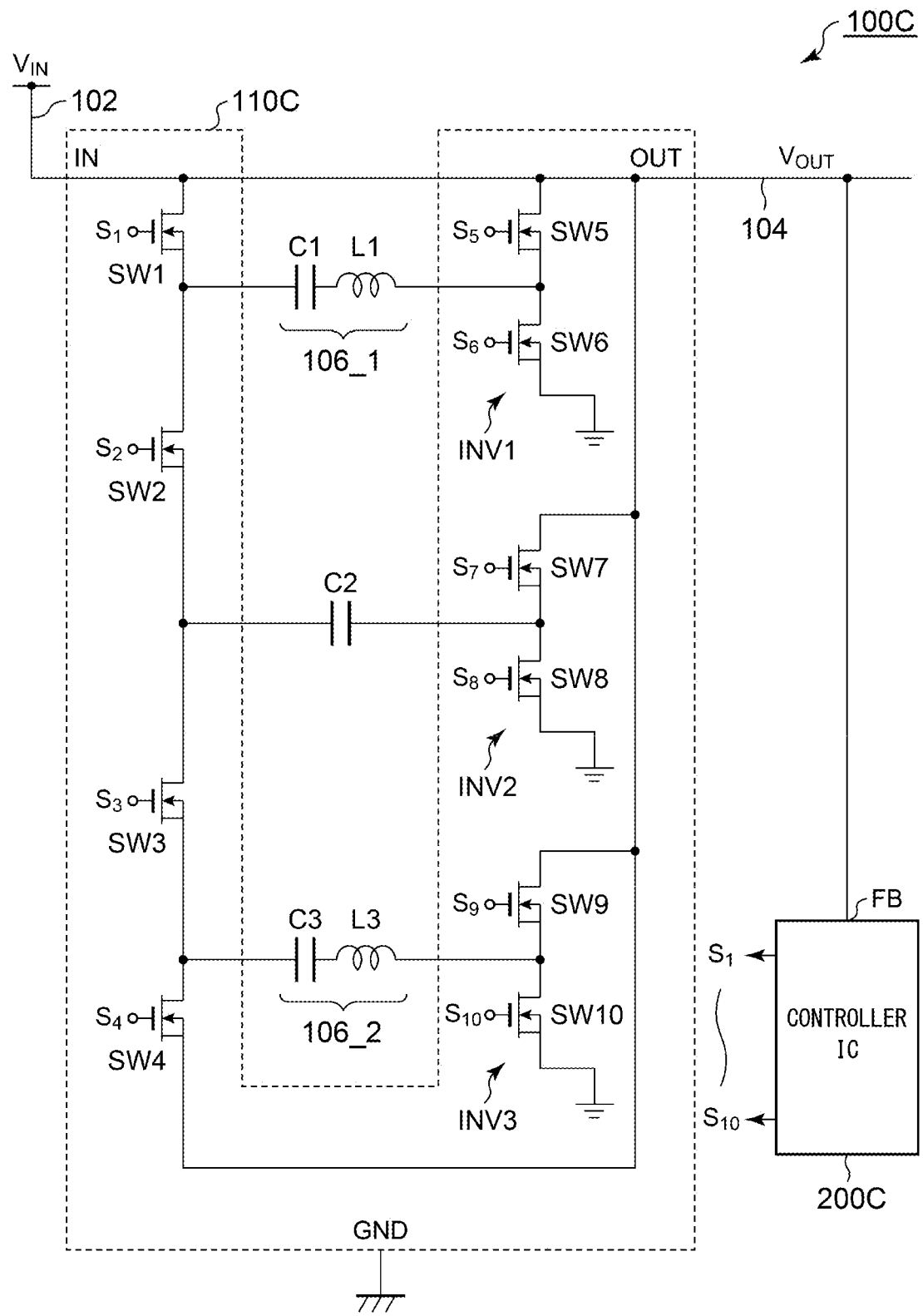
FIG. 8 is a circuit diagram of a resonant switched capacitor converter according to Example 1.3.

FIG. 8 is a circuit diagram of a resonant switched capacitor converter 100C according to Example 1.3. The resonant switched capacitor converter 100C is a switched tank converter, has a gain of ¼ times, steps down an input voltage $V_{IN}$ of the input line 102 by ¼ times, and generates an output voltage $V_{OUT}=V_{IN}/4$ in the output line 104.

The resonant switched capacitor converter 100C includes three capacitors C1 to C3, two inductors L1 and L3, and a controller IC 200C. The switch circuit 110C includes switches SW1 to SW10. The resonant switched capacitor converter 100C has a configuration in which the inductors L1 and L3 are added to a Dixon-type charge pump (switched tank converter).

The first switch SW1 to the fourth switch SW4 are N-channel MOSFETs, and are connected in series between the input terminal IN and the output terminal OUT.

A pair of the fifth switch SW5 and the sixth switch SW6, a pair of the seventh switch SW7 and the eighth switch SW8, and a pair of the ninth switch SW9 and the tenth switch SW10 constitute inverters INV1 to INV3, respectively.

The switches SW1 to SW10 are driven by the controller IC 200C.

Figure 9:
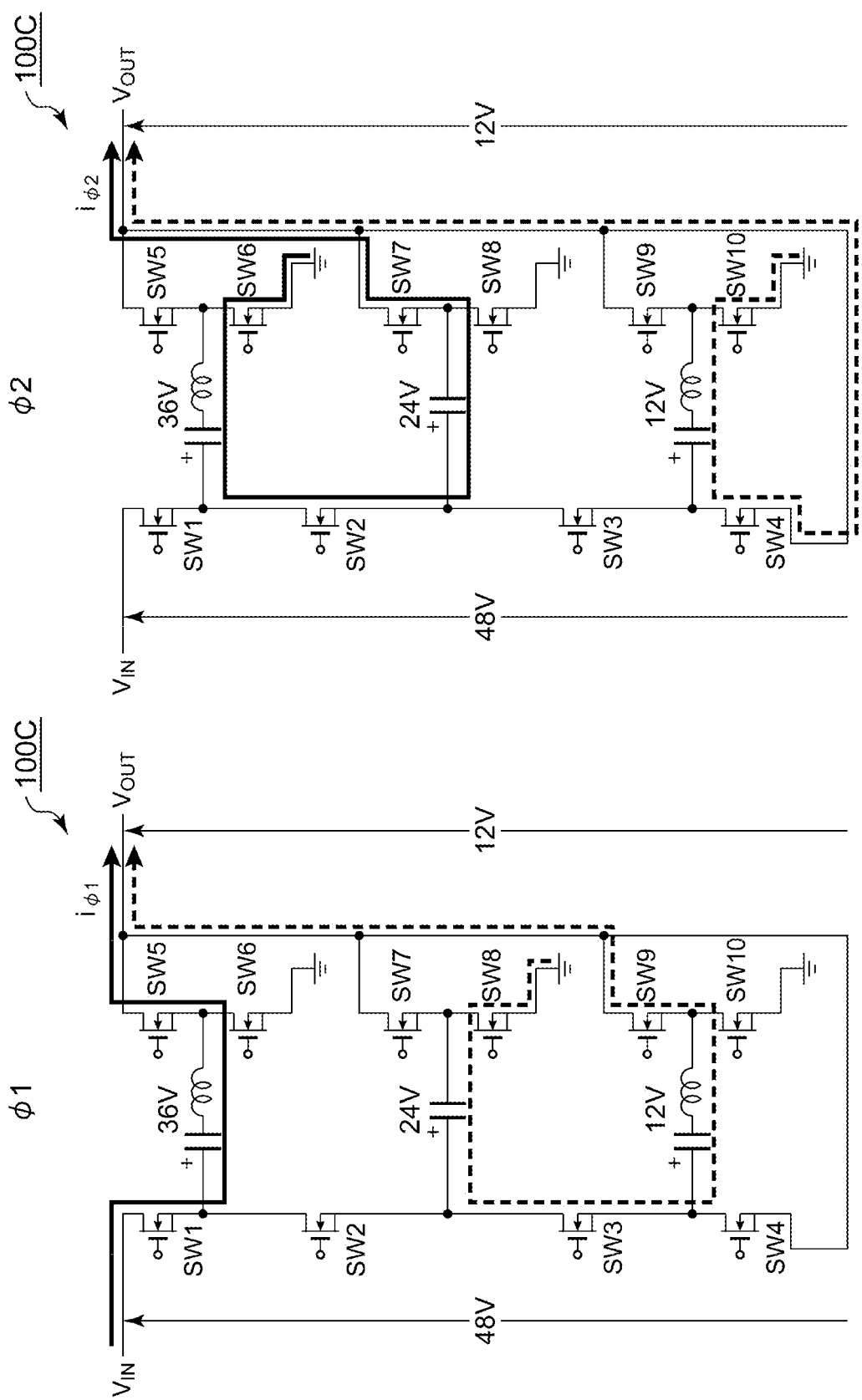
FIG. 9 is a view illustrating an operation of the resonant switched capacitor converter of FIG. 8.

FIG. 9 is a diagram for explaining an operation of the resonant switched capacitor converter 100C in FIG. 8. The resonant switched capacitor converter 100C can switch between the first state φ1 and the second state φ2. In the first state φ1, the switches SW1, SW3, SW5, SW7, and SW9 are turned on, and the remaining switches SW2, SW4, SW6, SW8, and SW10 are turned off.

In the second state φ2, the switches SW1, SW3, SW5, SW7, and SW9 are turned off, and the remaining switches SW2, SW4, SW6, SW8, and SW10 are turned on.

By alternately repeating the first state φ1 and the second state φ2, the voltage across the LC resonant circuit 106_1 of the capacitor C1 and the inductor L1 is 36 V, the voltage across the capacitor C2 is 24 V, and the voltage across the LC resonant circuit 106_2 of the capacitor C3 and the inductor L3 is 12 V, so that an output voltage $V_{OUT}$ of 12 V can be obtained.

Figure 10:
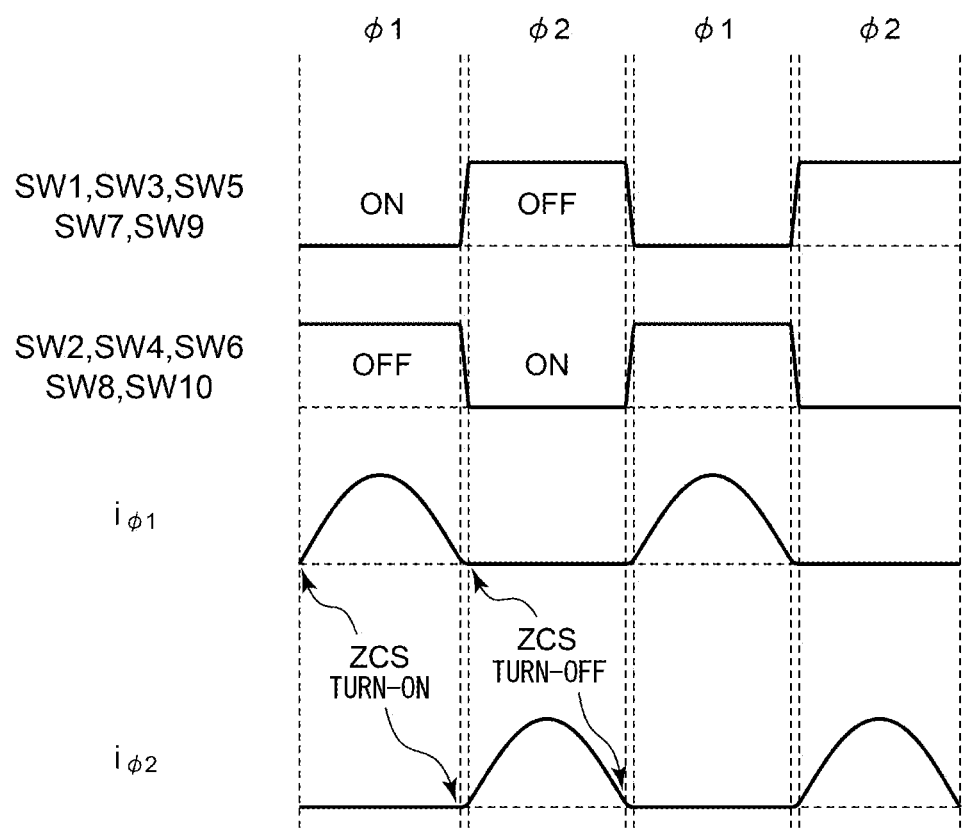
FIG. 10 is an operation waveform diagram of the resonant switched capacitor converter of FIG. 8.

FIG. 10 is an operation waveform diagram of the resonant switched capacitor converter 100C in FIG. 8. FIG. 10 illustrates the states of the switches SW1 to SW10, the current $i_{\varphi 1}$ flowing in the first state φ1, and the current $i_{\varphi 2}$ flowing in the second state φ2.

By operating in the resonant state of $\omega = \omega_0$, zero current switching (ZCS), that is, ZCS turn-on and ZCS turn-off are enabled, and high efficiency can be obtained.

The controller IC 200C of the resonant switched capacitor converter 100C according to Example 1.3 can be configured based on the controller IC 200A described in Example 1.1, and the number of drivers of the drive circuit 120A of the controller IC 200A may be increased to 10. According to this configuration, similarly to Example 1.1, zero current switching can be realized, and high efficiency can be obtained.

Alternatively, the controller IC 200C of the resonant switched capacitor converter 100C according to Example 1.3 may be configured based on the controller IC 200B described in Example 1.2, and the number of drivers of the drive circuit 120B of the controller IC 200B may be increased to 10. According to this configuration, similarly to Example 1.2, zero voltage switching can be realized, and high efficiency can be obtained. In addition, in the range of $V_{OUT} < V_{IN}/4$, the output voltage $V_{OUT}$ can be stabilized at an arbitrary target level $V_{OUT(REF)}$.

Example 1.4

Figure 11:
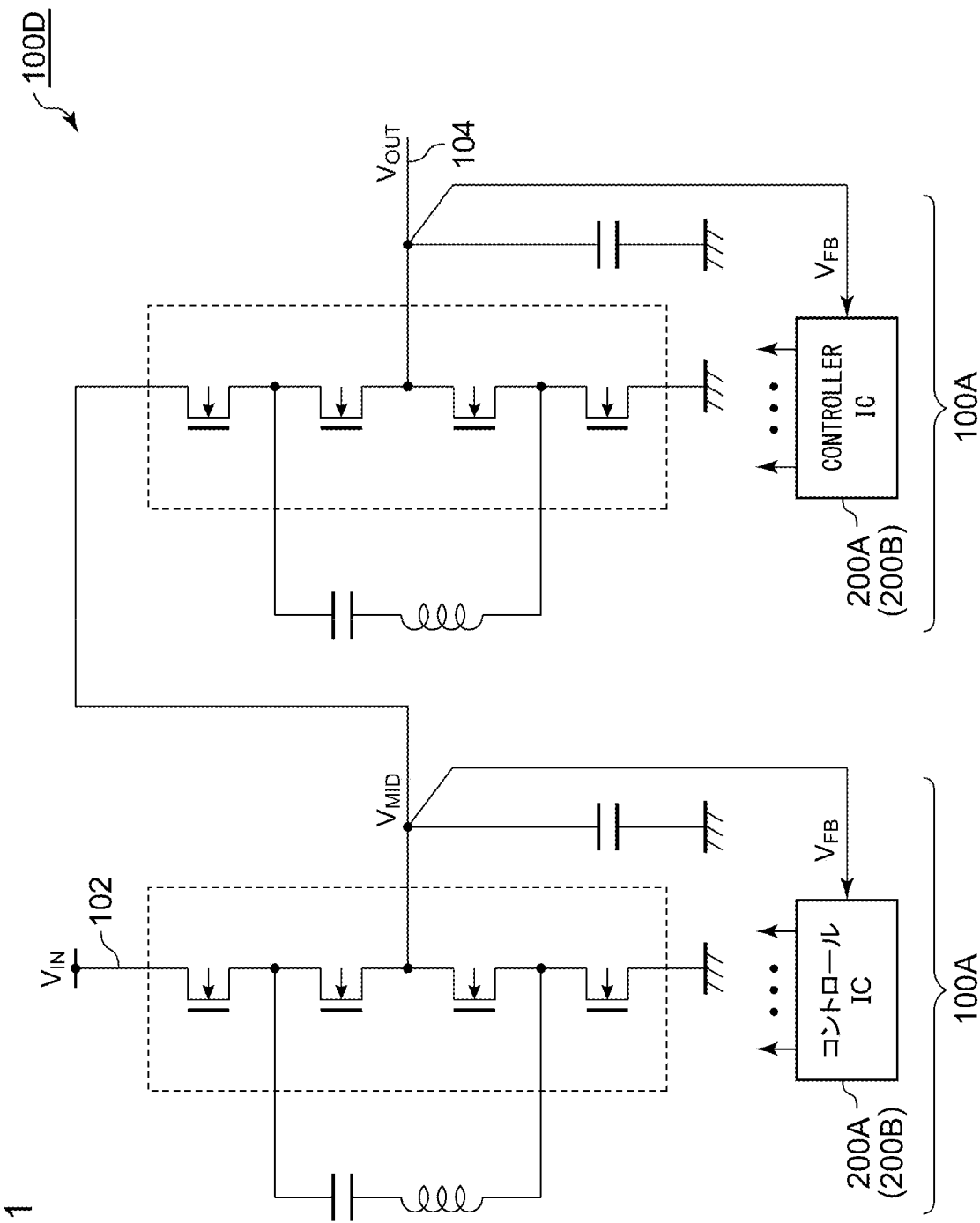
FIG. 11 is a circuit diagram of a resonant switched capacitor converter according to Example 1.4.

FIG. 11 is a circuit diagram of a resonant switched capacitor converter 100D according to Example 1.4. Similarly to Example 1.3, the resonant switched capacitor converter 100D has a gain of ¼ times, steps down an input voltage $V_{IN}$ of the input line 102 by ¼ times, and generates an output voltage $V_{OUT} = V_{IN}/4$ in the output line 104.

The resonant switched capacitor converter 100D has a configuration in which two stages of the resonant switched capacitor converters 100A having the gain of ½ times described in Example 1.1 are connected in series. The resonant switched capacitor converter 100A in the previous stage multiplies the input voltage $V_{IN}$ by ½ to generate an intermediate voltage $V_{MID}$. The resonant switched capacitor converter 100B in the subsequent stage multiplies the intermediate voltage $V_{MID}$ by ½ to generate the output voltage $V_{OUT}$.

In Example 1.4, the controller IC 200A (or 200B) is provided separately for each resonant switched capacitor converter 100A. The controller IC 200A (200B) of the resonant switched capacitor converter 100A in the preceding stage controls the switching frequency of the resonant switched capacitor converter 100A in the preceding stage based on the intermediate voltage $V_{MID}$. The controller IC 200A (200B) of the resonant switched capacitor converter 100A in the subsequent stage controls the switching frequency of the resonant switched capacitor converter 100A in the subsequent stage based on the output voltage $V_{OUT}$.

According to this configuration, the resonant switched capacitor converter having the gain of ¼ times can be operated with high efficiency.

Example 1.5

Figure 12:
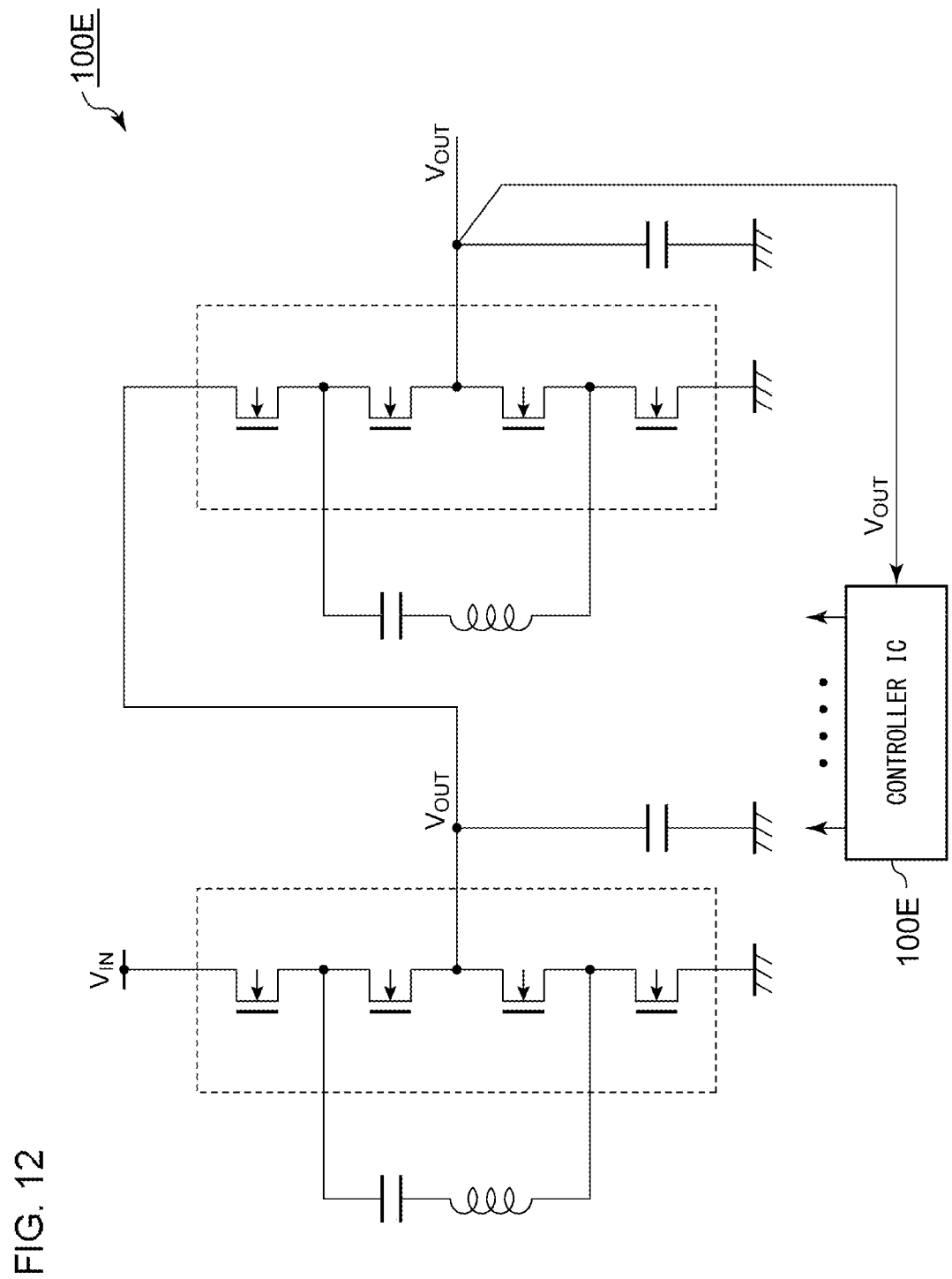
FIG. 12 is a circuit diagram of a resonant switched capacitor converter according to Example 1.5.

FIG. 12 is a circuit diagram of a resonant switched capacitor converter 100E according to Example 1.5. Similarly to Example 1.3 and Example 1.4, the resonant switched capacitor converter 100E has a gain of ¼ times, steps down the input voltage $V_{IN}$ of the input line 102 by ¼ times, and generates the output voltage $V_{OUT} = V_{IN}/4$ in the output line 104.

Similarly to Example 1.4, the resonant switched capacitor converter 100E has a configuration in which two stages of the resonant switched capacitor converters 100A having the gain of ½ times are connected in series, but in Example 1.5, the controller ICs 200E of two resonant switched capacitor converters 100A are integrated on one chip. Only the output voltage $V_{OUT}$ of the resonant switched capacitor converter 100A in the subsequent stage is fed back to the controller IC 200E, and the switching frequencies of both the preceding stage and the subsequent stage are similarly controlled based on the output voltage $V_{OUT}$.

According to this configuration, the resonant switched capacitor converter having the gain of ¼ times can be operated with high efficiency.

A modification related to Embodiment 1 will be described.

In the embodiment, the converter having the gain of ½ times or ¼ times has been described, but the application of the present disclosure is not limited thereto, and can be applied to converters having other gains. The present invention is also applicable to a switched capacitor converter having a gain larger than 1.

Application

Figure 13:
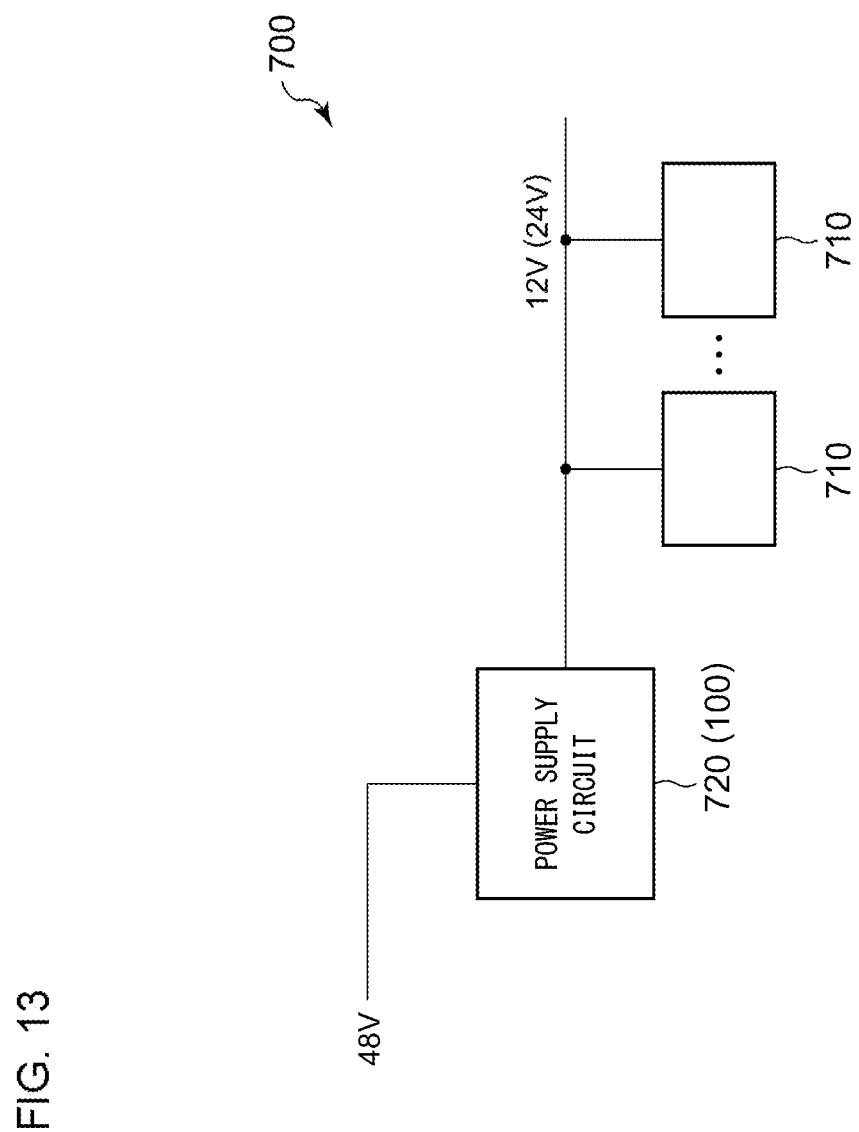
FIG. 13 is a view illustrating an example of an electronic device including the resonant switched capacitor converter.

FIG. 13 is a diagram illustrating an example of an electronic device 700 including the resonant switched capacitor converter 100. A preferred example of the electronic device 700 is a server. An internal circuit 710 is designed to operate at 12 V since a 12-V power line was originally drawn into the server. The internal circuit 710 may include a central processing unit (CPU), a memory, an interface circuit of a local area network (LAN), a DC/DC converter that steps down a voltage of 12 V, and the like.

In recent years, in order to reduce the current flowing through an electric wire, a movement to replace the bus voltage from 12 V to 48 V has been promoted. In this case, the power supply circuit 720 that steps down a power supply voltage of 48 V to 12 V is required. The above-described resonant switched capacitor converter 100 having the gain of ¼ times can be suitably used for such a power supply circuit 720.

The electronic device 700 is not limited to the server, and may be an in-vehicle device. A battery of a conventional automobile is mainly 12 V or 24 V, but a 48-V system may be adopted in a hybrid vehicle, and in this case, a power supply circuit that converts a battery voltage of 48 V into 12 V or 24 V is also required. In such a case, the resonant switched capacitor converter 100 having the gain of ½ times or ¼ times can be suitably used.

In addition, the electronic device 700 may be an industrial device, an OA device, or a consumer device such as an audio device.

Embodiment 2

Figure 14:
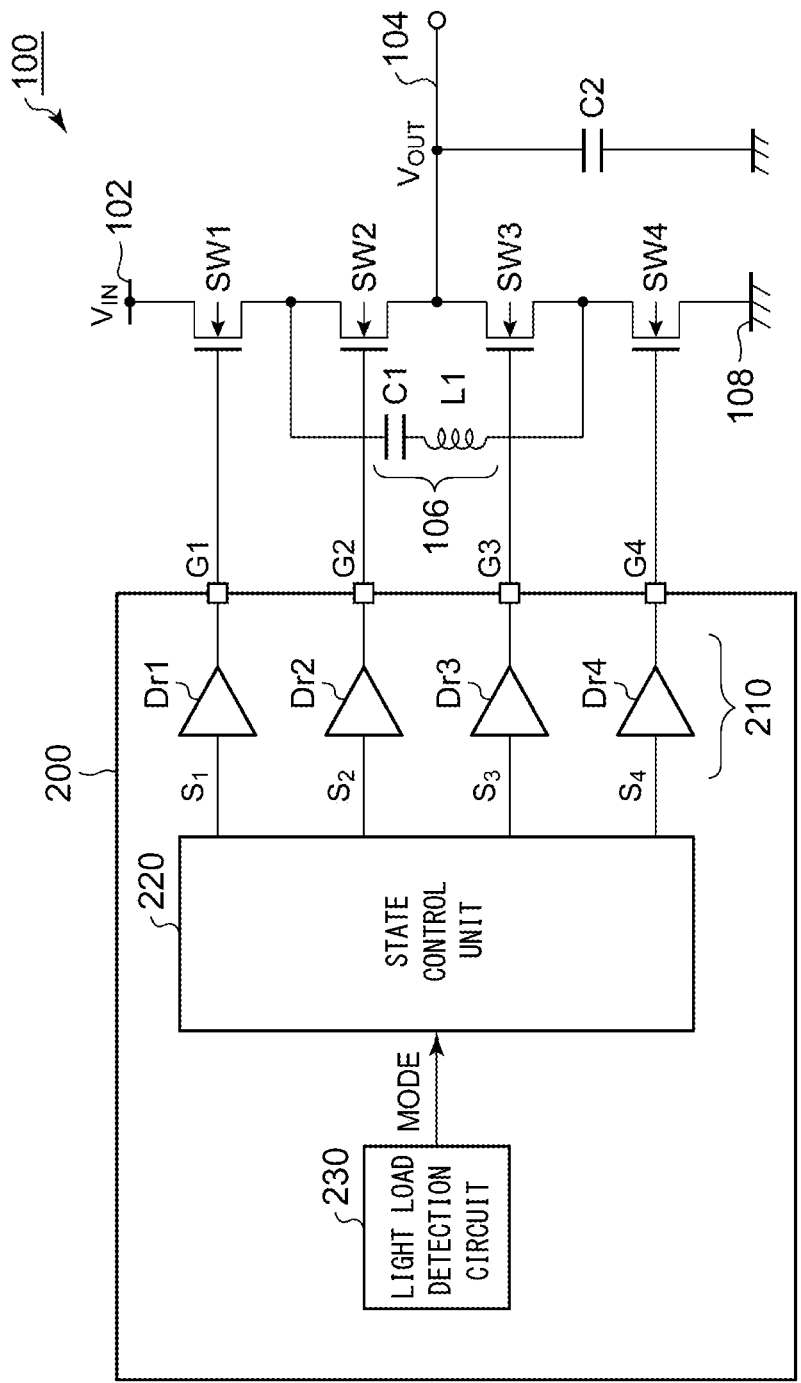
FIG. 14 is a circuit diagram of a resonant switched capacitor converter according to Embodiment 2.
Figure 15:
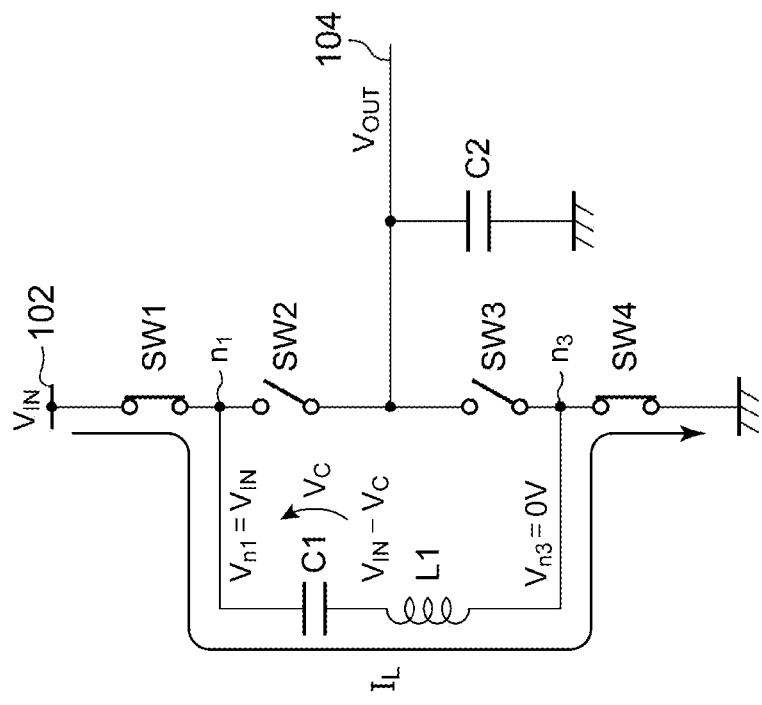
FIG. 15 is an equivalent circuit diagram in the state I of the second mode of the resonant switched capacitor converter.

FIG. 14 is a circuit diagram of a resonant switched capacitor converter 100 according to Embodiment 2. The resonant switched capacitor converter 100 has a gain of ½ times, steps down the input voltage $V_{IN}$ of the input line 102 by ½ times, and generates an output voltage $V_{OUT}=V_{IN}/2$ in the output line 104. The resonant switched capacitor converter 100 includes two capacitors C1 and C2, one inductor L1, four switches SW1 to SW4, and a controller integrated circuit (IC) 200.

The resonant switched capacitor converter 100 has a configuration in which an inductor is added in series with a flying capacitor of a charge pump having the gain of ½ times.

The first switch SW1 and the second switch SW2 are connected in series between the input line 102 and the output line 104. The third switch SW3 and the fourth switch SW4 are connected in series between the output line 104 and the ground line 108. The flying capacitor C1 and the inductor L1 are connected in series across the second switch SW2 and the third switch SW3 to form an LC resonant circuit (tank circuit) 106. An output capacitor C2 is connected to the output line 104. A connection node between the first switch SW1 and the second switch SW2 is denoted as n1, and a connection node between the third switch SW3 and the fourth switch SW4 is denoted as n3.

In the first mode, the controller IC 200 sequentially repeats the first state φ1 to the third state φ3.

First State φ1
First switch SW1 and third switch SW3: ON
Second switch SW2 and fourth switch SW4: OFF
Second State φ2
Second switch SW2 and fourth switch SW4: ON
First switch SW1 and third switch SW3: OFF
Third State φ3
First switch SW1, second switch SW2, third switch SW3, and fourth switch SW4: OFF The controller IC 200 is operable in the second mode in addition to the first mode. In the second mode, the controller IC 200 sequentially repeats the following states I to IV.
State I
First switch SW1 and fourth switch SW4: ON
Second switch SW2 and third switch SW3: OFF
State II
First switch SW1 and third switch SW3: ON
Second switch SW2 and fourth switch SW4: OFF
State III
Second switch SW2 and third switch SW3: ON
First switch SW1 and fourth switch SW4: OFF
State IV
Second switch SW2 and fourth switch SW4: ON
First switch SW1 and third switch SW3: OFF The controller IC 200 includes a drive circuit 210, a state control unit 220, and a light load detection circuit 230, and is a functional IC integrated on one semiconductor substrate. The gate pins G1 to G4 of the controller IC 200 are connected to the gates of the first switch SW1 to the fourth switch SW4.

The state control unit 220 is a control logic, generates control signals $S_1$ to $S_4$ that define on and off of the first switch SW1 to the fourth switch SW4, and controls the state of the resonant switched capacitor converter 100. In the first mode, the first state φ1 to the third state φ3 are sequentially repeated. In addition, the state control unit 220 sequentially repeats the state I to the state IV in the second mode.

The drive circuit 210 drives the first switch SW1 to the fourth switch SW4 according to the outputs $S_1$ to $S_4$ of the state control unit 220. The drive circuit 210 includes four drivers Dr1 to Dr4.

The controller IC 200 switches between the first mode and the second mode according to the state of the load. The light load detection circuit 230 monitors the state of the load, and selects the first mode when it is determined as the light load state, and selects the second mode when it is determined as the non-light load state (heavy load state).

The light load detection circuit 230 may directly monitor the output current $I_{OUT}$ of the resonant switched capacitor converter 100, or may monitor the coil current $I_L$ flowing in the LC resonant circuit 106. For example, when the output current $I_{OUT}$ of the resonant switched capacitor converter 100 becomes 0, the light load detection circuit 230 determines that the state is the light load state, and shifts to the first mode.

The resonant switched capacitor converter 100 is configured as described above. Next, the operation will be described.

First, the operation in the second mode will be described. As described above, in the second mode, the states I to IV are repeated.

FIG. 2 is an equivalent circuit diagram in the state I of the second mode of the resonant switched capacitor converter 100. The voltages of the switching nodes n1 and n3 are denoted as Vn1 and Vn3. In the state I,
$Vn1=V_{IN}$, and
$Vn3=0$ V. When the voltage across the flying capacitor C1 is Vc, the voltage across the inductor L1 $\Delta V_{L(I)}$ is expressed as $$\Delta V_{L(I)}=V_{IN}-Vc$$

Therefore, in the state I, the slope of the coil current $I_L$ flowing through the inductor L1 can be expressed as $$(V_{IN}-Vc)/L.$$

Figure 16:
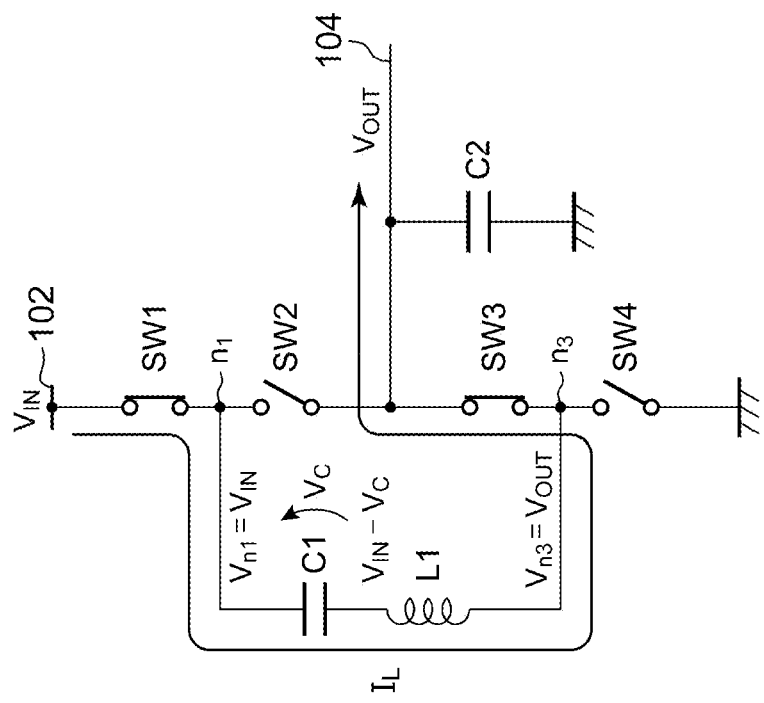
FIG. 16 is an equivalent circuit diagram in the state II of the second mode of the resonant switched capacitor converter.

FIG. 16 is an equivalent circuit diagram in the state II of the second mode of the resonant switched capacitor converter 100. In the state II,
$Vn1=V_{IN}$, and
$Vn3=V_{OUT}$. When the voltage across the flying capacitor C1 is Vc, the voltage across the inductor L1 $\Delta V_{L(II)}$ is expressed as $$\Delta V_{L(II)}=V_{IN}-Vc-V_{OUT}.$$

Thus, in the state II, the slope of the coil current $I_L$ flowing through the inductor L1 is expressed as $$(V_{IN}-Vc-V_{OUT})/L.$$

Figure 17:
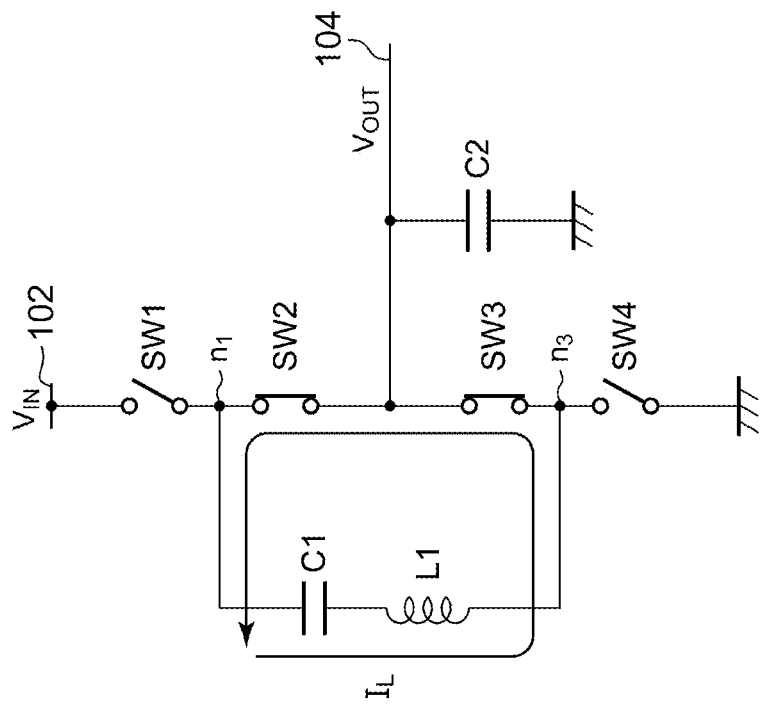
FIG. 17 is an equivalent circuit diagram in the state III of the second mode of the resonant switched capacitor converter.

FIG. 17 is an equivalent circuit diagram in the state III of the second mode of the second mode of the resonant switched capacitor converter 100. In the state III, Vn1=Vn3. When the voltage across the flying capacitor C1 is Vc, the voltage across the inductor L1 $\Delta V_{L(III)}$ is expressed as $$\Delta V_{L(III)} = -Vc.$$

Thus, in the state III, the slope of the coil current $I_L$ flowing through the inductor L1 is expressed as $$(-Vc)/L.$$

Figure 18:
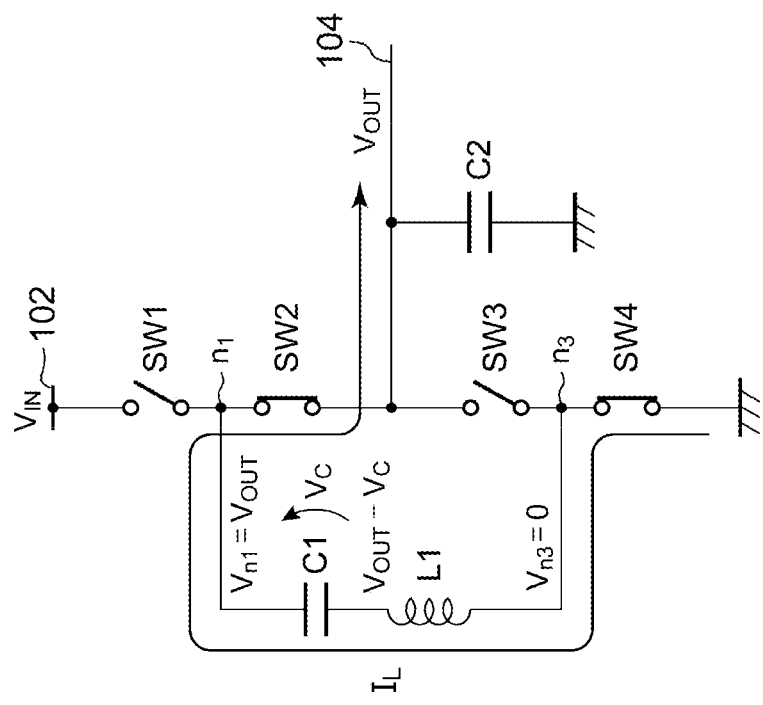
FIG. 18 is an equivalent circuit diagram in the state IV of the second mode of the resonant switched capacitor converter.

FIG. 18 is an equivalent circuit diagram in the state IV of the second mode of the resonant switched capacitor converter 100. In the state IV, Vn1=$V_{OUT}$, and Vn3=0 V. When the voltage across the flying capacitor C1 is Vc, the voltage across the inductor L1 $\Delta V_{L(IV)}$ is expressed as $$\Delta V_{L(IV)} = V_{OUT} Vc.$$

Therefore, in the state IV, the slope of the coil current $I_L$ flowing through the inductor L1 is expressed as $$(V_{OUT} - Vc)/L.$$

Figure 19:
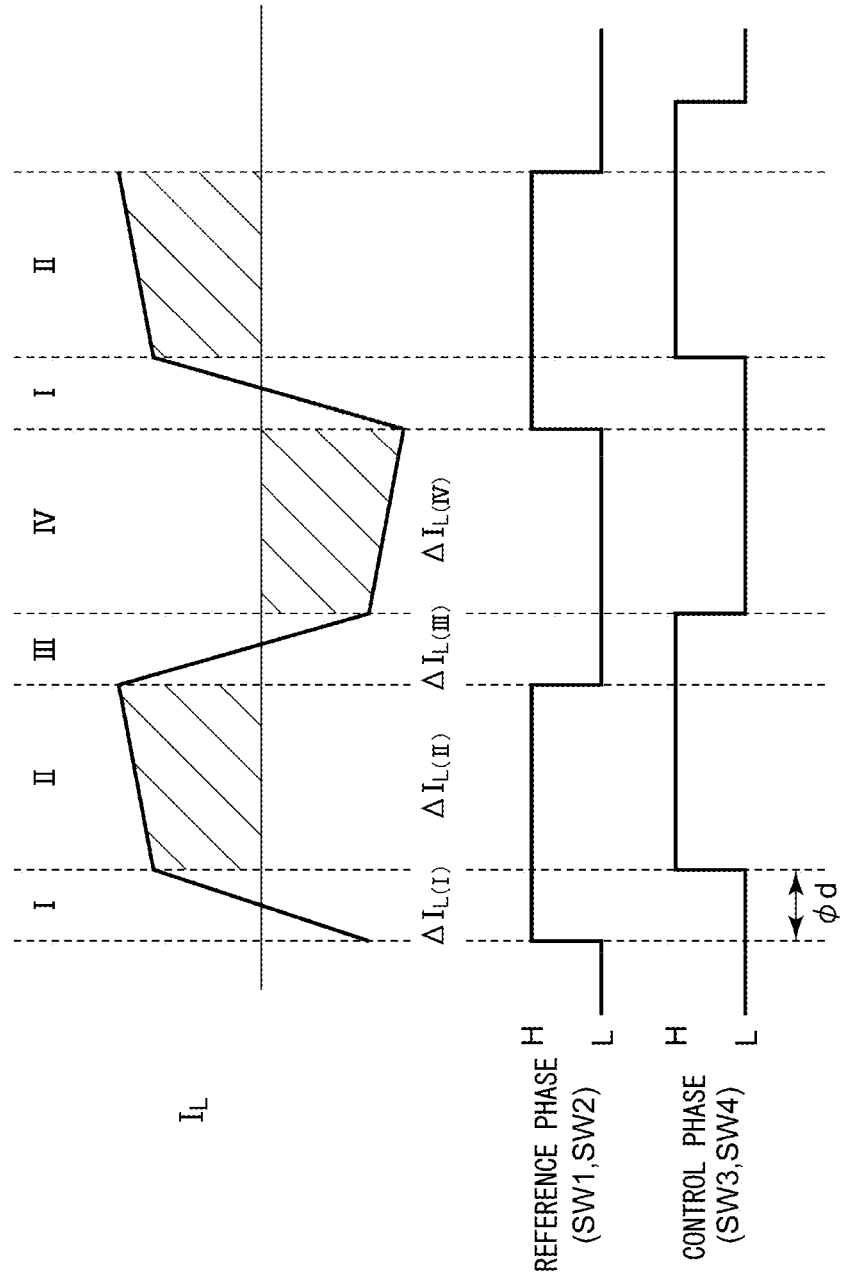
FIG. 19 is a time chart for explaining an operation in the second mode of the resonant switched capacitor converter.

FIG. 19 is a time chart illustrating the operation in the second mode of the resonant switched capacitor converter 100. A pair of the first switch SW1 and the second switch SW2 is referred to as a reference phase, and a state in which the first switch SW1 is turned on and the second switch SW2 is turned off is defined as an H state, a state in which the first switch SW1 is turned off and the second switch SW2 is turned on is defined as an L state. A pair of the third switch SW3 and the fourth switch SW4 is referred to as a control phase, and a state in which the third switch SW3 is turned on and the fourth switch SW4 is turned off is defined as an H state, a state in which the third switch SW3 is turned off and the fourth switch SW4 is turned on is defined as an L state. FIG. 19 illustrates the coil current $I_L$ and the states of the reference phases SW1 and SW2 and the control phases SW3 and SW4.

The coil current $I_L$ hatched in the states II and IV is supplied to the load as an output current.

The area of the region of $I_L>0$ is the charging current to the flying capacitor C1, and the area of the region of $I_L<0$ is the discharging current to the flying capacitor C1. In the steady state, the area of the region of $I_L>0$ is equal to the area of the region of $I_L<0$.

When the limitation that the length of the state I is equal to the length of the state III and the length of the state II is equal to the length of the state IV is imposed, it is sufficient that the absolute values of the slopes of the coil currents $I_L$ in the state I and the state III are equal to each other and the absolute values of the slopes of the coil currents $I_L$ in the state II and the state IV are equal to each other. At this time, the following equation is obtained.

$$(V_{IN}-Vc)/L = |(-Vc)|/L$$

$$(V_{IN}-Vc-V_{OUT})/L = |(V_{OUT}-Vc)|/L$$

Solving this gives, in a steady state, $$Vc = V_{IN}/2$$

is established.

Hereinabove, the operation in the second mode of the resonant switched capacitor converter 100 has been described. In the state of FIG. 19, all transitions are zero voltage switching. Although the change amount $\Delta I_{L(I)}$ of the coil current $I_L$ in the state I and the change amount $\Delta I_{L(III)}$ of the coil current $I_L$ in the state III cause a ripple loss, the ripple loss can be suppressed by reducing the inductance of the inductor L1 to shorten the time. In addition, since the voltage Vc of the flying capacitor C1 becomes $V_{IN}/2$, the change amount $\Delta I_{L(II)}$ of the coil current $I_L$ in the state II and the change amount $\Delta I_{L(IV)}$ of the coil current $I_L$ in the state IV become very small, and the ripple loss also becomes a negligible level.

In the second mode, it is possible to perform phase shift control of switching the reference phases SW1 and SW2 and the control phases SW3 and SW4 at the same cycle T and changing the phase difference φd thereof.

Figure 20:
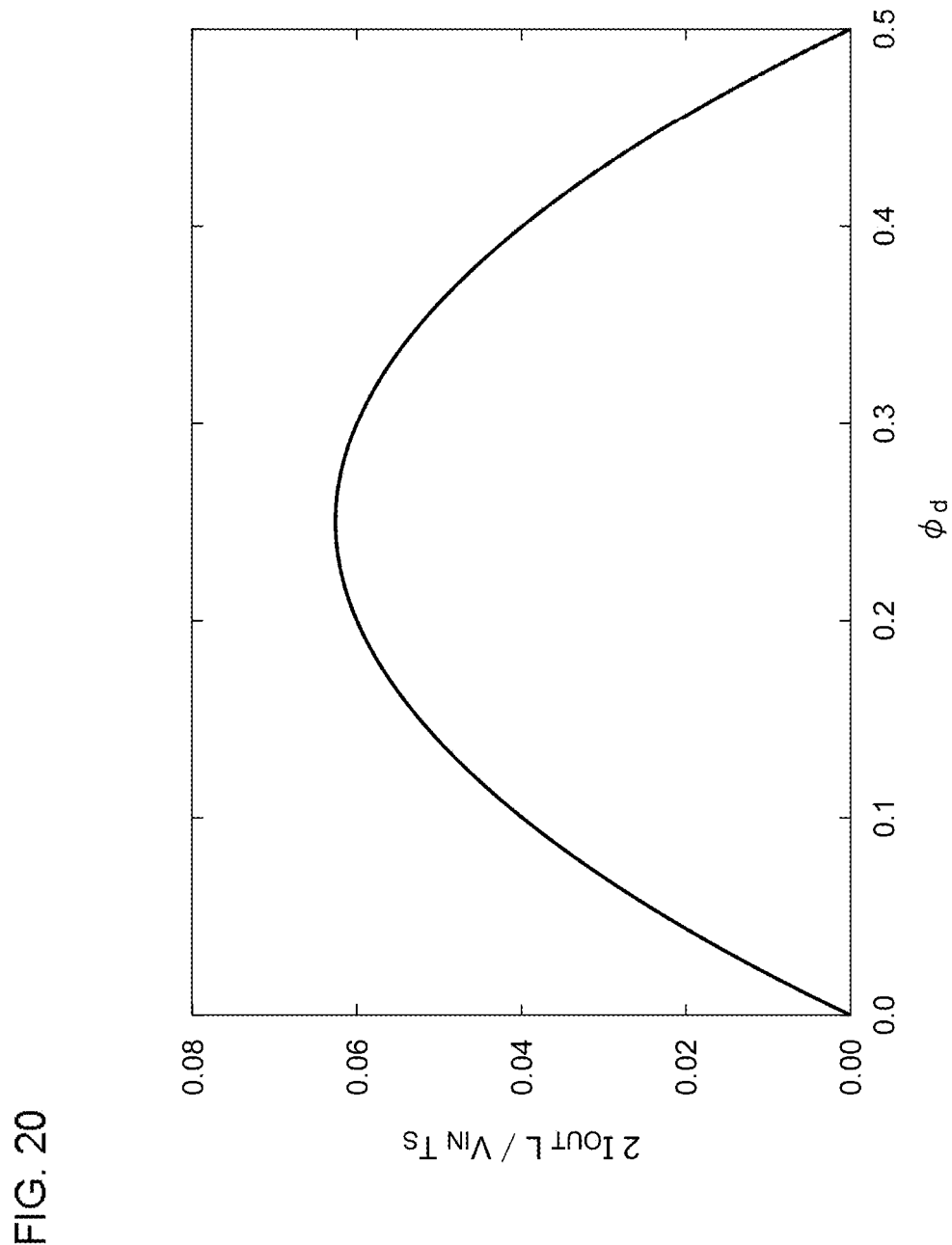
FIG. 20 is a diagram illustrating a relationship between a phase difference φd and an output current $I_{OUT}$.

FIG. 20 is a diagram illustrating a relationship between the phase difference φd and the output current $I_{OUT}$. By changing the phase difference φd, the output current $I_{OUT}$ can be controlled, and thus the output voltage $V_{OUT}$ can be changed in the vicinity of $V_{IN}/2$.

Figure 21:
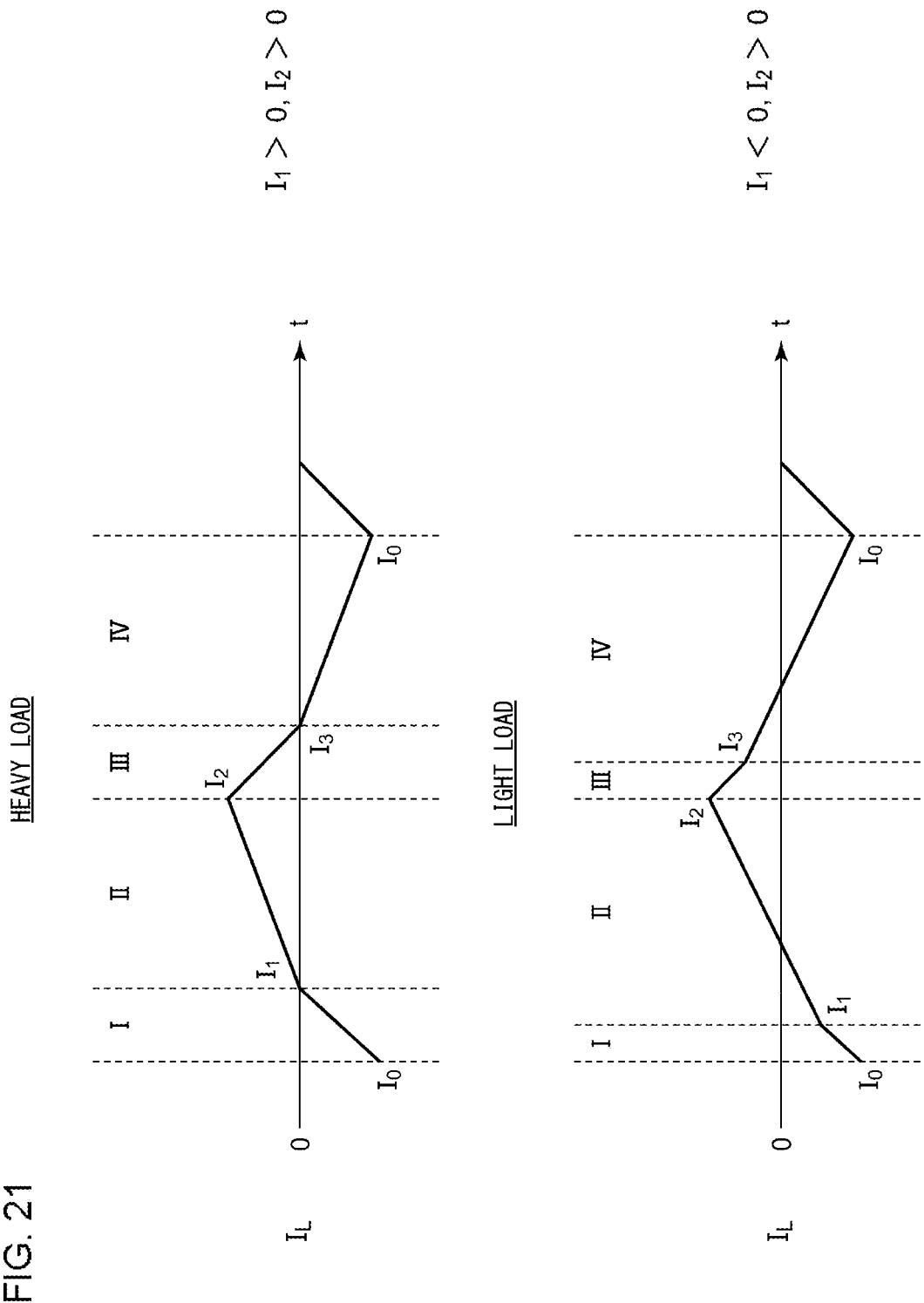
FIG. 21 is a waveform diagram of a coil current $I_L$ in a heavy load state and a light load state of the resonant switching converter during operation in the second mode.

FIG. 21 is a waveform diagram of the coil current $I_L$ in the heavy load state and the light load state of the resonant switching converter during operation in the second mode. As described above, in the second mode, zero voltage switching is possible, but for this purpose, both the coil current $I_1$ at the time of transition to the state II and the coil current $I_2$ at the time of transition to the state III need to be larger than 0. That is, $I_1>0$ and $I_2>0$ are zero voltage switching conditions. In the heavy load state, this condition is satisfied.

However, in the light load state $I_1<0$, the condition of the zero voltage switching is not satisfied, and the efficiency decreases. The first mode is selected in a light load state in which efficiency decreases in the second mode.

Hereinafter, the operation in the first mode will be described. As described above, the states φ1 to φ4 are repeated in the first mode.

Figure 22:
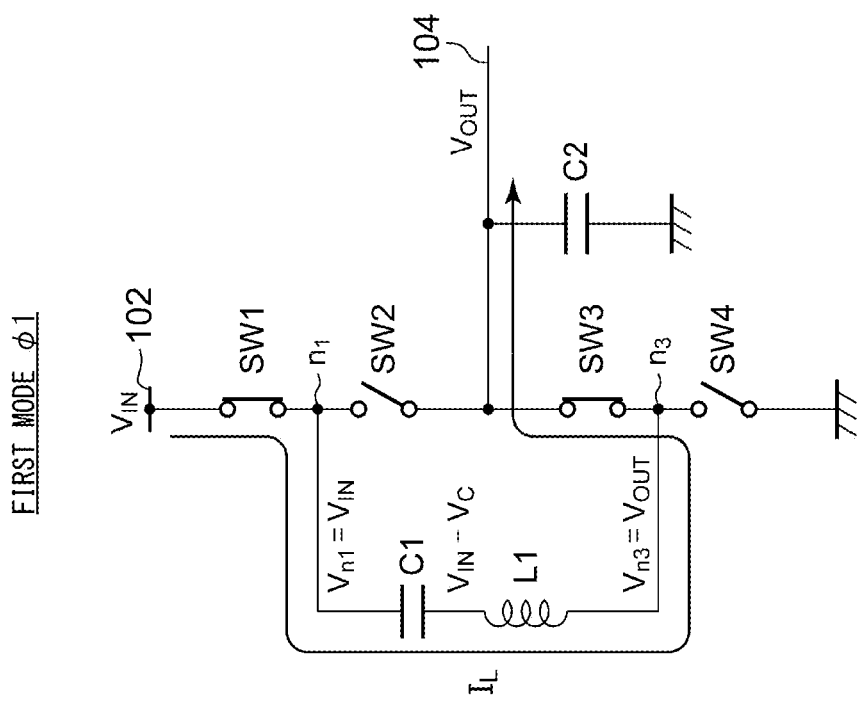
FIG. 22 is an equivalent circuit diagram in the state φ1 of the first mode of the resonant switched capacitor converter.

FIG. 22 is an equivalent circuit diagram in the state φ1 of the resonant switched capacitor converter 100. In the state φ1, Vn1=$V_{IN}$−Vc, and Vn3=$V_{OUT}$. When the voltage across the flying capacitor C1 is Vc, the voltage across the inductor L1 $\Delta V_{L(I)}$ is expressed as $\Delta V_{L(I)} = V_{IN} - Vc - V_{OUT}$.

Therefore, in the state I, the slope of the coil current $I_L$ flowing through the inductor L1 can be expressed as $$(V_{IN}-Vc-V_{OUT})/L.$$

Figure 23:
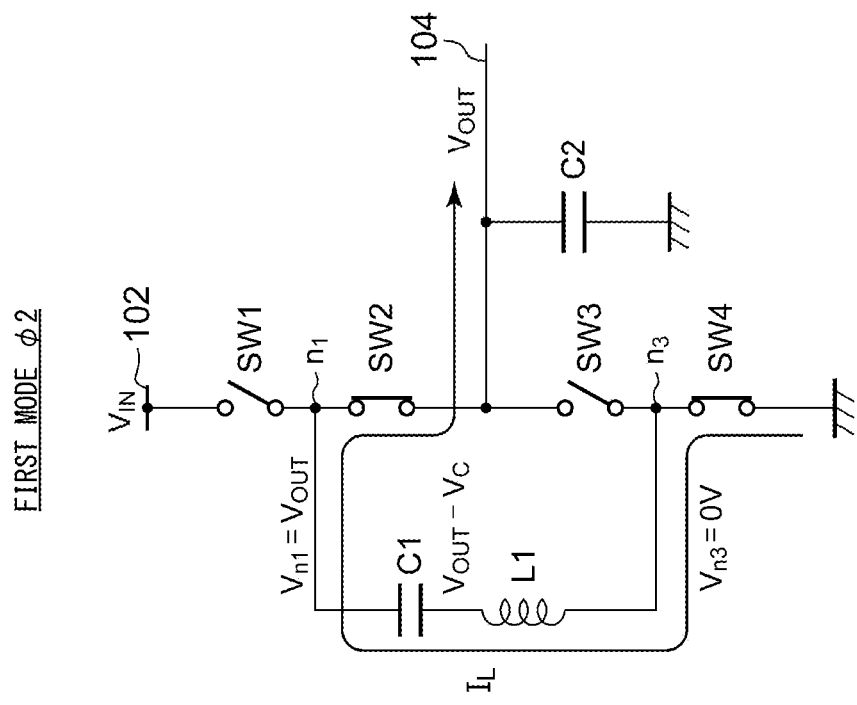
FIG. 23 is an equivalent circuit diagram in the state φ2 of the first mode of the resonant switched capacitor converter.

FIG. 23 is an equivalent circuit diagram in the state φ2 of the first mode of the resonant switched capacitor converter 100. In the state φ2, Vn1=$V_{OUT}$ and Vn3=0 V. When the voltage across the flying capacitor C1 is Vc, the voltage across the inductor L1 $\Delta V_{L(II)}$ is expressed as $$\Delta V_{L(II)} = V_{OUT} Vc.$$

Therefore, in the state φ2, the slope of the coil current $I_L$ flowing through the inductor L1 is expressed as $$(V_{OUT} Vc)/L.$$

Figure 24:
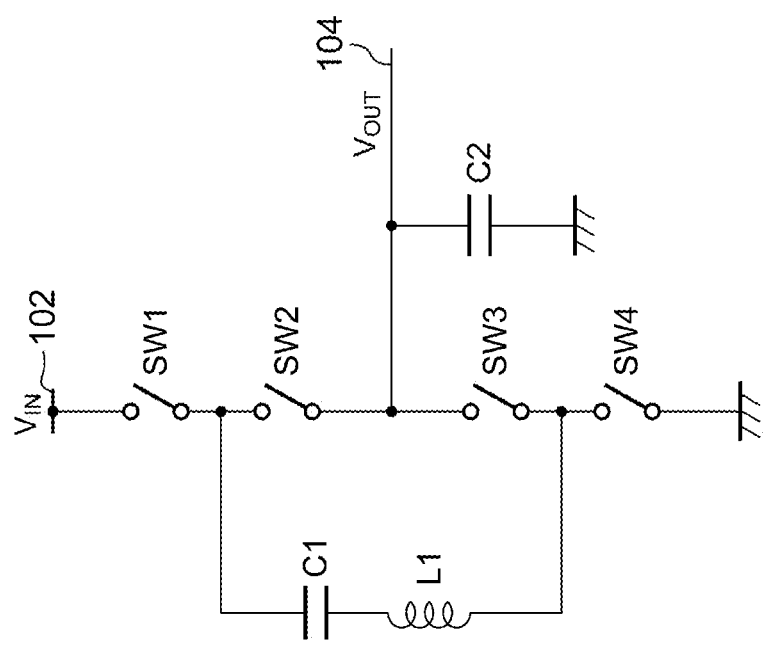
FIG. 24 is an equivalent circuit diagram in the state φ3 of the first mode of the resonant switched capacitor converter.

FIG. 24 is an equivalent circuit diagram in the state φ3 of the first mode of the resonant switched capacitor converter 100. In the state φ3, the switching nodes n1 and n3 have high impedance.

Figure 25:
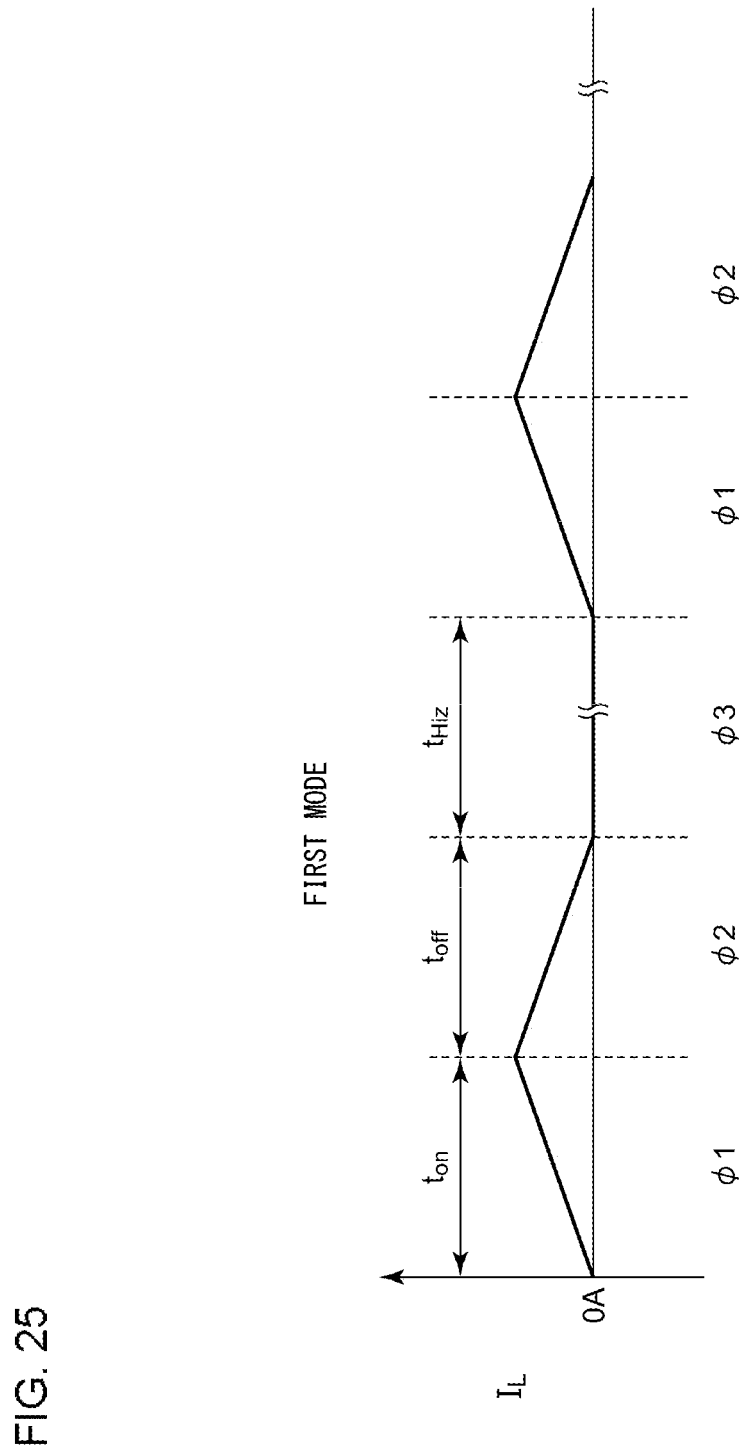
FIG. 25 is a time chart for explaining an operation in the first mode of the resonant switched capacitor converter.

FIG. 25 is a time chart illustrating the operation in the first mode of the resonant switched capacitor converter 100. FIG. 25 illustrates the coil current $I_L$. In the first state φ1, the change amount $\Delta I_{L(\varphi 1)}$ of the coil current $I_L$ is expressed by the following equation.

$$\Delta I_{L(\varphi 1)} = (V_{IN}-Vc-V_{OUT})/L \times t_{on}$$

In the subsequent second state φ2, the change amount $\Delta I_{L(\varphi 2)}$ of the coil current $I_L$ is expressed by the following equation.

$$\Delta I_{L(\varphi 2)} = (V_{OUT} - Vc)/L \times t_{off}$$

In the second state φ2, the coil current $I_L$ decreases to zero.

Then, the state transitions to the third state φ3. During the third state φ3, the coil current $I_L$ remains zero and does not change.

Hereinabove, the operation in the first mode has been described. In the first mode, it is possible to perform control to keep the output voltage $V_{OUT}$ constant by changing the length $t_{HiZ}$ of the third state φ3 according to the state of the load. In the light load state, when the length $t_{HiZ}$ of the third state φ3 increases, the switching frequency decreases, and the switching loss can also be reduced. As a result, the efficiency can be enhanced as compared with the case of operating in the second mode in the light load state.

Figure 26:
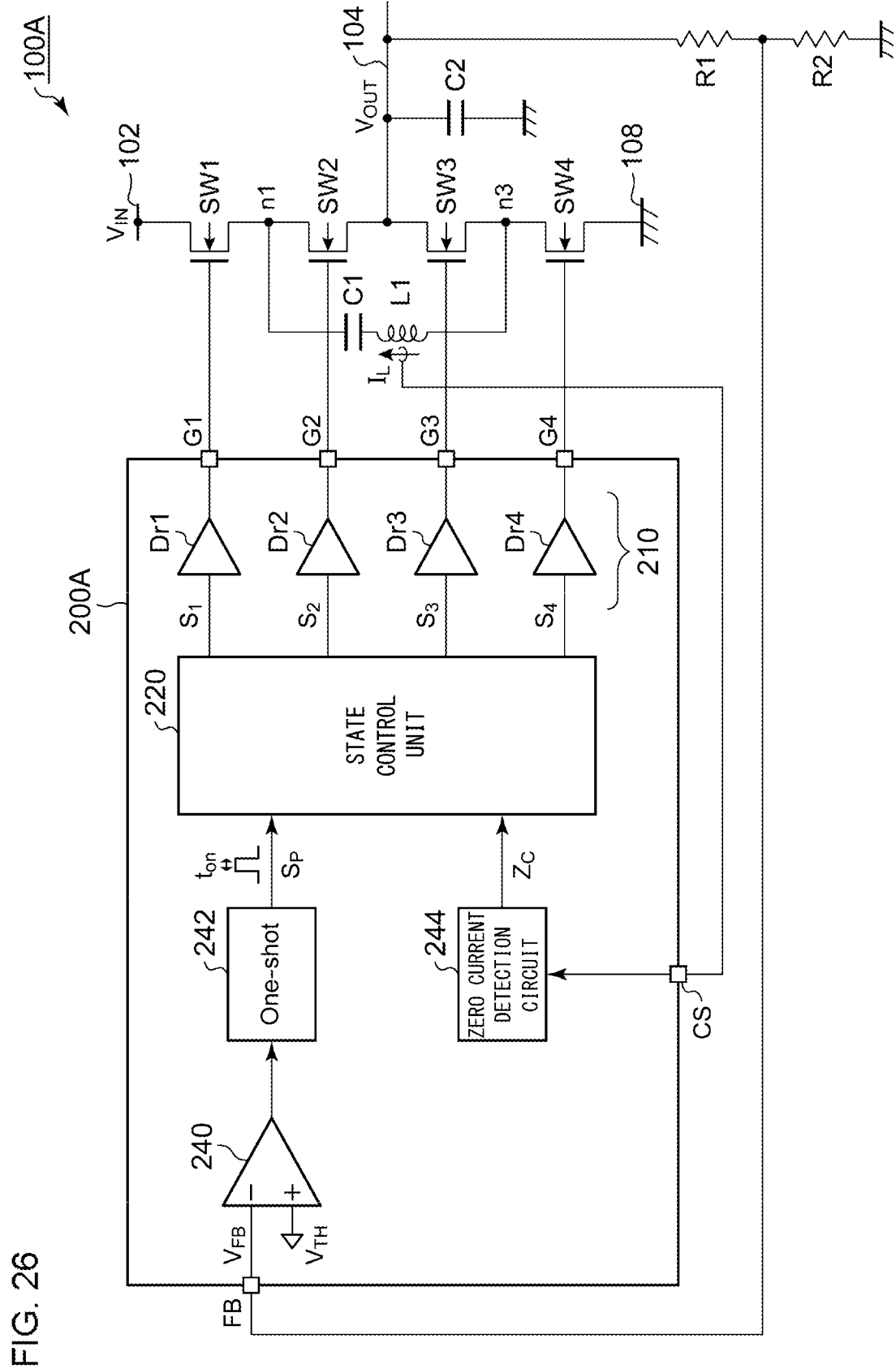
FIG. 26 is a circuit diagram illustrating a configuration example of a controller IC.

FIG. 26 is a circuit diagram illustrating a configuration example (200A) of the controller IC 200. FIG. 26 illustrates only a portion related to the first mode.

A feedback signal $V_{FB}$ corresponding to the output voltage $V_{OUT}$ is fed back to the feedback pin FB of the controller IC 200A. For example, a signal obtained by dividing the output voltage $V_{OUT}$ by the resistors R1 and R2 may be used as the feedback signal $V_{FB}$. Alternatively, the feedback pin FB may be directly connected to the output line 104, and the output voltage $V_{OUT}$ may be used as the feedback signal $V_{FB}$.

A comparator 240 compares the feedback signal $V_{FB}$ with the threshold voltage $V_{TH}$, and asserts the turn-on signal TURN_ON when the feedback signal $V_{FB}$ decreases to the threshold voltage $V_{TH}$. A one-shot circuit 242 outputs a pulse signal Sp that goes to a high level for a predetermined time with assertion of the turn-on signal TURN_ON as a trigger. The state control unit 220 enters the first state φ1 during the high section of the pulse signal Sp, and transitions to the second state φ2 when the pulse signal Sp transitions to low.

A current sense pin CS of the controller IC 200A is connected so as to be able to detect the zero-crossing of the coil current $I_L$ in the second state φ2 of the first mode. For example, when a sense resistor is provided on the path of the coil current $I_L$, the current sense pin CS is connected to the sense resistor. As illustrated in FIG. 23, in the second state φ2, the coil current $I_L$ flows through the switch SW4 and the switch SW2. Therefore, the zero-crossing of the coil current $I_L$ can be detected based on the voltage (drain-source voltage) across the switch SW4 or the switch SW4. Therefore, when monitoring the drain-source voltage of the fourth switch SW4, the current sense pin CS may be connected to the drain of the fourth switch SW4, that is, the switching node n3.

When the coil current $I_L$ becomes 0 in the second state φ2, a zero current detection circuit 244 asserts a zero-crossing detection signal ZC. In response to the assertion of the zero-crossing detection signal ZC, the state control unit 220 transitions to the third state φ3.

Figure 27:
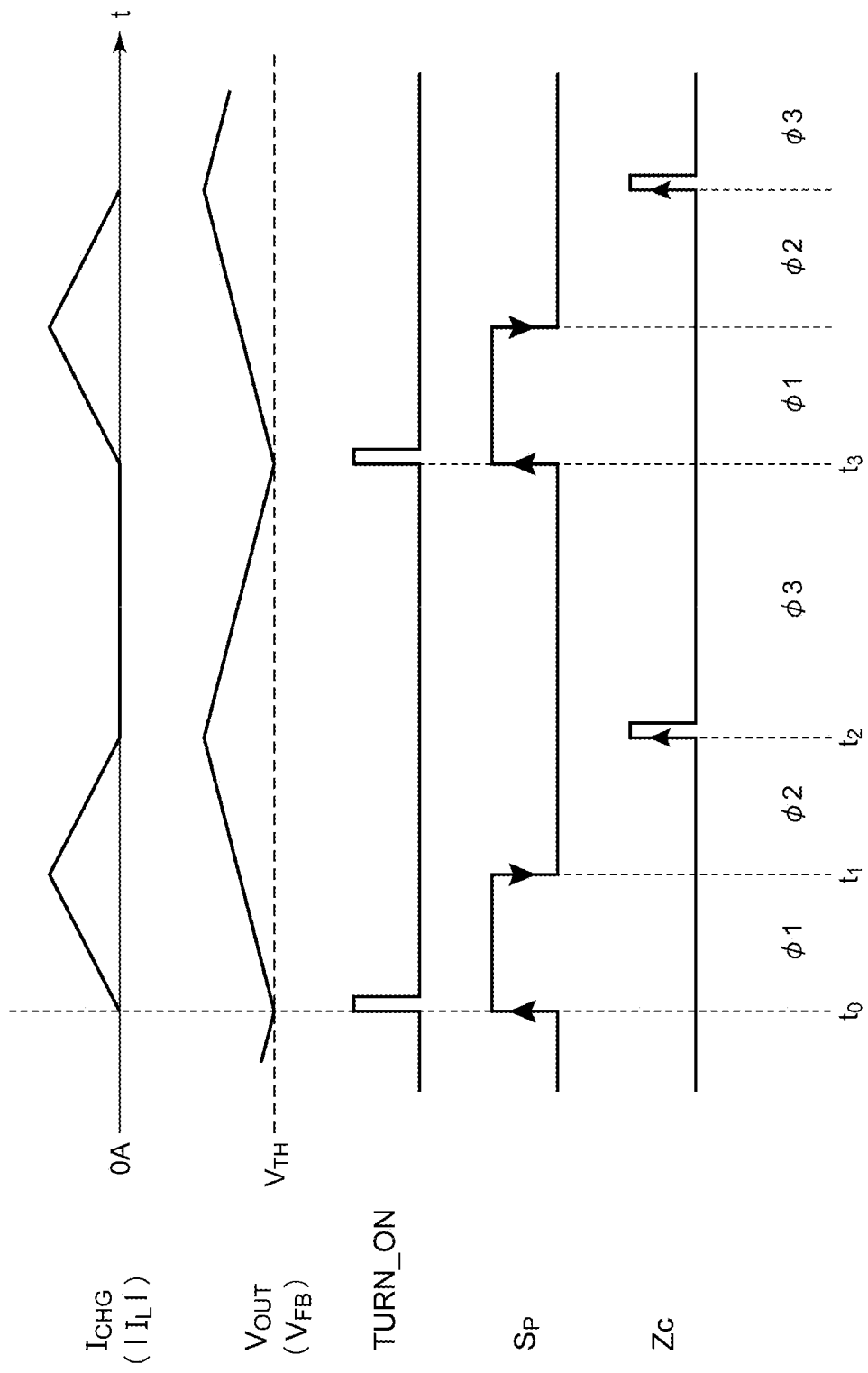
FIG. 27 is an operation waveform diagram of the controller of FIG. 26.

FIG. 27 is an operation waveform diagram of the controller IC 200A of FIG. 26. FIG. 27 illustrates a charging current $I_{CHG}$ to the output capacitor C2, an output voltage $V_{OUT}$, a turn-on signal TURN_ON, a pulse signal Sp, and a zero current detection signal ZC. The charging current $I_{CHG}$ to the output capacitor C2 corresponds to an absolute value of the coil current $I_L$.

The one-shot pulse Sp in the period from time $t_0$ to time $t_1$ is in the high period, the state transitions to the first state φ1, and the output current $I_{OUT}$ increases. Since the capacitor C2 is charged by the charging current $I_{CHG}$, the output voltage $V_{OUT}$ increases.

In the second state φ2, the charging current $I_{CHG}$ decreases. The output voltage $V_{OUT}$ also increases during the second state φ2. When the coil current $I_L$ becomes zero at time $t_2$, the zero current detection signal ZC is asserted, and the state transitions to the third state φ3. In the third state φ3, since the output capacitor C2 is discharged by the output current $I_{OUT}$, the output voltage $V_{OUT}$ slowly decreases. When the feedback signal $V_{FB}$ decreases to the threshold voltage $V_{TH}$ at time $t_3$, the turn-on signal TURN_ON is asserted, the pulse signal Sp becomes high, and the state returns to the first state φ1.

The controller IC 200A repeats the above-described operation. According to the controller IC 200A, the feedback signal $V_{FB}$ can be stabilized in the voltage range with the threshold voltage $V_{TH}$ as the lower limit.

Modification

A modification related to Embodiment 2 will be described.

In the embodiment, the controller IC 200 capable of switching between the first mode and the second mode has been described, but the present invention is not limited thereto. The controller IC 200 may be designed to operate only in the first mode. Alternatively, the controller IC 200 may be switchable between a third mode in which another control method different from the second mode is performed and the first mode.

In the embodiment, the plurality of switches SW1 to SW4 are configured by transistors, but some switches may be diodes.

Application

Figure 28:
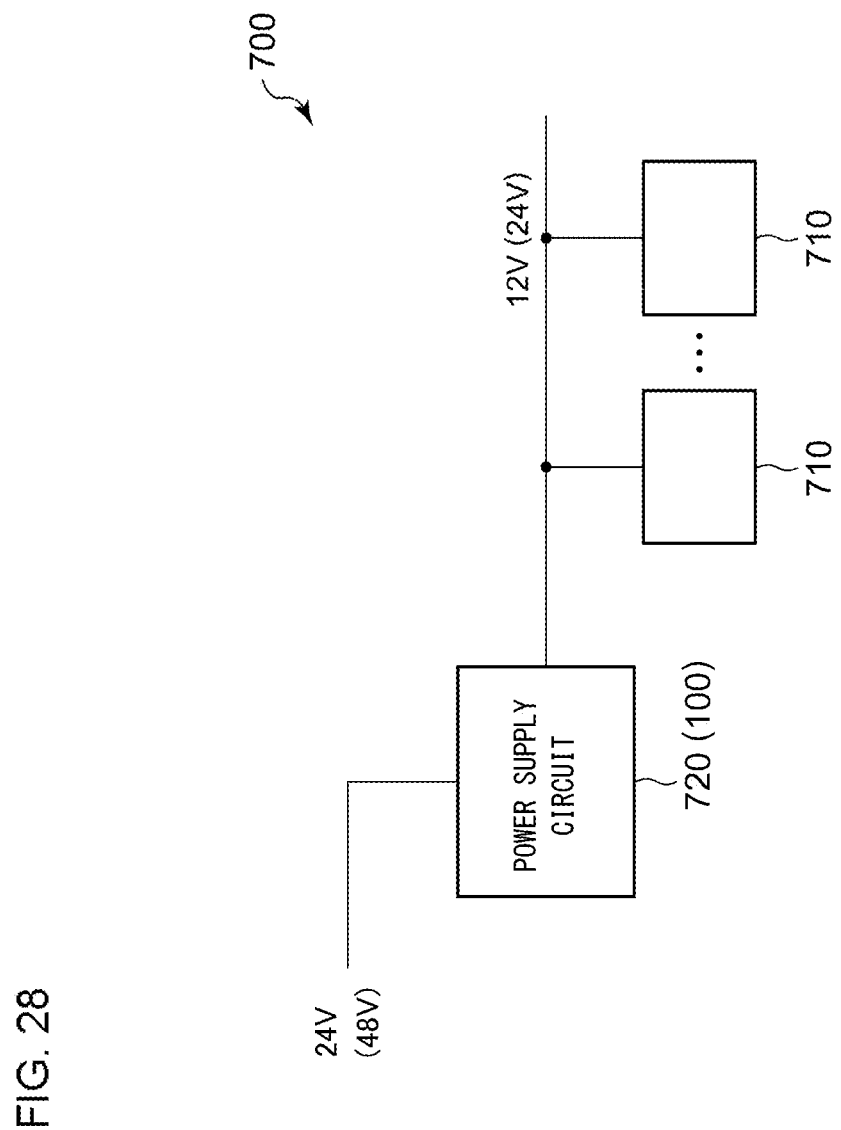
FIG. 28 is a view illustrating an example of an electronic device including the resonant switched capacitor converter.

FIG. 28 is a diagram illustrating an example of an electronic device 700 including the resonant switched capacitor converter 100. A preferred example of the electronic device 700 is a server. The server 700 includes an internal circuit 710 and a power supply circuit 720. The internal circuit 710 may include a central processing unit (CPU), a memory, an interface circuit of a local area network (LAN), a DC/DC converter that steps down a voltage of 12 V, and the like.

Some servers operate with a 24-V power supply, and the internal circuit 710 includes a block operating at 12 V. In this case, the power supply circuit 720 that steps down the power supply voltage of 24 V to 12 V is required. The above-described resonant switched capacitor converter 100 having the gain of ½ times can be suitably used for such a power supply circuit 720.

In addition, in recent years, in order to reduce the current flowing through an electric wire, a movement to reduce the power supply voltage to 48 V has been widened. In this case, in order to supply the power supply voltage to the internal circuit 710 operating at 24 V, the resonant switched capacitor converter 100 having the gain of ½ times can be suitably used. Alternatively, the resonant switched capacitor converters 100 according to the embodiment can be connected in series in two stages to generate a power supply voltage of 12 V and supply the generated power supply voltage to an internal circuit operating at 12 V.

The electronic device 700 is not limited to the server, and may be an in-vehicle device. A battery of a conventional automobile is mainly 12 V or 24 V, but a 48-V system may be adopted in a hybrid vehicle, and a power supply circuit that converts a battery voltage of 48 V into 24 V is also required in this case. In such a case, the resonant switched capacitor converter 100 having the gain of ½ times can be suitably used.

In addition, the electronic device 700 may be an industrial device, an office automation (OA) device, or a consumer device such as an audio device.

Embodiment 3

Figure 29:
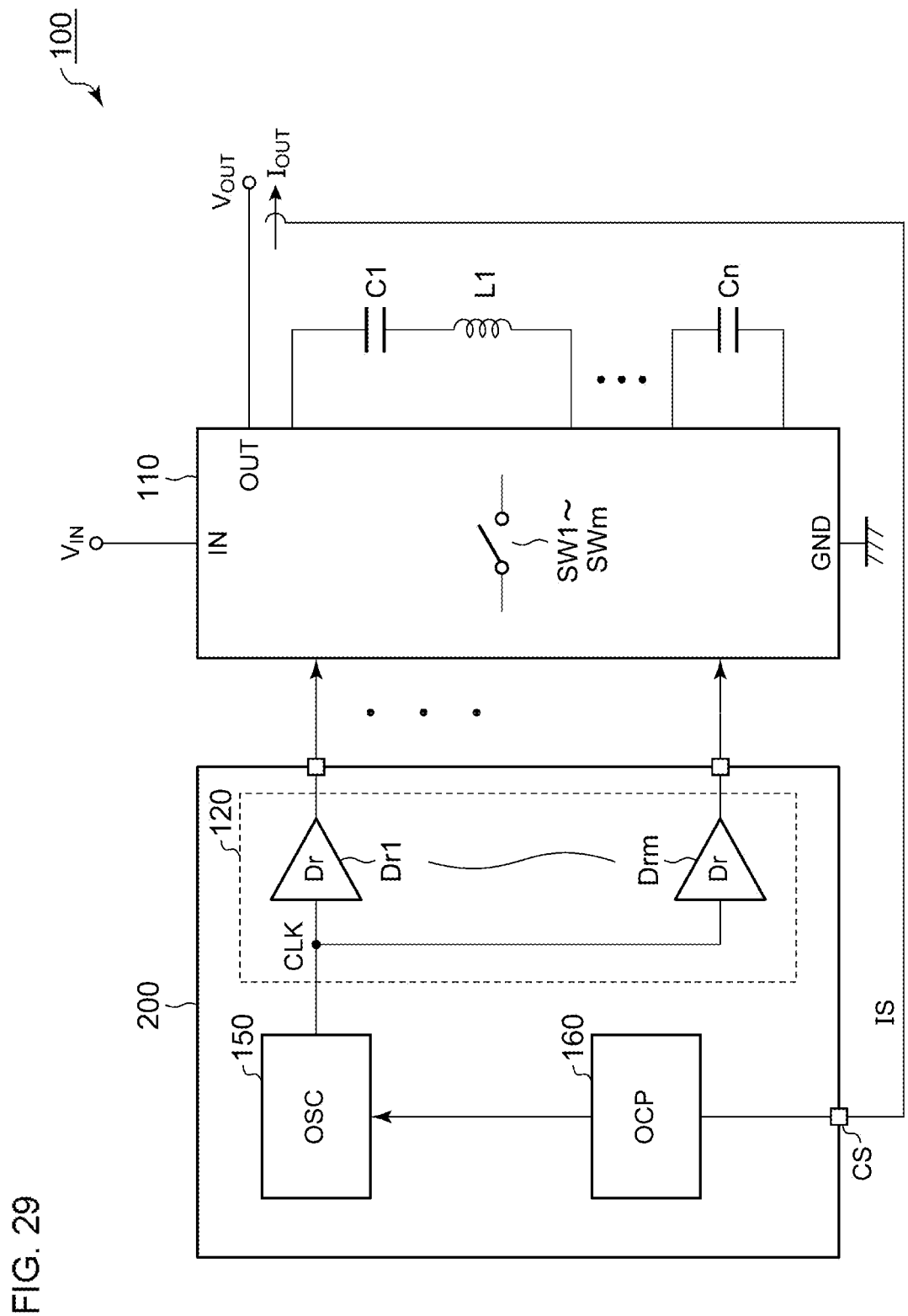
FIG. 29 is a circuit diagram of a resonant switched capacitor converter according to Embodiment 3.

FIG. 29 is a circuit diagram of a resonant switched capacitor converter 100 according to Embodiment 3. The resonant switched capacitor converter 100 includes at least one of capacitors C1 to Cn, an inductor L, a switch circuit 110, a drive circuit 120, an oscillator 150, and an overcurrent protection circuit 160. Among them, at least the drive circuit 120, the oscillator 150, and the overcurrent protection circuit 160 are integrated in one semiconductor chip (hereinafter, a controller integrated circuit (IC)) 200. The switch circuit 110 may be integrated in the controller IC 200.

The topology of the resonant switched capacitor converter 100 is not particularly limited, and the gain, that is, the voltage division ratio or the step-up ratio of the resonant switched capacitor converter 100 is also not particularly limited.

The inductor L1 is connected in series with one (flying capacitor) of the capacitors C1 to Cn to form an LC resonant circuit. A plurality of inductors may be provided corresponding to the plurality of flying capacitors.

The switch circuit 110 includes an input node IN, an output node OUT, a ground node GND, and a plurality of switches SW. An input voltage $V_{IN}$ of the resonant switched capacitor converter 100 is supplied to the input node IN, and an output voltage $V_{OUT}$ of the resonant switched capacitor converter 100 is generated in the output node OUT. The ground node GND is grounded.

The oscillator 150 generates a clock signal CLK. The resonant switched capacitor converter 100 performs switching in synchronization with the clock signal CLK. That is, the switching frequency of the resonant switched capacitor converter 100 is based on the frequency of the clock signal CLK (the oscillation frequency of the oscillator 150). For example, the oscillation frequency of the oscillator 150 may be fixed at or near the resonant frequency $\omega_0$ of the resonant switched capacitor converter 100. Alternatively, as will be described later, the oscillation frequency of the oscillator 150 may be feedback-controlled according to the output voltage $V_{OUT}$.

The drive circuit 120 drives the plurality of switches SW1 to SWm constituting the switch circuit 110 in synchronization with the clock signal CLK. The drive circuit 120 includes drivers Dr1 to Drm corresponding to the plurality of switches SW1 to SWm.

A current detection signal IS indicating the output current $I_{OUT}$ of the resonant switched capacitor converter 100 is input to the current sense pin CS of the controller IC 200. For example, the sense resistor $R_{CS}$ may be inserted on the path of the output current $I_{OUT}$, and the voltage (voltage drop) thereacross may be input to the current sense pin CS as the current detection signal IS.

The overcurrent protection circuit 160 detects an overcurrent state of the resonant switched capacitor converter 100 based on the current detection signal IS. For example, the overcurrent protection circuit 160 may determine that the current detection signal IS is in the overcurrent state when the current detection signal IS exceeds a predetermined threshold. When detecting the overcurrent state, the overcurrent protection circuit 160 changes the frequency of the clock signal CLK generated by the oscillator 150 in a direction away from the resonant frequency.

The resonant switched capacitor converter 100 is configured as described above. Next, the operation will be described.

Figure 30:
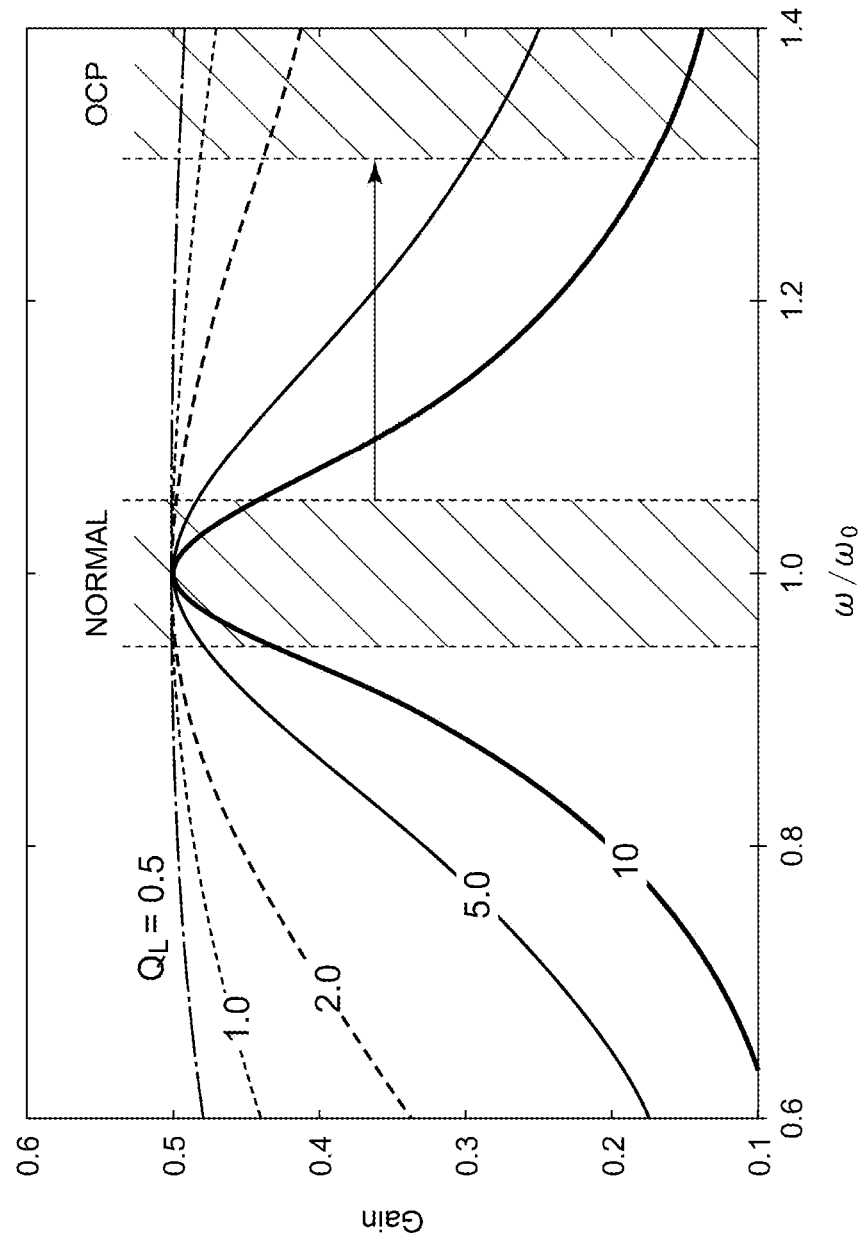
FIG. 30 is a view illustrating a relationship between a gain and a switching frequency ω of the resonant switched capacitor converter.

FIG. 30 is a diagram illustrating a relationship between a gain and a switching frequency ω of the resonant switched capacitor converter 100. Here, a switched capacitor converter having the gain of ½ times will be described as an example. A characteristic of the switched capacitor converter is expressed by the following equation.

$$G = \frac{V_{out}}{V_{in}} = \frac{1}{\sqrt{4 + Q_L^2 \left( \frac{\omega}{\omega_0} - \frac{\omega_0}{\omega} \right)^2}}$$

$$Q_L = \frac{\omega_0 L_r}{R} = \frac{1}{\omega_0 C_r R} = \frac{Z_0}{R}$$

$$\omega_0 = 2\pi f_r = \frac{1}{\sqrt{L_r C_r}}$$

$$Z_0 = \omega_0 L_r = \frac{1}{\omega_0 C_r} = \sqrt{\frac{L_r}{C_r}}$$

$\omega_0$ is a resonant frequency, and when the switching frequency ω coincides with the resonant frequency $\omega_0$, the gain G becomes a maximum value of ½, and decreases as deviating therefrom.

R represents the impedance of the load of the resonant switched capacitor converter 100. $Q_L$ is a Q value of the circuit, and $Z_0$ is a characteristic impedance.

When a heavy load is applied (when R decreases), the Q value increases, and the gain drop when the switching frequency ω deviates from the resonant frequency $\omega_0$ increases.

For example, in the steady state (non-overcurrent state), the oscillation frequency of the oscillator 150 is determined in a hatched region (NORMAL) near the resonant frequency $\omega_0$, and the gain of the resonant switched capacitor converter 100 is close to ½. At this time, the resonant switched capacitor converter 100 generates the output voltage $V_{OUT}$ that is ½ times the input voltage $V_{IN}$.

When the overcurrent state is detected by the overcurrent protection circuit 160, the oscillation frequency of the oscillator 150 is changed in a direction away from the resonant frequency $\omega_0$. In the example of FIG. 30, the resonant frequency $\omega_0$ is increased to a region denoted as OCP. As a result, the gain of the oscillator 150 can be reduced from ½. As a result, the output voltage $V_{OUT}$ of the resonant switched capacitor converter 100 can be reduced, and the output current $I_{OUT}$ can be reduced. In the overcurrent state, the switching frequency may be changed in a direction lower than the resonant frequency $\omega_0$.

The present disclosure extends to various devices and methods understood as the block diagram or the circuit diagram of FIG. 29 or derived from the above-described description, and is not limited to a specific configuration. Hereinafter, more specific configuration examples and examples will be described in order not to narrow the scope of the present disclosure but to help understanding of the essence and operation of the present disclosure and the present invention and to clarify them.

Example 3.1

Figure 31:
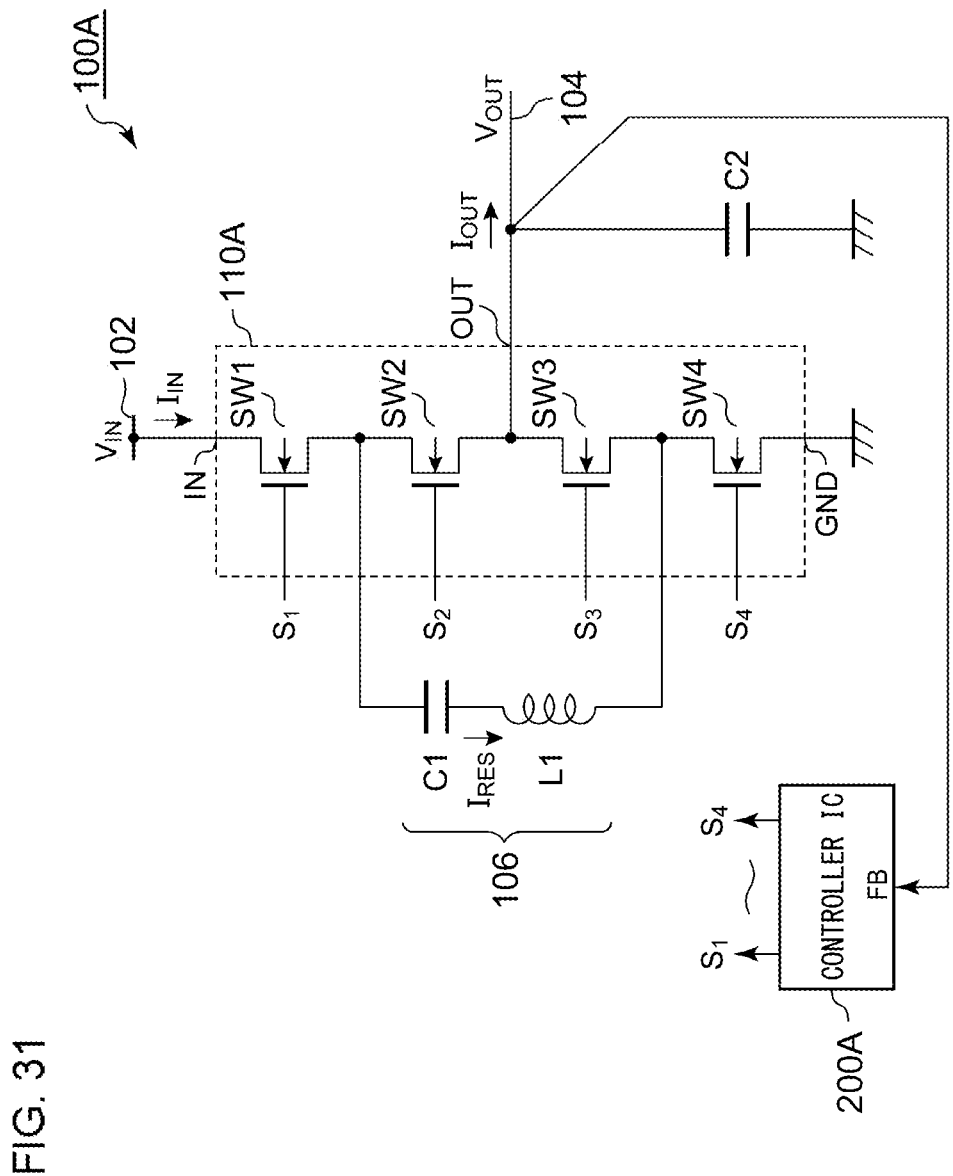
FIG. 31 is a circuit diagram of a resonant switched capacitor converter according to Example 3.1.

FIG. 31 is a circuit diagram of a resonant switched capacitor converter 100A according to Example 3.1. The resonant switched capacitor converter 100A has a gain of ½ times, steps down the input voltage $V_{IN}$ of an input line 102 by ½ times, and generates an output voltage $V_{OUT}=V_{IN}/2$ in an output line 104. The resonant switched capacitor converter 100A includes two capacitors C1 and C2, one inductor L1, and a controller IC 200A. The switch circuit 110A includes switches SW1 to SW4. The resonant switched capacitor converter 100A has a configuration in which an inductor is added in series with a flying capacitor of a charge pump having the gain of ½ times.

The switches SW1 to SW4 are driven by the controller IC 200A. In this example, the plurality of switches SW1 to SW4 are N-channel MOSFETs (Metal Oxide Semiconductor Field Effect Transistor). The drive signal of the i-th switch SWi is expressed as $S_i$. When $S_i$ is H (high), the switch SWi is turned on. When $S_i$ is L (low), the switch SWi is turned off.

The resonant switched capacitor converter 100A can switch between the first state φ1 and the second state φ2. In the first state φ1, the first switch SW1 and the third switch SW3 are turned on, and the second switch SW2 and the fourth switch SW4 are turned off. At this time, an LC resonant circuit 106 including the capacitor C1 and the inductor L1 and the capacitor C2 are connected in series, and the input voltage $V_{IN}$ is applied thereacross. When C1=C2, the voltage across the capacitors C1 and C2 is charged to $V_{IN}/2$.

In the second state φ2, the first switch SW1 and the third switch SW3 are turned off, and the second switch SW2 and the fourth switch SW4 are turned on. At this time, the LC resonant circuit 106 including the capacitor C1 and the inductor L1 and the capacitor C2 are connected in parallel, and $V_{OUT}=V_{IN}/2$ is generated in the output line 104.

Figure 32:
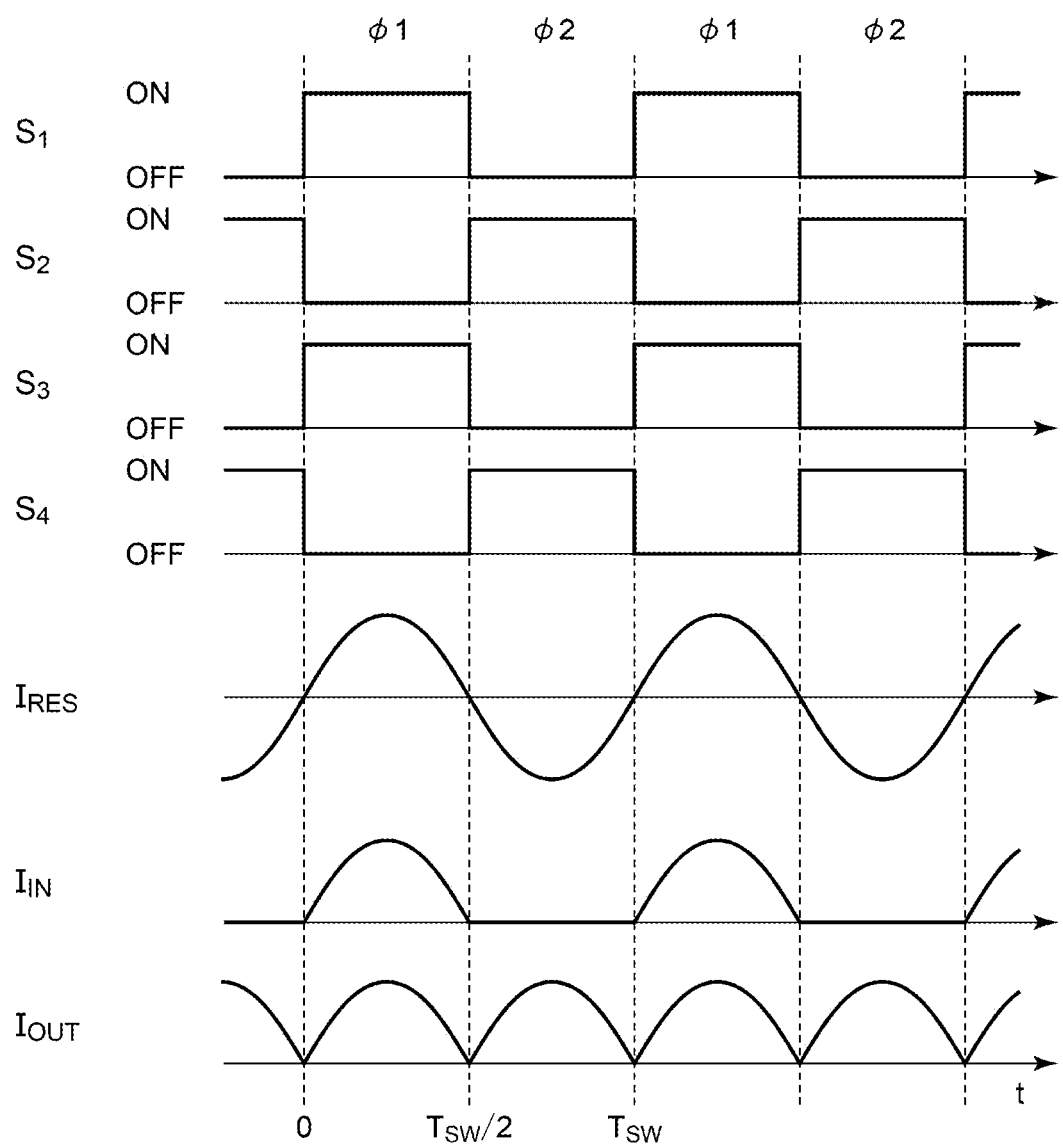
FIG. 32 is a time chart for explaining an operation of the resonant switched capacitor converter.

FIG. 32 is a time chart for explaining an operation of the resonant switched capacitor converter 100A. FIG. 32 illustrates the drive signals $S_1$ to $S_4$, the resonant current $I_{RES}$ flowing through the LC resonant circuit 106, the input current $I_{in}$, and the output current $I_{OUT}$.

When the frequency (resonant frequency) of the resonant current $I_{RES}$ coincides with the switching frequency, the zero current switching (soft switching) state is realized, so that a highly efficient operation can be performed. $T_{SW}$ is a switching cycle, which is a cycle of the clock CLK generated in the controller IC 200A, and represents the reciprocal of the switching frequency.

Next, a configuration of the controller IC 200A will be described.

Figure 33:
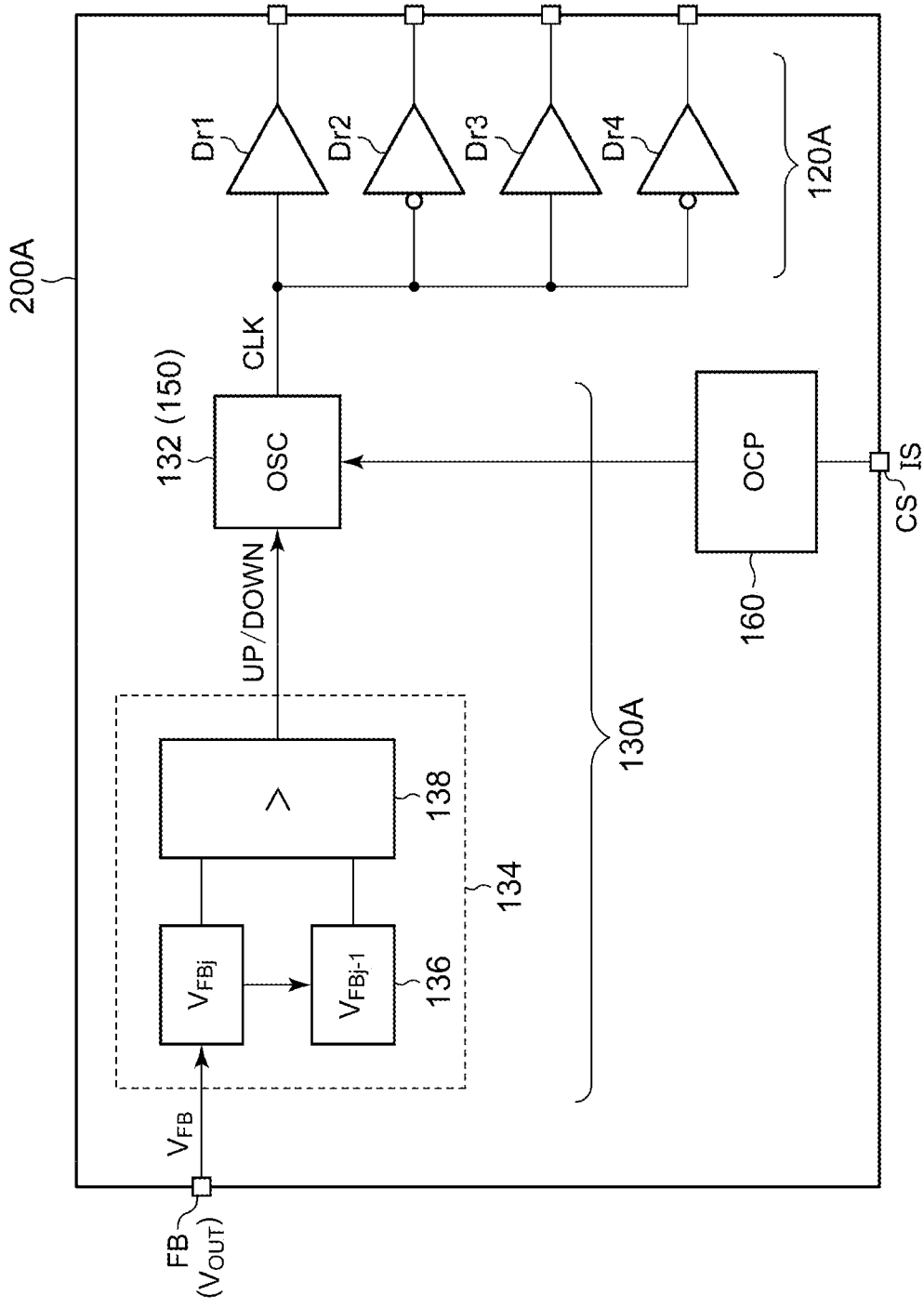
FIG. 33 is a circuit diagram of a controller IC according to Example 3.1.

FIG. 33 is a circuit diagram of a controller IC 200A according to Example 3.1. The controller IC 200A includes a drive circuit 120A, a frequency controller 130A, and an overcurrent protection circuit 160. The drive circuit 120A includes four drivers Dr1 to Dr4 corresponding to the four switches SW1 to SW4. The drivers Dr1 and Dr3 operate in the same phase as the clock CLK, and the drivers Dr2 and Dr4 operate in the opposite phase to the clock CLK.

The frequency controller 130A includes a frequency variable oscillator 132 and a frequency adjusting unit 134. The frequency variable oscillator 132 corresponds to the oscillator 150 of FIG. 29. In the steady state, the frequency adjusting unit 134 adaptively controls the frequency of the frequency variable oscillator 132 based on the feedback voltage $V_{FB}$ (output voltage $V_{OUT}$) input to the feedback pin FB.

Specifically, the frequency adjusting unit 134 controls the frequency of the frequency variable oscillator 132 for each frequency control cycle j so that the output voltage $V_{OUT}$ approaches the maximum value. The frequency adjusting unit 134 is configured to be able to compare the current value $V_{FBj}$ of the feedback voltage $V_{FB}$ with the past value $V_{FB(j-1)}$ of the feedback voltage $V_{FB}$. The frequency adjusting unit 134 includes a storage unit 136 such as a sample hold circuit or a memory that holds the past value $V_{FBj-1}$ of the feedback voltage $V_{FB}$, and a comparison circuit 138.

In a certain frequency control cycle j, the frequency adjusting unit 134 changes the switching frequency, that is, the frequency of the frequency variable oscillator 132, in the first direction (for example, the rising direction). The resultant feedback voltage $V_{FBj}$ and the past feedback voltage $V_{FBj-1}$ are compared by the comparison circuit 138. As a result of the comparison, when the output voltage $V_{OUT}$ (feedback voltage $V_{FB}$) increases, the frequency of the frequency variable oscillator 132 is changed in the first direction (rising direction) also in the next frequency control cycle j+1. Conversely, when the output voltage $V_{OUT}$ (feedback voltage $V_{FB}$) decreases, the frequency of the frequency variable oscillator 132 is changed in a second direction (descending direction) opposite to the first direction in the next frequency control cycle j+1. The current value $V_{FBj}$ in the frequency control cycle j is the past value $V_{FBj}$ in the next frequency control cycle j+1.

The frequency adjusting unit 134 can maximize the output voltage $V_{OUT}$ by repeating this frequency control cycle. As can be seen from FIG. 30, when the output voltage $V_{OUT}$ takes a maximum value, since the switching frequency ω and the resonant frequency $ω_0$ coincide with each other, zero current switching can be performed, and efficiency can be increased.

When the overcurrent detection signal OCP is asserted by the overcurrent protection circuit 160, the operation of the frequency adjusting unit 134 is stopped, and the frequency of the frequency variable oscillator 132 is set to a predetermined frequency $ω_{OCP}$ away from the resonant frequency $ω_0$. As a result, overcurrent protection can be applied.

Example 3.2

Figure 34:
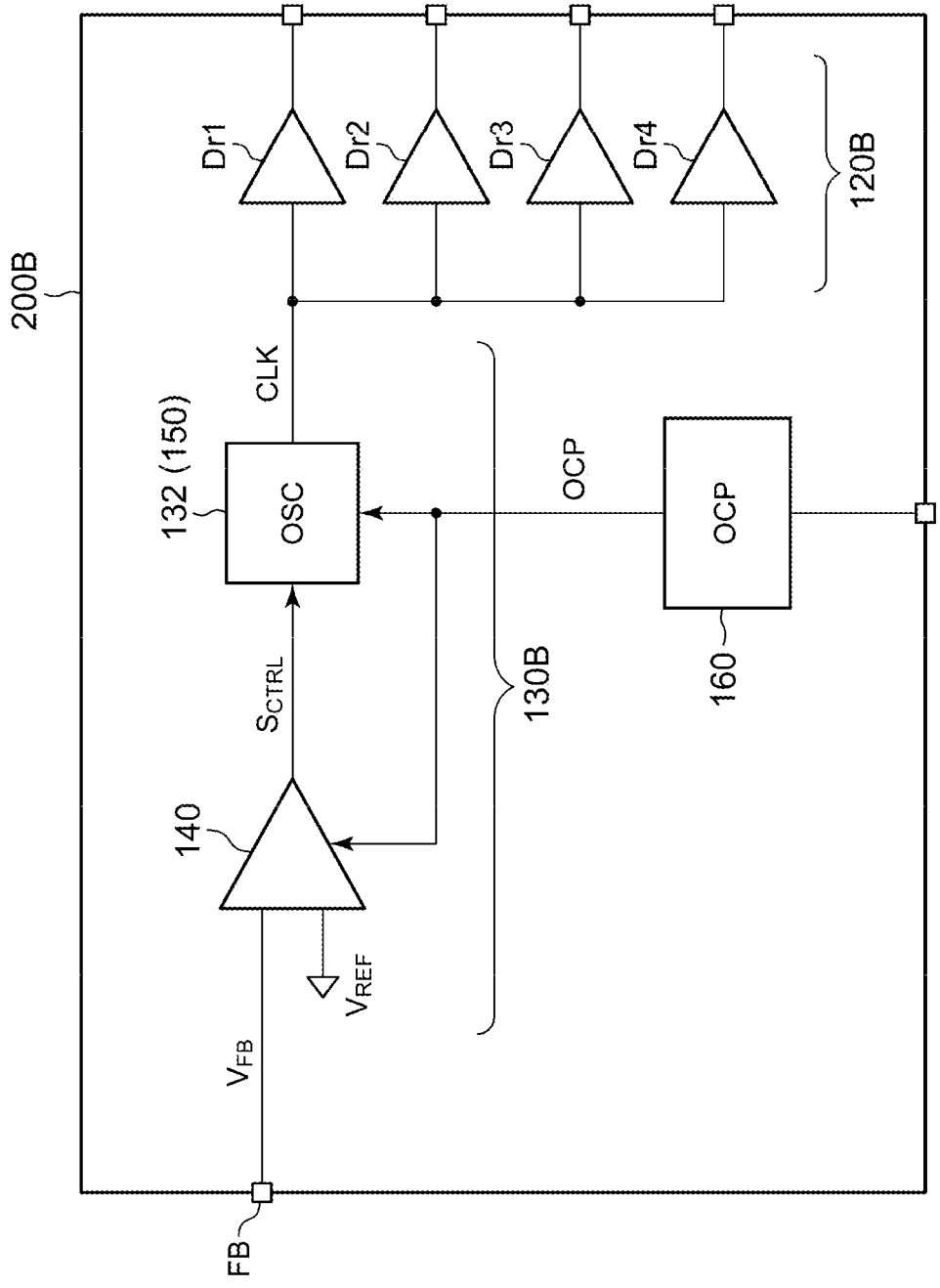
FIG. 34 is a circuit diagram of a controller IC according to Example 3.2.

FIG. 34 is a circuit diagram of a controller IC 200B according to Example 3.2. The controller IC 200B can be used as an alternative to the controller IC 200A in the resonant switched capacitor converter 100A of FIG. 31.

The controller IC 200B includes a drive circuit 120B, a frequency controller 130B, and an overcurrent protection circuit 160. The configuration of the drive circuit 120B is similar to that of the drive circuit 120A in FIG. 33.

The frequency controller 130B includes a frequency variable oscillator 132 and a feedback circuit 140.

The frequency variable oscillator 132 is a voltage controlled oscillator (VCO) or a digital controlled oscillator (DCO), and oscillates at a frequency corresponding to the signal level of a control signal $S_{CTRL}$. The frequency variable oscillator 132 corresponds to the oscillator 150 of FIG. 29.

A reference voltage $V_{REF}$ that defines a target level $V_{OUT(REF)}$ of the output voltage $V_{OUT}$ is input to the feedback circuit 140. When the output voltage $V_{OUT}$ is directly set to the feedback voltage $V_{FB}$, the target level $V_{OUT(REF)}$ of the output voltage $V_{OUT}$ becomes the reference voltage $V_{REF}$.

In the steady state, the feedback circuit 140 controls the frequency of the frequency variable oscillator 132 within a range in which $\omega > \omega_0$ holds. Since the resonant switched capacitor converter 100A operates in the range of $\omega > \omega_0$, it operates in a region where the gain is smaller than ½, and the target level $V_{OUT(REF)}$ of the output voltage $V_{OUT}$ is determined to be lower than $V_{IN}/2$.

The feedback circuit 140 controls the frequency of the frequency variable oscillator 132 such that an error between the feedback voltage $V_{FB}$ and the reference voltage $V_{REF}$ approaches 0. The feedback circuit 140 can be configured by an analog circuit or a digital circuit. For example, the feedback circuit 140 includes an error amplifier that amplifies an error between the feedback voltage $V_{FB}$ and the reference voltage $V_{REF}$, and supplies a control signal $S_{CTRL}$ based on an output of the error amplifier to the frequency variable oscillator 132. Alternatively, the feedback circuit 140 may be configured by a digital circuit including a proportional-integral (PI) controller or a proportional-integral-derivative (PID) controller.

Figure 35:
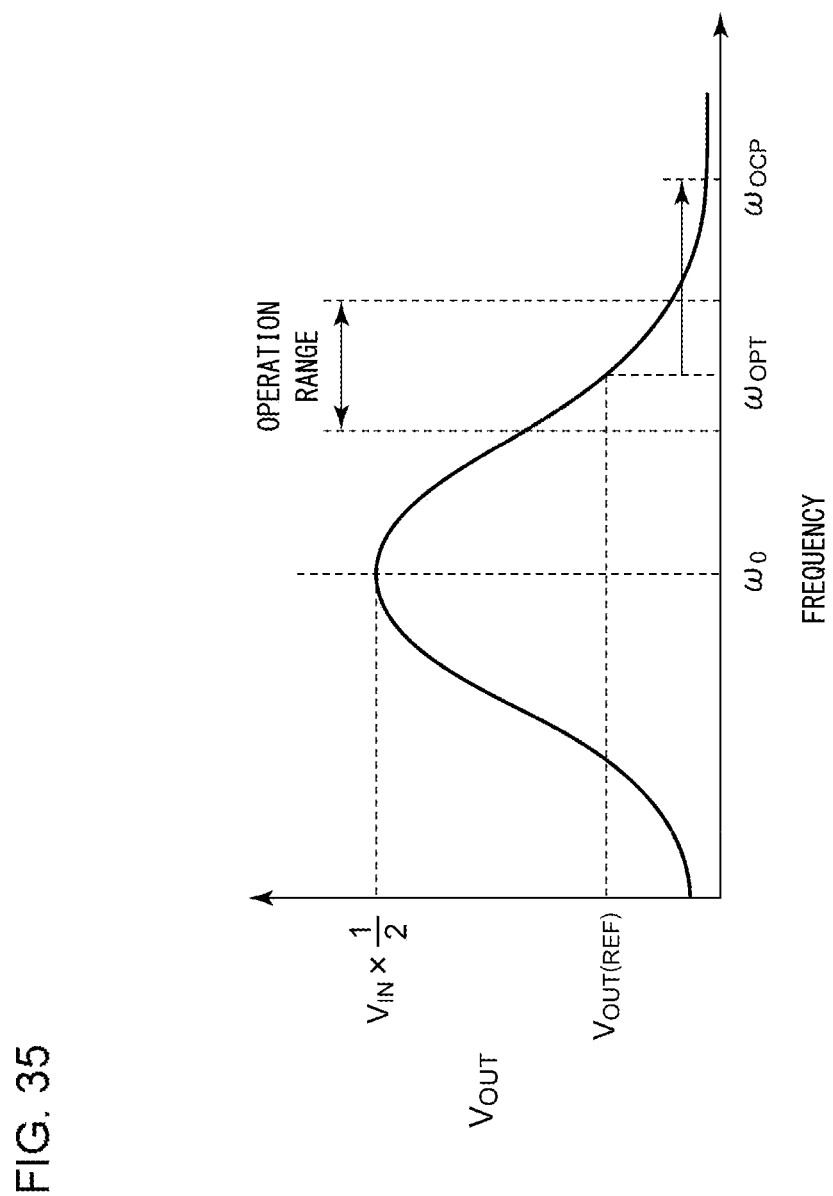
FIG. 35 is a diagram for explaining an operation of the frequency controller of FIG. 34.

FIG. 35 is a diagram for explaining the operation of the frequency controller 130B of FIG. 34. The operating range of the resonant switched capacitor converter 100A is limited to a range of $\omega > \omega_0$ within which the target level $V_{OUT(REF)}$ of the output voltage $V_{OUT}$ is determined.

As a result of the feedback control of the frequency controller 130B, the frequency of the frequency variable oscillator 132, that is, the switching frequency $\omega$ of the resonant switched capacitor converter 100A is stabilized to an optimum frequency $\omega_{OPT}$ where $V_{OUT}=V_{OUT(REF)}$.

When the overcurrent state is detected by the overcurrent protection circuit 160, the feedback control by the feedback circuit 140 is stopped, and the frequency of the frequency variable oscillator 132 is set to a predetermined frequency $\omega_{OCP}$ determined to be higher than the operation range. As a result, overcurrent protection can be applied.

The controller IC 200B operates as described above. In Example 3.1, the zero current switching is realized by operating at $\omega = \omega_0$, whereas in Example 3.2, the zero voltage switching can be realized by operating at $\omega > \omega_0$, whereby the highly efficient operation can be realized.

In Example 3.1, since the output voltage $V_{OUT}$ is stabilized at a voltage level of ½ of the input voltage $V_{IN}$, when the input voltage $V_{IN}$ fluctuates, the output voltage $V_{OUT}$ also fluctuates. On the other hand, according to Example 3.2, even if the input voltage $V_{IN}$ fluctuates, the output voltage $V_{OUT}$ can be stabilized at the target level determined according to the reference voltage $V_{REF}$.

Example 3.3

Figure 36:
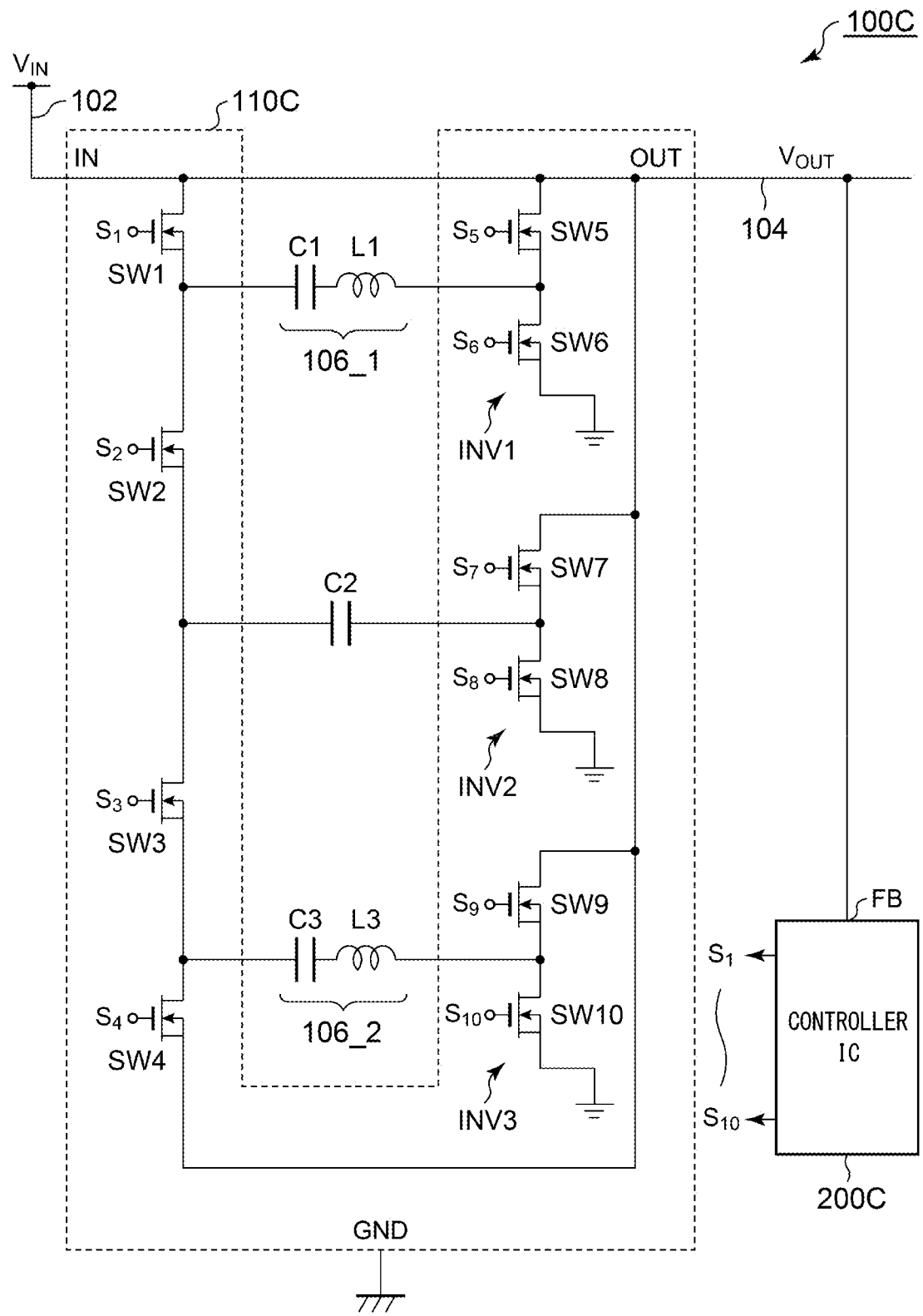
FIG. 36 is a circuit diagram of a resonant switched capacitor converter according to Example 3.3.

FIG. 36 is a circuit diagram of a resonant switched capacitor converter 100C according to Example 3.3. The resonant switched capacitor converter 100C is a switched tank converter, has a gain of ¼ times, steps down an input voltage $V_{IN}$ of the input line 102 by ¼ times, and generates an output voltage $V_{OUT}=V_{IN}/4$ in the output line 104.

The resonant switched capacitor converter 100C includes three capacitors C1 to C3, two inductors L1 and L3, and a controller IC 200C. The switch circuit 110C includes switches SW1 to SW10. The resonant switched capacitor converter 100C has a configuration in which the inductors L1 and L3 are added to a Dixon-type charge pump (switched tank converter).

The first switch SW1 to the fourth switch SW4 are N-channel MOSFETs, and are connected in series between the input terminal IN and the output terminal OUT.

A pair of the fifth switch SW5 and the sixth switch SW6, a pair of the seventh switch SW7 and the eighth switch SW8, and a pair of the ninth switch SW9 and the tenth switch SW10 constitute inverters INV1 to INV3, respectively.

The switches SW1 to SW10 are driven by the controller IC 200C. The controller IC 200C can be configured similarly to the controller IC 200A and the controller IC 200B.

Figure 37:
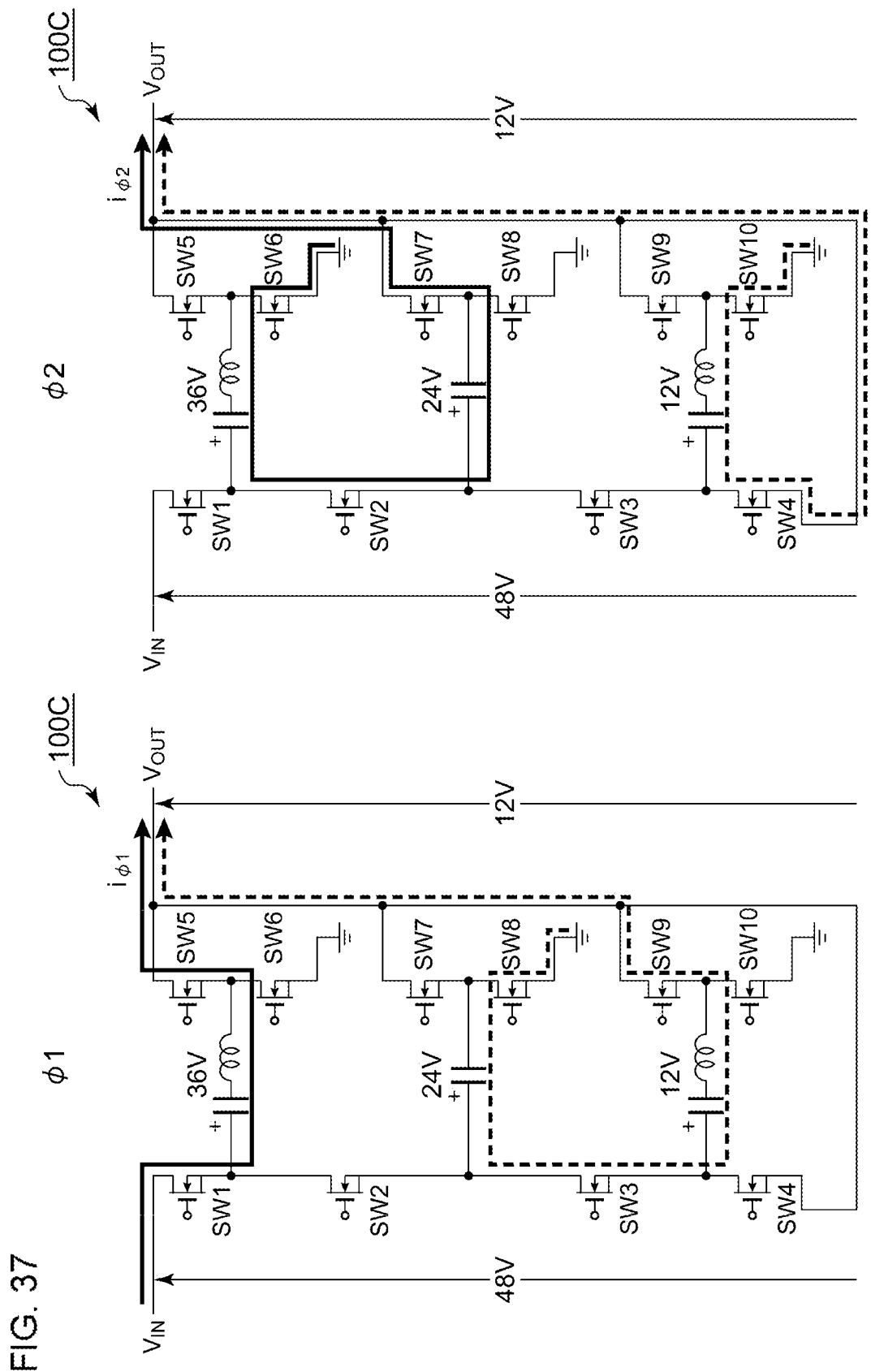
FIG. 37 is a view illustrating an operation of the resonant switched capacitor converter of FIG. 36.

FIG. 37 is a diagram for explaining an operation of the resonant switched capacitor converter 100C in FIG. 36. The resonant switched capacitor converter 100C can switch between the first state $\varphi 1$ and the second state $\varphi 2$. In the first state $\varphi 1$, the switches SW1, SW3, SW5, SW7, and SW9 are turned on, and the remaining switches SW2, SW4, SW6, SW8, and SW10 are turned off.

In the second state $\varphi 2$, the switches SW1, SW3, SW5, SW7, and SW9 are turned off, and the remaining switches SW2, SW4, SW6, SW8, and SW10 are turned on.

By alternately repeating the first state $\varphi 1$ and the second state $\varphi 2$, the voltage across the LC resonant circuit 106_1 of the capacitor C1 and the inductor L1 is 36 V, the voltage across the capacitor C2 is 24 V, and the voltage across the LC resonant circuit 106_2 of the capacitor C3 and the inductor L3 is 12 V, so that an output voltage $V_{OUT}$ of 12 V can be obtained.

Figure 38:
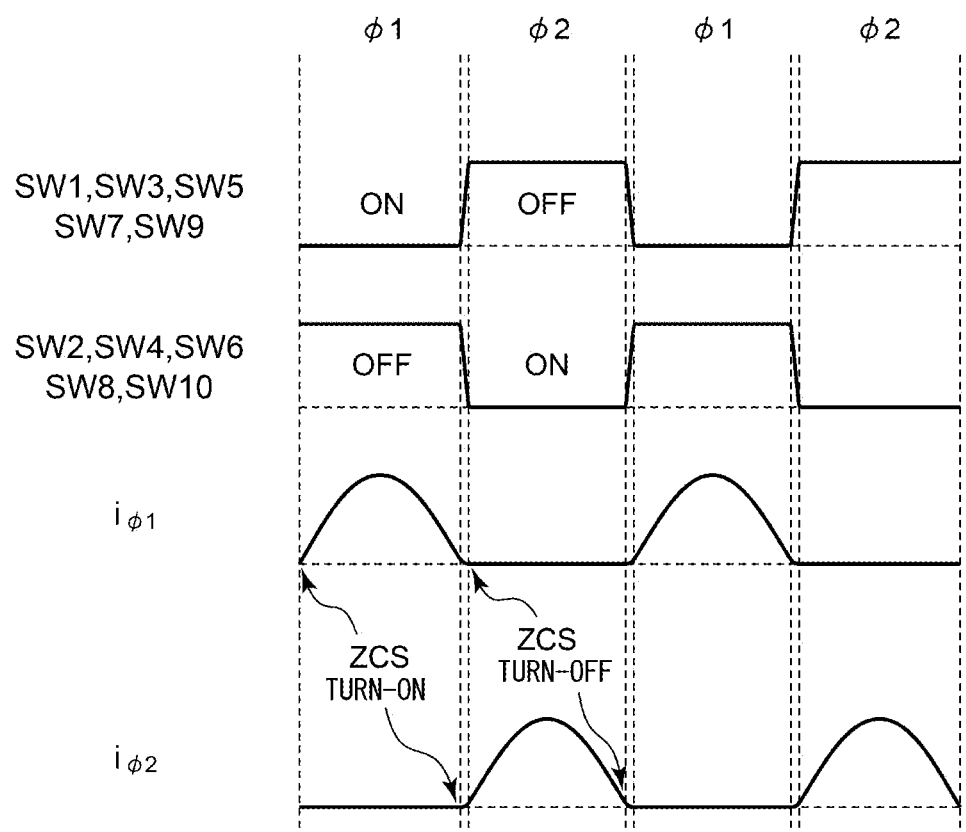
FIG. 38 is an operation waveform diagram of the resonant switched capacitor converter of FIG. 36.

FIG. 38 is an operation waveform diagram of the resonant switched capacitor converter 100C in FIG. 36. FIG. 38 illustrates the states of the switches SW1 to SW10, the current $i_{\varphi 1}$ flowing in the first state $\varphi 1$, and the current $i_{\varphi 2}$ flowing in the second state $\varphi 2$.

By operating in the resonant state of $\omega = \omega_0$, zero current switching (ZCS), that is, ZCS turn-on and ZCS turn-off are enabled, and high efficiency can be obtained.

The controller IC 200C of the resonant switched capacitor converter 100C according to Example 3.3 can be configured based on the controller IC 200A described in Example 3.1, and the number of drivers of the drive circuit 120A of the controller IC 200A may be increased to 10. According to this configuration, similarly to Example 3.1, zero current switching can be realized, and high efficiency can be obtained.

Alternatively, the controller IC 200C of the resonant switched capacitor converter 100C according to Example 3.3 may be configured based on the controller IC 200B described in Example 3.2, and the number of drivers of the drive circuit 120B of the controller IC 200B may be increased to 10. According to this configuration, similarly to Example 3.2, zero voltage switching can be realized, and high efficiency can be obtained. In addition, in the range of $V_{OUT} < V_{IN}/4$, the output voltage $V_{OUT}$ can be stabilized at an arbitrary target level $V_{OUT(REF)}$.

Example 3.4

Figure 39:
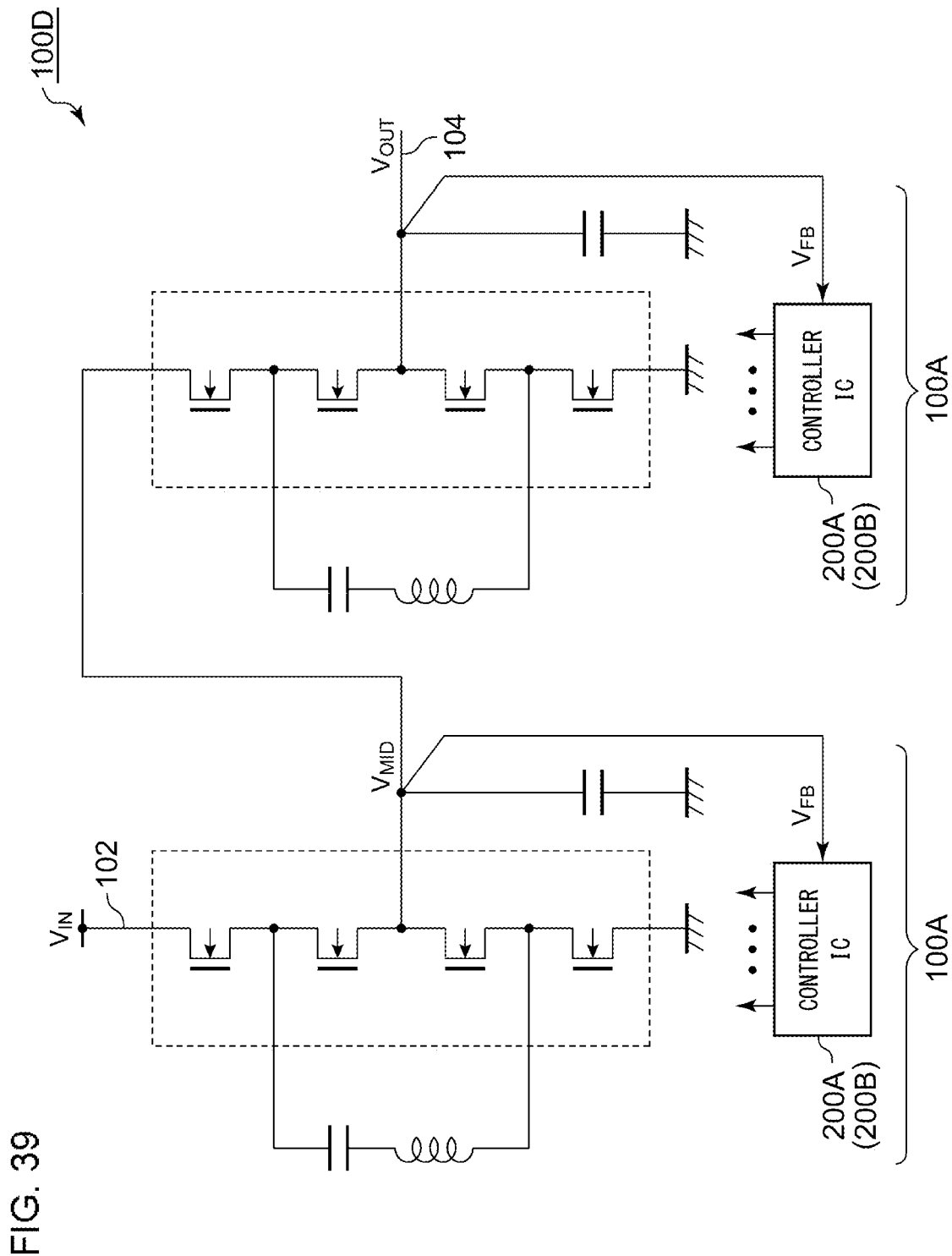
FIG. 39 is a circuit diagram of a resonant switched capacitor converter according to Example 3.4.

FIG. 39 is a circuit diagram of a resonant switched capacitor converter 100D according to Example 3.4. Similarly to Example 3.3, the resonant switched capacitor converter 100D has a gain of ¼ times, steps down the input voltage $V_{IN}$ of the input line 102 by ¼ times, and generates an output voltage $V_{OUT}=V_{IN}/4$ in the output line 104.

The resonant switched capacitor converter 100D has a configuration in which two stages of the resonant switched capacitor converters 100A having the gain of ½ times described in Example 3.1 are connected in series. The resonant switched capacitor converter 100A in the previous stage multiplies the input voltage $V_{IN}$ by ½ to generate an intermediate voltage $V_{MID}$. The resonant switched capacitor converter 100B in the subsequent stage multiplies the intermediate voltage $V_{MID}$ by ½ to generate the output voltage $V_{OUT}$.

In Example 3.4, the controller IC 200A (or 200B) is provided separately for each resonant switched capacitor converter 100A. The controller IC 200A (200B) of the resonant switched capacitor converter 100A in the preceding stage controls the switching frequency of the resonant switched capacitor converter 100A in the preceding stage based on the intermediate voltage $V_{MID}$. The controller IC 200A (200B) of the resonant switched capacitor converter 100A in the subsequent stage controls the switching frequency of the resonant switched capacitor converter 100A in the subsequent stage based on the output voltage $V_{OUT}$.

According to this configuration, the resonant switched capacitor converter having the gain of ¼ times can be operated with high efficiency.

Example 3.5

Figure 40:
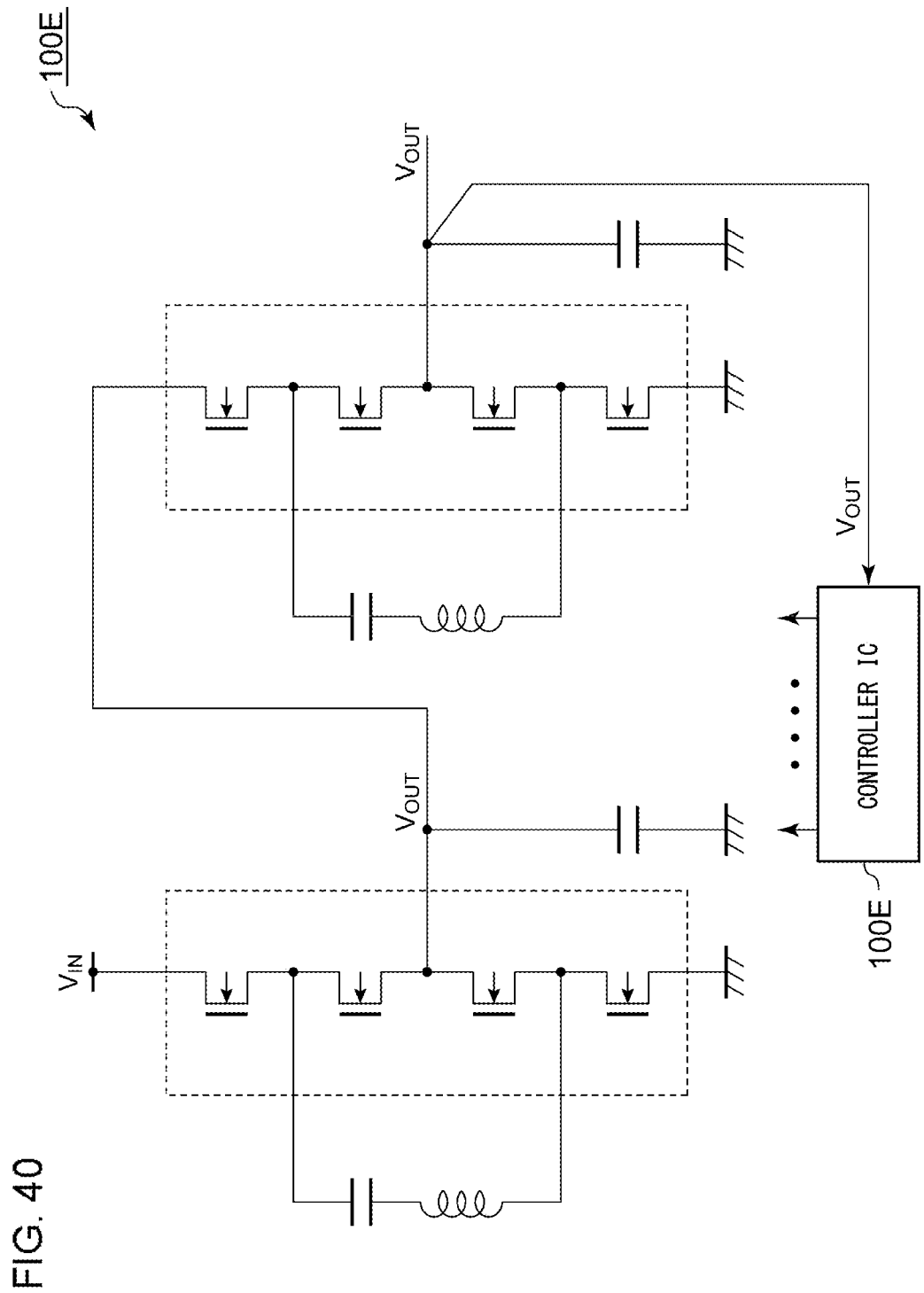
FIG. 40 is a circuit diagram of a resonant switched capacitor converter according to Example 3.5.

FIG. 40 is a circuit diagram of a resonant switched capacitor converter 100E according to Example 3.5. Similarly to Example 3.3 and Example 3.4, the resonant switched capacitor converter 100E has a gain of ¼ times, steps down the input voltage $V_{IN}$ of the input line 102 by ¼ times, and generates the output voltage $V_{OUT}=V_{IN}/4$ in the output line 104.

Similarly to Example 3.4, the resonant switched capacitor converter 100E has a configuration in which two stages of the resonant switched capacitor converters 100A having the gain of ½ times are connected in series, but in Example 3.5, the controller ICs 200E of two resonant switched capacitor converters 100A are integrated on one chip. Only the output voltage $V_{OUT}$ of the resonant switched capacitor converter 100A in the subsequent stage is fed back to the controller IC 200E, and the switching frequencies of both the preceding stage and the subsequent stage are similarly controlled based on the output voltage $V_{OUT}$.

According to this configuration, the resonant switched capacitor converter having the gain of ¼ times can be operated with high efficiency.

Modification

A modification related to Embodiment 3 will be described.

In the embodiment, the converter having the gain of ½ times or ¼ times has been described, but the application of the present disclosure is not limited thereto, and can be applied to converters having other gains. The present invention is also applicable to a switched capacitor converter having a gain larger than 1.

Application

Figure 41:
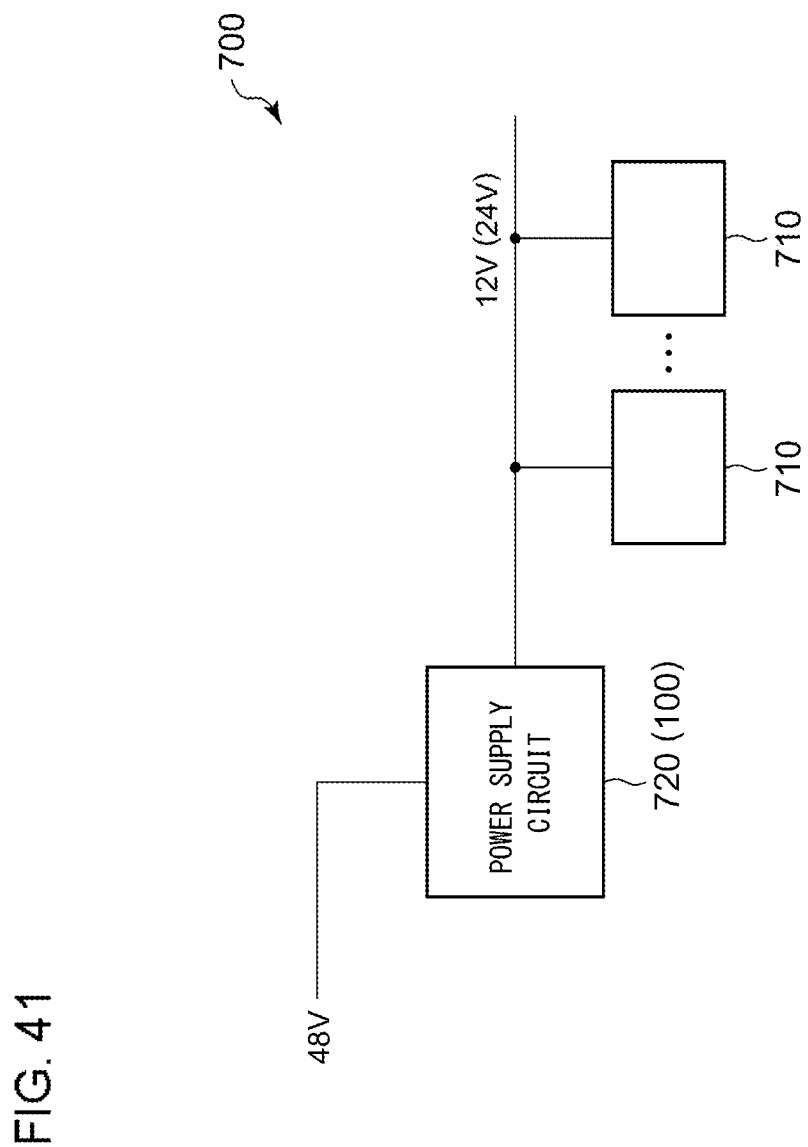
FIG. 41 is a view illustrating an example of an electronic device including the resonant switched capacitor converter.

FIG. 41 is a diagram illustrating an example of an electronic device 700 including the resonant switched capacitor converter 100. A preferred example of the electronic device 700 is a server. An internal circuit 710 is designed to operate at 12 V since a 12-V power line was originally drawn into the server. The internal circuit 710 may include a central processing unit (CPU), a memory, an interface circuit of a local area network (LAN), a DC/DC converter that steps down a voltage of 12 V, and the like.

In recent years, in order to reduce the current flowing through an electric wire, a movement to replace the bus voltage from 12 V to 48 V has been promoted. In this case, the power supply circuit 720 that steps down a power supply voltage of 48 V to 12 V is required. The above-described resonant switched capacitor converter 100 having the gain of ¼ times can be suitably used for such a power supply circuit 720.

The electronic device 700 is not limited to the server, and may be an in-vehicle device. A battery of a conventional automobile is mainly 12 V or 24 V, but a 48-V system may be adopted in a hybrid vehicle, and in this case, a power supply circuit that converts a battery voltage of 48 V into 12 V or 24 V is also required. In such a case, the resonant switched capacitor converter 100 having the gain of ½ times or ¼ times can be suitably used.

In addition, the electronic device 700 may be an industrial device, an OA device, or a consumer device such as an audio device.

Embodiment 4

Figure 42:
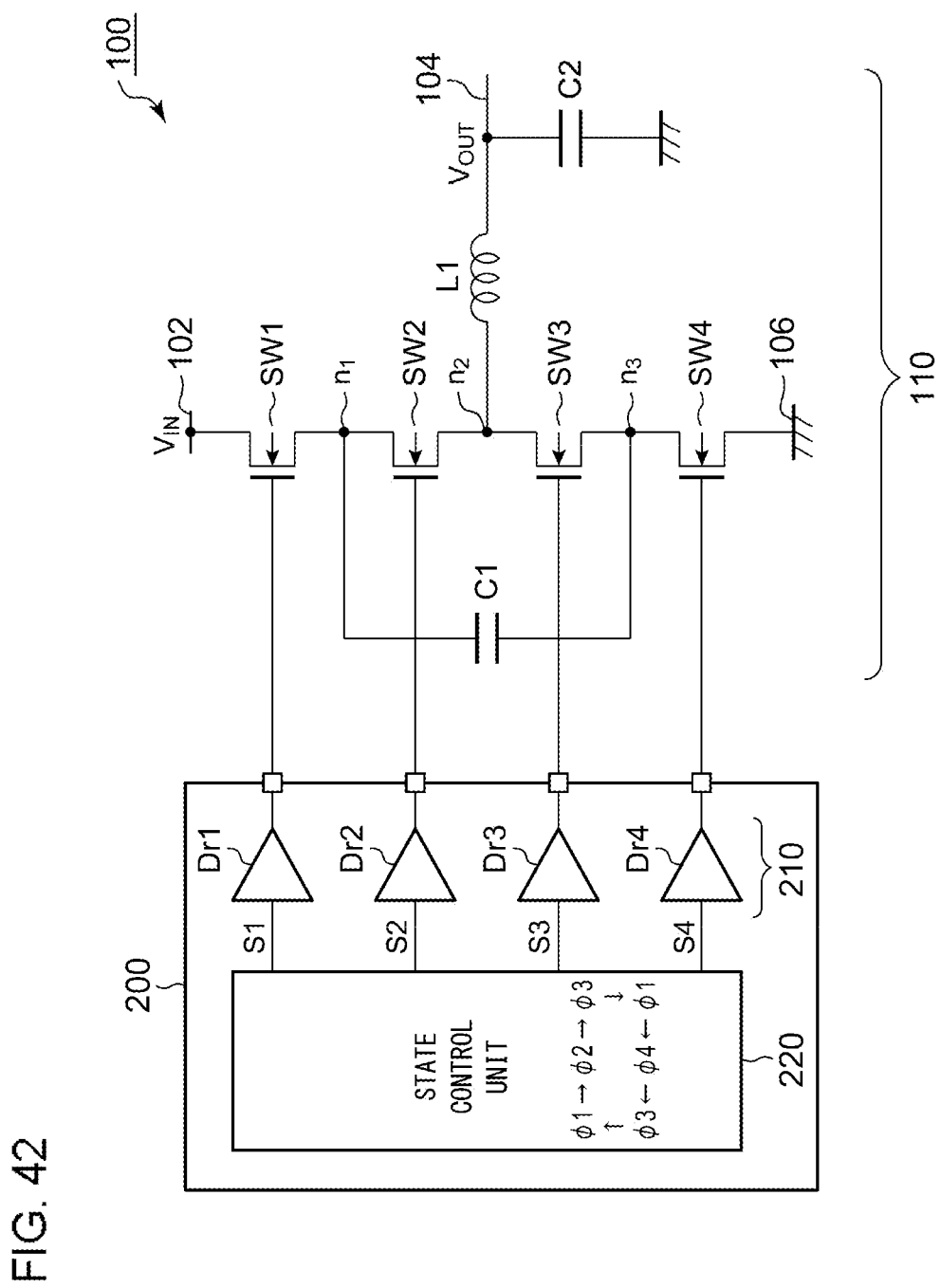
FIG. 42 is a circuit diagram of a resonant switched capacitor converter according to Embodiment 4.

FIG. 42 is a circuit diagram of a resonant switched capacitor converter 100 according to Embodiment 4. The resonant switched capacitor converter 100 is a three-level converter, and includes a controller integrated circuit (IC) 200 and its peripheral circuit 110. The resonant switched capacitor converter 100 steps down an input voltage $V_{IN}$ supplied to the input line 102 and generates an output voltage $V_{OUT}$ in the output line 104.

Specifically, the peripheral circuit 110 includes a first switch SW1 to a fourth switch SW4, capacitors C1 and C2, and an inductor L1. The first switch SW1 to the fourth switch SW4 are connected in series between the input line 102 and the ground line 106. One end of the capacitor C1 is connected to the first switching node $n_1$, and the other end of the capacitor C1 is connected to the third switching node $n_3$. In other words, the capacitor C1 is connected across the second switch SW2 and the third switch SW3.

The inductor L1 is connected between the connection node (second switching node) $n_2$ of the second switch SW2 and the third switch SW3 and the output line 104. The output capacitor C2 is connected to the output line 104. In this example, the first switch SW1 to the fourth switch SW4 are N-channel MOSFETs, but the present invention is not limited thereto, and some switches may be replaced with a P-channel MOSFET. Instead of the MOSFET, a bipolar transistor or an insulated gate bipolar transistor (IGBT) may be used.

The controller IC 200 drives the plurality of switches SW1 to SW4. The controller IC 200 includes a drive circuit 210 and a state control unit 220, and is a functional IC integrated on one semiconductor chip. The first switch SW1 to the fourth switch SW4 may be integrated in the controller IC 200.

The controller IC 200 is configured such that four states $\varphi 1$ to $\varphi 4$ can be switched.

First State $\varphi 1$
First switch SW1 and second switch SW2: ON
Third switch SW3 and fourth switch SW4: OFF
Second State $\varphi 2$
First switch SW1 and third switch SW3: ON
Second switch SW2 and fourth switch SW4: OFF
Third State $\varphi 3$
Third switch SW3 and fourth switch SW4: ON
First switch SW1 and second switch SW2: OFF
Fourth State $\varphi 4$
Second switch SW2 and fourth switch SW4: ON
First switch SW1 and third switch SW3: OFF The controller IC 200 repeats the first state φ1, the second state φ2, the third state φ3, the first state φ1, the fourth state φ4, and the third state φ3 in this order. The state transition is controlled by the state control unit 220. Note that, in the state transition, switching from the on state to the off state of each switch is performed first, and switching from the off state to the on state is subsequently performed.

In each of the states φ1 to φ4, the state control unit 220 generates control signals S1 to S4 for instructing the switches SW1 to SW4 to be turned on and off. The drive circuit 210 drives the corresponding switches SW1 to SW4 based on the control signals S1 to S4.

The resonant switched capacitor converter 100 and the controller IC 200 are configured as described above. Next, the operation will be described.

Figure 43:
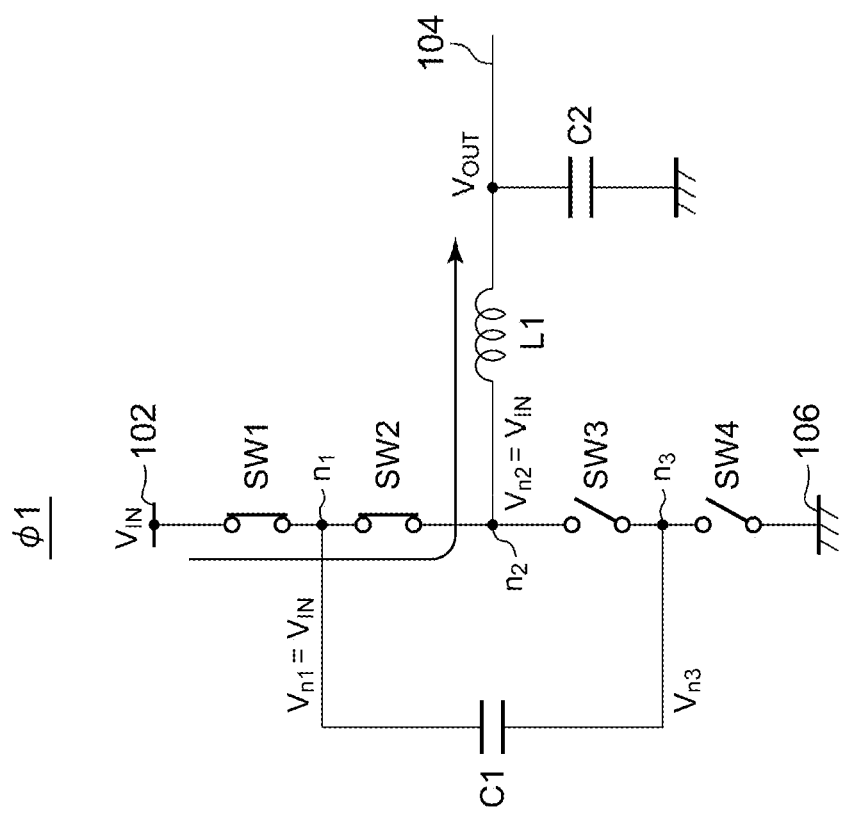
FIG. 43 is an equivalent circuit diagram in a first state of the resonant switched capacitor converter of FIG. 42.

FIG. 43 is an equivalent circuit diagram in the first state φ1 of the resonant switched capacitor converter 100 of FIG. 42. In the first state φ1, the first switch SW1 and the second switch SW2 are turned on. Since $V_{n1}=V_{n2}=V_{IN}$, the voltage across the inductor L1 becomes $V_{IN}-V_{OUT}$, and in the first state φ1, the coil current $I_L$ of the inductor L1 increases with the slope of $(V_{IN}-V_{OUT})/L$.

Figure 44:
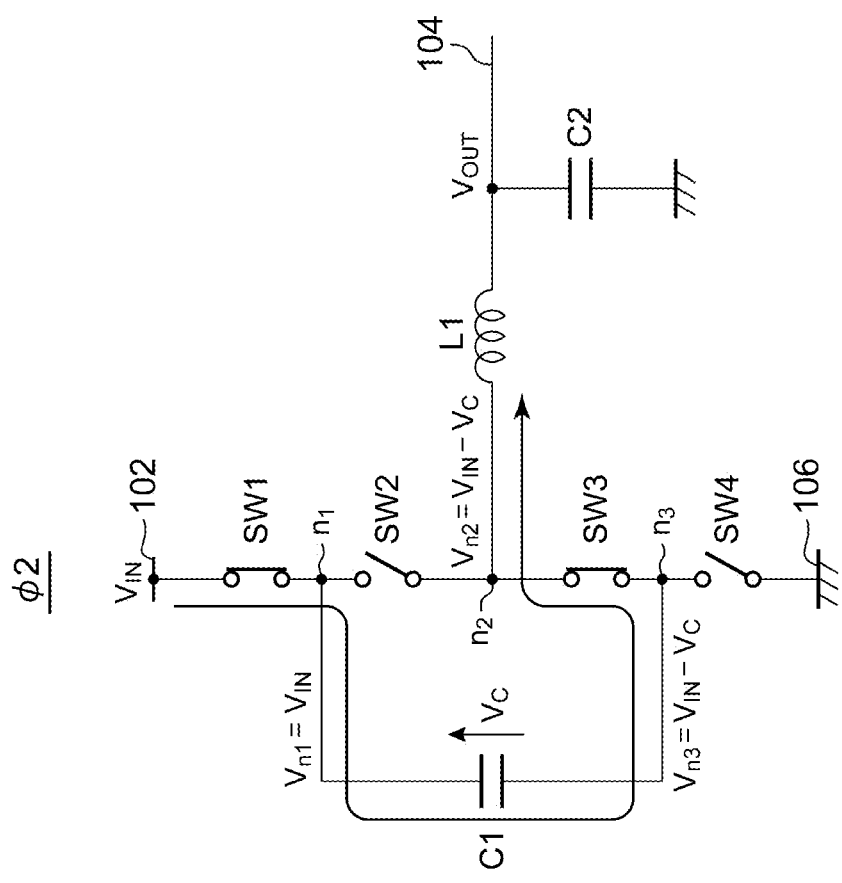
FIG. 44 is an equivalent circuit diagram in a second state of the resonant switched capacitor converter of FIG. 42.

FIG. 44 is an equivalent circuit diagram in the second state φ2 of the resonant switched capacitor converter 100 of FIG. 42. In the second state φ2, the first switch SW1 and the third switch SW3 are turned on. When the voltage across the capacitor C1 is Vc, $V_{n3}=V_{n2}=V_{IN}-Vc$ in the second state φ2. At this time, the voltage across the inductor L1 is $V_{n2}-V_{OUT}=(V_{IN}-Vc)-V_{OUT}$, and in the second state φ2, the coil current $I_L$ of the inductor L1 changes with the slope of $(V_{IN}-Vc-V_{OUT})/L$. In the steady state, since $Vc\approx V_{IN}/2$, the coil current $I_L$ is substantially constant.

Figure 45:
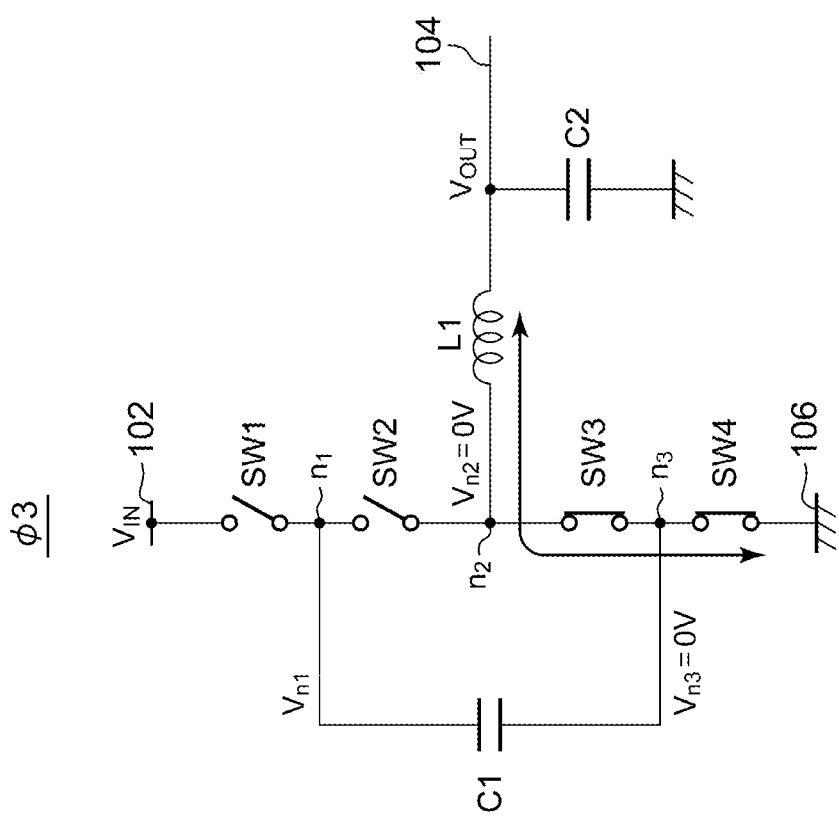
FIG. 45 is an equivalent circuit diagram in a third state of the resonant switched capacitor converter of FIG. 42.

FIG. 45 is an equivalent circuit diagram in the third state φ3 of the resonant switched capacitor converter 100 of FIG. 42. In the third state φ3, the third switch SW3 and the fourth switch SW4 are turned on. The voltage across the inductor L1 becomes $-V_{OUT}$, and in the third state φ3, the coil current $I_L$ of the inductor L1 increases with the slope of $-V_{OUT}/L$ (decreases with the slope of $V_{OUT}/L$).

Figure 46:
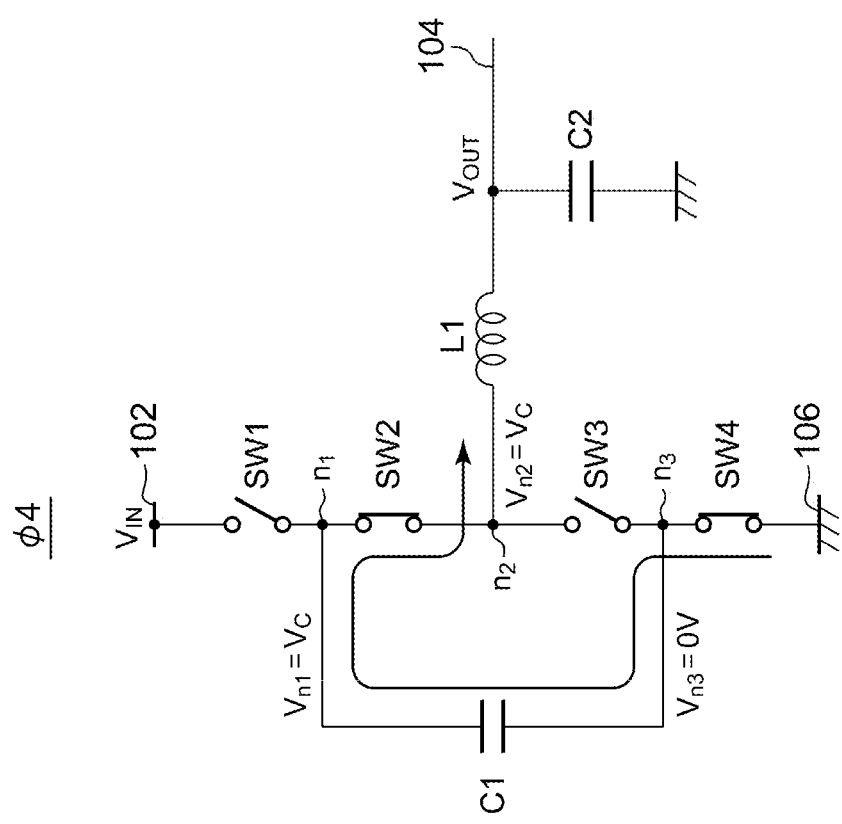
FIG. 46 is an equivalent circuit diagram in a fourth state of the resonant switched capacitor converter of FIG. 42.

FIG. 46 is an equivalent circuit diagram in the fourth state φ4 of the resonant switched capacitor converter 100 of FIG. 42. In the fourth state φ4, the second switch SW2 and the fourth switch SW4 are turned on. When the voltage across the capacitor C1 is Vc, $V_{n2}=Vc$ in the fourth state φ4. At this time, the voltage across the inductor L1 is $V_{n2}-V_{OUT}=Vc-V_{OUT}$, and in the fourth state φ4, the coil current $I_L$ of the inductor L1 changes with the slope of $(Vc-V_{OUT})/L$. In the steady state, since $Vc\approx V_{IN}/2$, the coil current $I_L$ is substantially constant.

Figure 47:
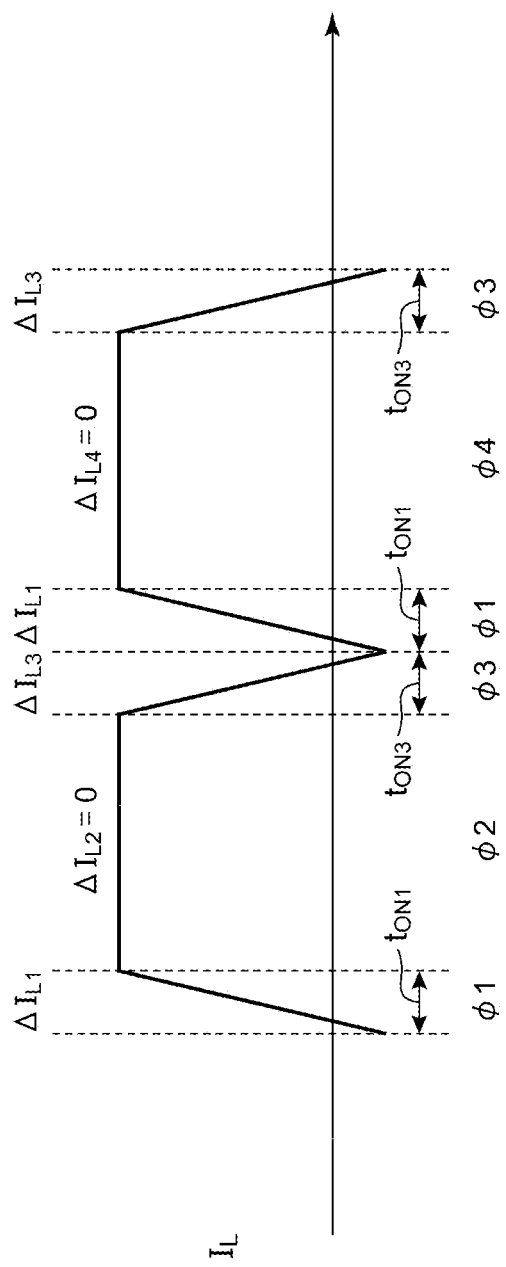
FIG. 47 is a waveform diagram illustrating an operation of the resonant switched capacitor converter.

FIG. 47 is a waveform diagram illustrating an operation of the resonant switched capacitor converter 100. FIG. 47 illustrates the coil current $I_L$ flowing through the inductor L1. When the time length of the first state φ1 is denoted by $t_{on1}$ and the time length of the third state φ3 is denoted by $t_{on3}$, the change amount $\Delta I_{L1}$ of the coil current $I_L$ in the first state φ1 and the change amount $\Delta I_{L3}$ of the coil current $I_L$ in the third state φ3 are expressed by the following equations.

$$\Delta I_{L1}=(V_{IN}-V_{OUT})/L\times t_{on1}$$

$$\Delta I_{L3}=-V_{OUT}/L\times t_{on3}$$

In the steady state, when the coil current $I_L$ is stabilized, the absolute values of $\Delta I_{L1}$ and $\Delta I_{L3}$ are equal.
When Imposing the Constraints $$(V_{IN}-V_{OUT})/L\times t_{on1}=V_{OUT}/L\times t_{on3} \text{ and}$$

$$t_{on1}=t_{on3},$$

$$(V_{IN}-V_{OUT})=V_{OUT}$$

is obtained. That is, in a steady state, $$V_{OUT}=V_{IN}/2$$

can be obtained.

According to the resonant switched capacitor converter 100, zero voltage switching can be performed, whereby a low-loss high-efficiency operation can be realized. The reason will be described.

Transition from the First State φ1 to the Second State φ2

In the steady state, $Vc=V_{IN}/2$ and $V_{OUT}=V_{IN}/2$ are established. In the first state φ1, $V_{n1}=V_{n2}=V_{IN}$ and $V_{n3}=V_{IN}/2$. In the transition from the first state φ1 to the second state φ2, when the second switch SW2 is turned off, the current flows through the body diode of the MOSFET which is the third switch SW3, and the current path becomes the same as that in the second state. The switching voltage $V_{n2}$ decreases to $V_{IN}/2$, and the drain-source voltage of the MOSFET that is the third switch SW3 becomes zero. When the third switch SW3 is turned on in this state, zero voltage switching occurs, and no loss occurs.

Transition from Second State φ2 to Third State φ3

In the second state φ2, $V_{n1}=V_{IN}$ and $V_{n2}=V_{n3}=V_{IN}/2$. In the transition from the second state φ2 to the third state φ3, when the first switch SW1 is turned off, the current flows through the body diode of the MOSFET which is the fourth switch SW4, and the current path becomes the same as that in the third state φ3. The switching voltage $V_{n3}$ decreases to 0 V, and the drain-source voltage of the MOSFET that is the fourth switch SW4 becomes zero. When the fourth switch SW4 is turned on in this state, zero voltage switching occurs, and no loss occurs.

Transition from Third State φ3 to First State φ1

In the third state φ3, $V_{n1}=V_{n2}=V_{IN}/2$, and $V_{n3}=0$ V (GND). In the third state φ3, as illustrated in FIG. 47, the coil current $I_L$ decreases with time and becomes a negative current (reverse current). When the third switch SW3 and the fourth switch SW4 are turned off in the transition from the third state φ3 to the first state φ1, the current flows into the input line 102 via the body current of the MOSFET which is the first switch SW1 and the second switch SW2, and the current path becomes the same as that in the first state φ1. At this time, since the voltage $V_{n1}$ of the first switching node n1 is equal to the input voltage $V_{IN}$, the drain-source voltage of the MOSFET which is the first switch SW1 and the second switch SW2 is zero. When the first switch SW1 and the second switch SW2 are turned on in this state, zero voltage switching occurs, and no loss occurs.

Hereinabove, the reason for the zero voltage switching has been described. The advantages of the resonant switched capacitor converter 100 will be clarified by comparison with a comparative technique.

In the comparative technique, the three-level converter is switched in the following three states.

State I
  First switch SW1 and third switch SW3; ON
  Second switch SW2 and fourth switch SW4; OFF
State II
  Third switch SW3 and fourth switch SW4; ON
  First switch SW1 and second switch SW2; OFF
State III
  Second switch SW2 and fourth switch SW4; ON
  First switch SW1 and third switch SW3; OFF States I to III respectively correspond to states φ2, φ3, and φ4 in Embodiment 4. In the comparative technique, the state I, the state II, the state III, and the state II are repeated as one cycle. In the state I, the capacitor C1 is charged, and in the state III, the energy stored in the capacitor C1 is supplied to the inductor L1.

Figure 48:
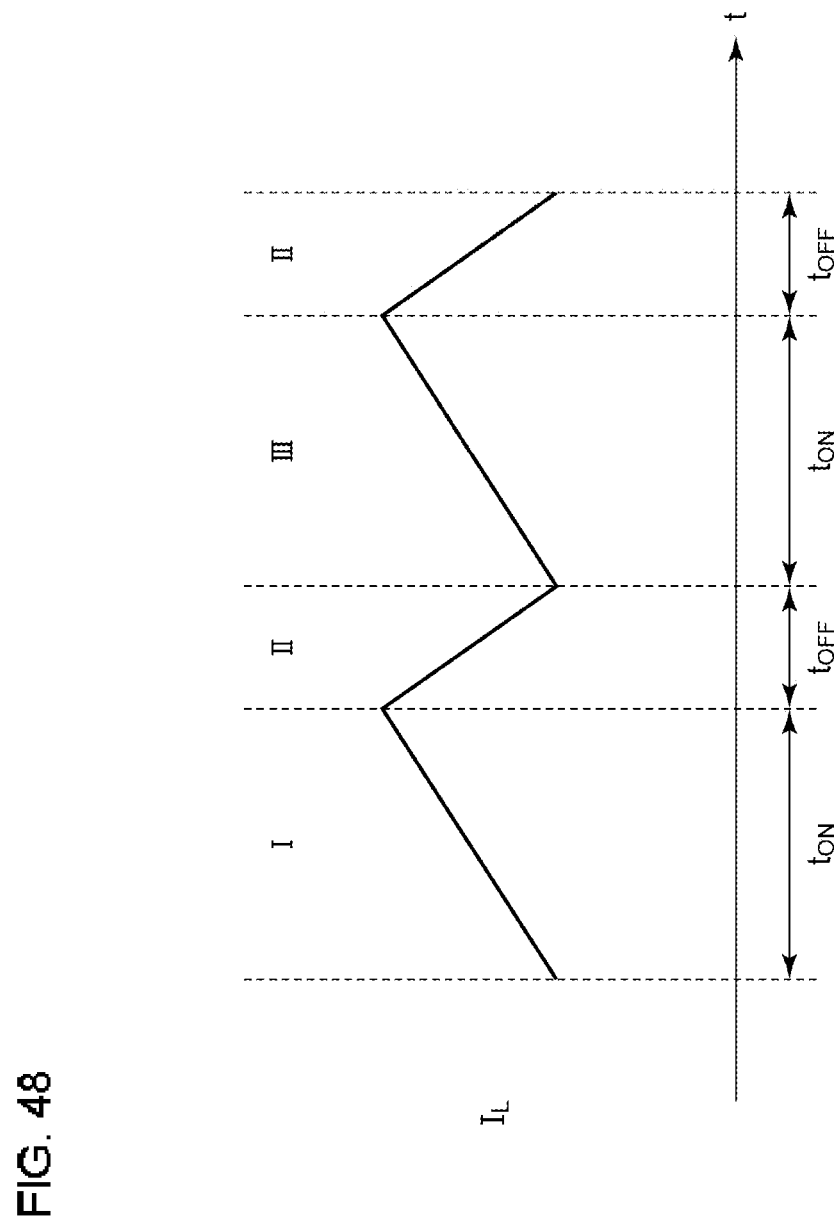
FIG. 48 is a diagram for explaining the operation of a three-level converter according to a comparative technique.

FIG. 48 is a diagram for explaining the operation of the three-level converter according to the comparative technique. FIG. 48 illustrates the coil current $I_L$. In the state I, the voltage across the inductor L1 is $(V_{IN}-Vc)-V_{OUT}$, and the coil current $I_L$ changes with the slope of $\{(V_{IN}-Vc)-V_{OUT}\}/L$. In the state II, the voltage across the inductor L1 is $-V_{OUT}$ and the coil current $I_L$ changes with the slope of $-V_{OUT}/L$.

In the state III, the voltage across the inductor L1 is $Vc-V_{OUT}$ and the coil current $I_L$ changes with the slope of $\{Vc-V_{OUT}\}/L$.

Assuming that the time of the state I and the state III is $t_{on}$ and the time of the state II is $t_{off}$, the change amounts $\Delta I_{L1}$ to $\Delta I_{L3}$ of the coil current $I_L$ in each state are as follows.

$$\Delta I_{L1}=\{(V_{IN}-Vc)-V_{OUT}\}/L \times t_{on} \quad (1)$$

$$\Delta I_{L2}=-V_{OUT}/L \times t_{off} \quad (2)$$

$$\Delta I_{L3}=\{Vc-V_{OUT}\}/L \times t_{on} \quad (3)$$

In a steady state, when the average value of the coil current $I_L$ is constant, $\Delta I_{L1}=|\Delta I_{L2}|=\Delta I_{L3}$ holds. Since Equation (1) and Equation (3) are equal to each other, $$Vc=V_{IN}/2$$

is obtained. Substituting this into Equation (1), $$\Delta I_{L1}=(V_{IN}/2-V_{OUT})/L \times t_{on} \quad (1')$$

is obtained. Since the absolute values of Equation (1') and Equation (2) are equal, Equation (4) is obtained.

$$V_{OUT}=V_{IN}/2 \times t_{on}/(t_{on}+t_{off})=V_{IN}/2 \times d \quad (4)$$

where $d=t_{on}/(t_{on}+t_{off})$ and represents the duty cycle. When $d=0.5$, $V_{OUT}=V_{IN}/4$.

Hereinabove, the operation of the three-level converter according to the comparative technique has been described. In the comparative technique, when the state transitions from the state II to the state III, the switch SW3 is turned off first. After the switch SW3 is turned off, the current path remains in the state II because the current flows through the body diode of the switch SW3. At this time, since the drain-source voltage of the second switch SW2 is non-zero, when the second switch SW2 is turned on in this state, hard switching occurs and a power loss occurs.

When the state transitions from the state II to the state I, the switch SW4 is turned off first. After the switch SW4 is turned off, the current path remains in the state II because the current flows through the body diode of the switch SW4. At this time, since the drain-source voltage of the first switch SW1 is non-zero, when the first switch SW1 is turned on in this state, hard switching occurs and a power loss occurs.

As described above, hard switching occurs in the comparative technique.

On the other hand, according to the controller IC 200 of Embodiment 4, since the soft switching can be realized, the efficiency can be improved.

When operating in the open loop, the controller IC 200 according to Embodiment 4 operates as a converter with a gain of ½ times, but by incorporating feedback control, the gain, that is, the output voltage $V_{OUT}$ can be set.

Figure 49:
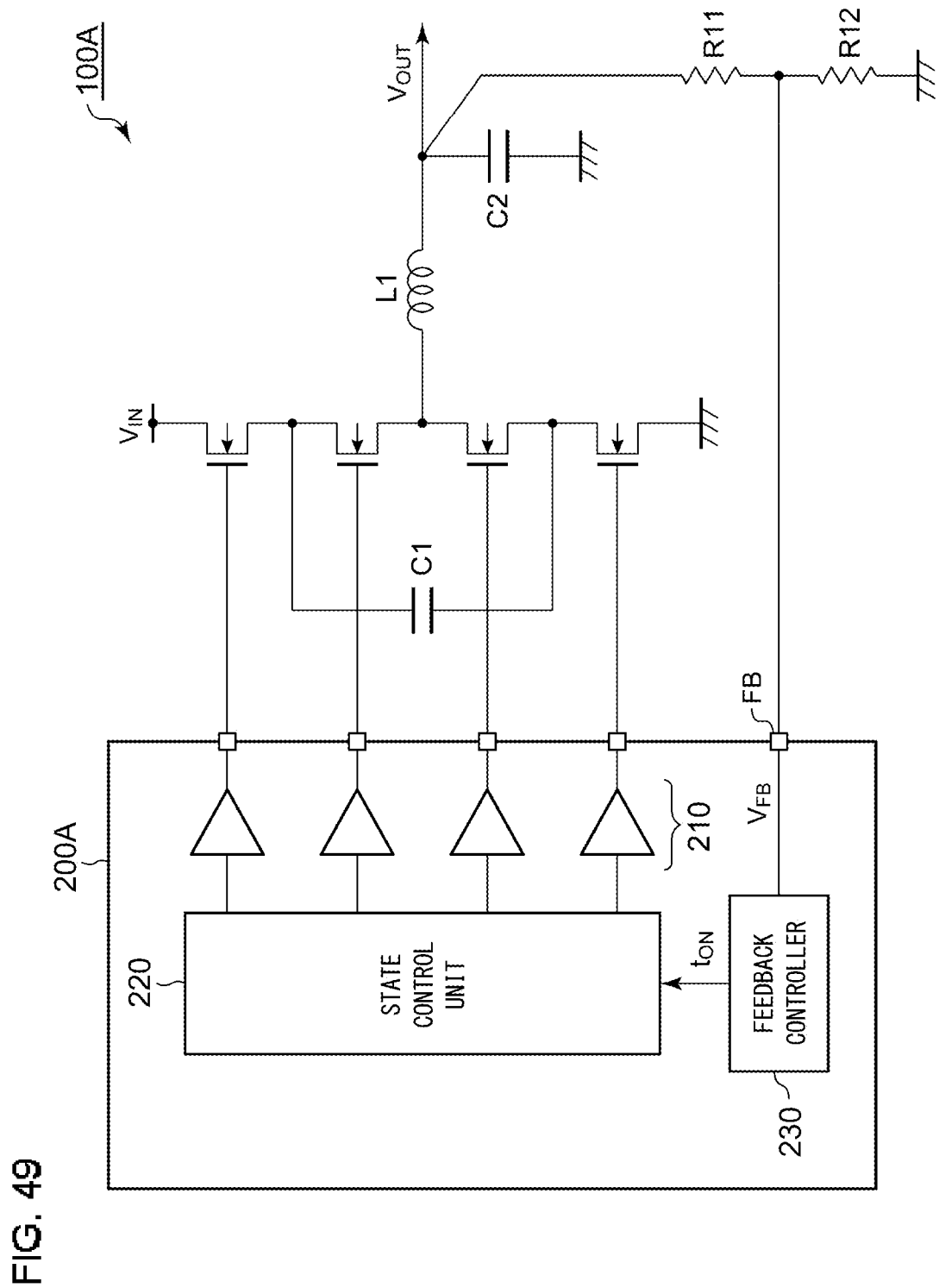
FIG. 49 is a circuit diagram of a resonant switched capacitor converter including a controller IC with a feedback function.

FIG. 49 is a circuit diagram of a resonant switched capacitor converter 100A including a controller IC 200A with a feedback function. The controller IC 200A can control the lengths of the first state φ1 and the third state φ3 according to the state of the load. The control method may be pulse width modulation (PWM) or pulse frequency modulation (PFM). In the case of PWM, when the lengths of the first state φ1 and the third state φ3 are denoted by $t_{on}$ and the pulse period is denoted by Tp, the lengths $t_{off}$ of the second state φ2 and the fourth state φ4 are denoted by $Tp-t_{on}$. In the case of the PFM control, the lengths $t_{off}$ of the second state φ2 and the fourth state φ4 may be constant.

The controller IC 200A includes a feedback controller 230 in addition to the drive circuit 210 and the state control unit 220. The feedback signal $V_{FB}$ corresponding to the output voltage $V_{OUT}$ generated in the output line 104 is input to the feedback pin FB of the controller IC 200A. The feedback signal $V_{FB}$ may be a voltage obtained by dividing the output voltage $V_{OUT}$ by the resistors R11 and R12, or may be the output voltage $V_{OUT}$ itself.

The feedback controller 230 feedback-controls at least the lengths $t_{on}$ of the first state and the third state such that an error between the feedback signal $V_{FB}$ and the reference voltage $V_{REF}$ becomes 0, in other words, an error between the output voltage $V_{OUT}$ and the target level $V_{OUT(REF)}$ becomes small.

The feedback controller 230 can be configured similarly to the modulator used in the DC/DC converter.

Figure 50:
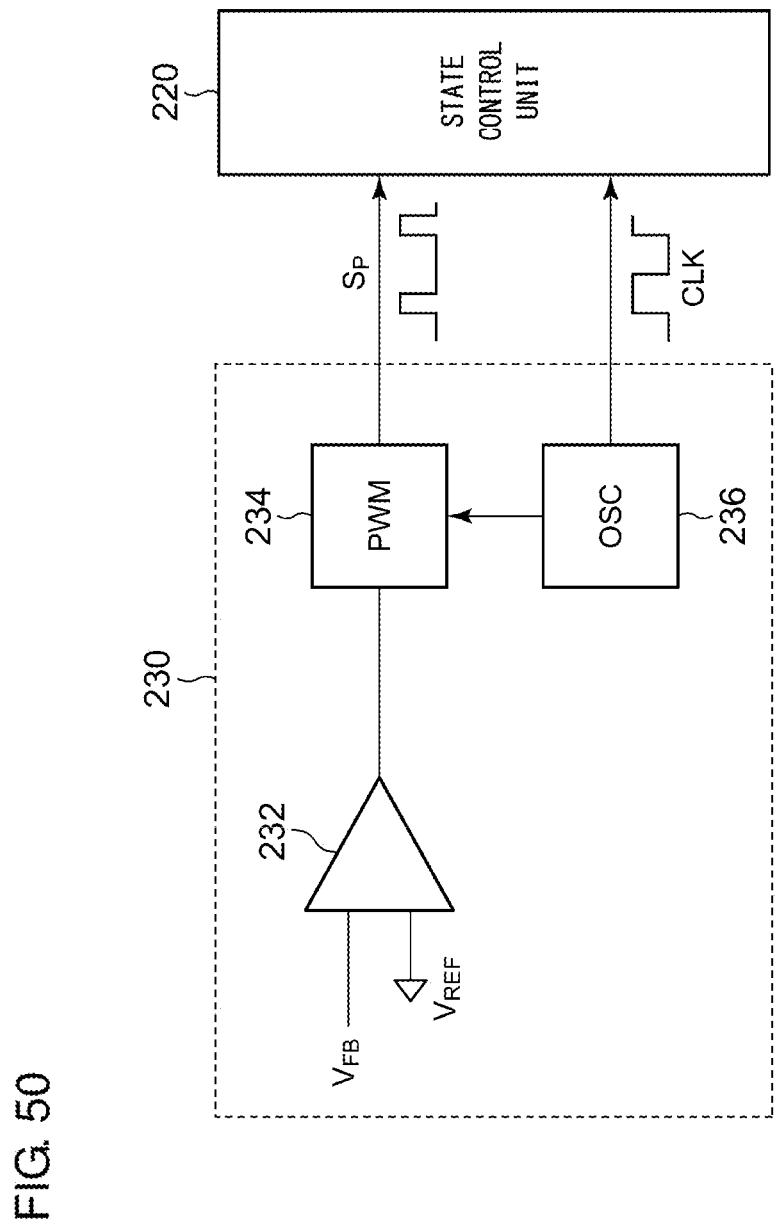
FIG. 50 is a circuit diagram illustrating a configuration example of a feedback controller and a state control unit.

FIG. 50 is a circuit diagram illustrating a configuration example of the feedback controller 230 and the state control unit 220. The feedback controller 230 includes an error amplifier 232 and a pulse modulator 234. The error amplifier 232 amplifies an error between the feedback signal $V_{FB}$ and the reference voltage $V_{REF}$ and generates an error signal $V_{ERR}$. The pulse modulator 234 generates a pulse signal Sp corresponding to the error signal $V_{ERR}$. In this example, the pulse modulator 234 is a pulse width modulator, and generates a pulse signal Sp in synchronization with the oscillator 236. The pulse width of the pulse signal Sp is controlled according to the error signal $V_{ERR}$.

The pulse signal Sp and the clock CLK generated by the oscillator 236 are input to the state control unit 220. The state control unit 220 sequentially switches the first state φ1, the second state φ2, the third state φ3, the first state φ1, the fourth state φ4, and the third state φ3 according to the pulse signal Sp and the clock CLK. The lengths of the first state φ1 and the third state φ3 change according to the pulse width of the pulse signal Sp.

Modification

A modification related to Embodiment 4 will be described.

In FIG. 50, the case where the feedback controller 230 is configured by the analog circuit has been described, but the feedback controller may be configured by a digital circuit. In this case, the error amplifier 232 is replaced with a subtractor and a compensator (controller). As the compensator, a proportional-integral-derivative (PID) compensator or a proportional-integral (PI) compensator can be used.

In addition, in FIG. 49, the constant current output controller IC 200A that stabilizes the output voltage $V_{OUT}$ has been described, but the present invention is also applicable to a constant current output converter. In this case, a signal indicating the output current $I_{OUT}$ may be used as the feedback signal $V_{FB}$.

Application

Figure 51:
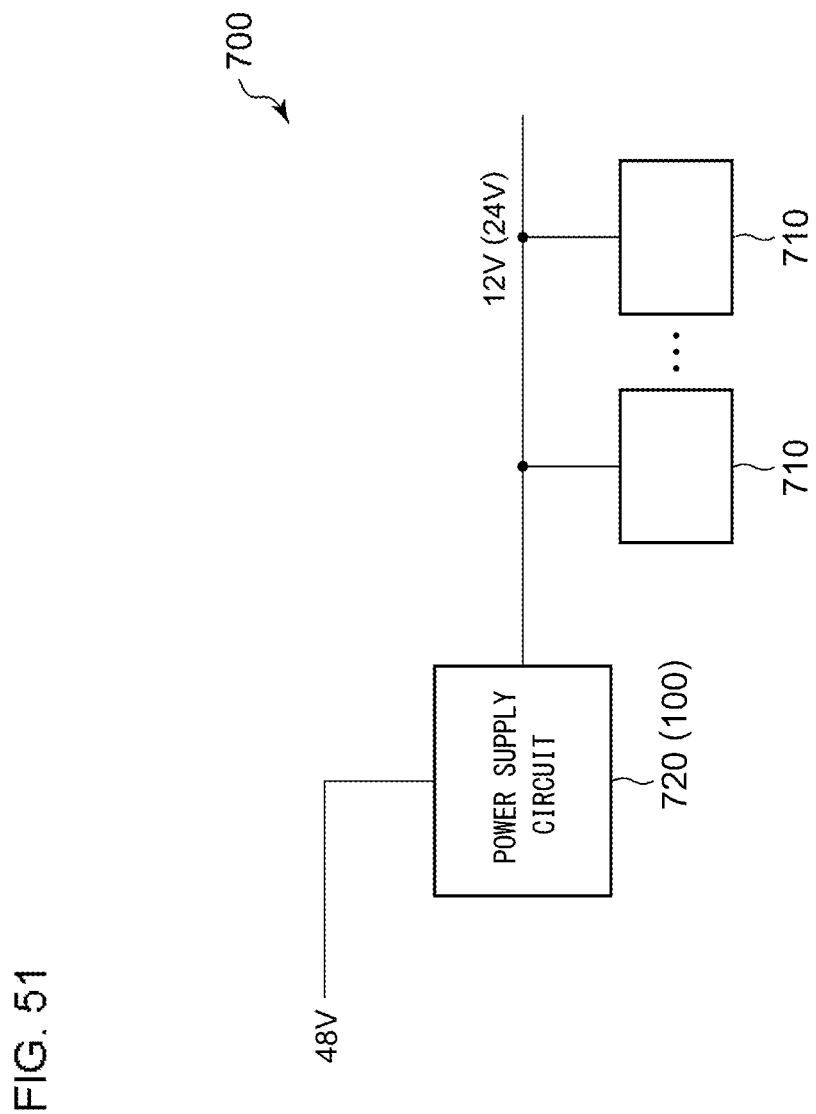
FIG. 51 is a view illustrating an example of an electronic device including the resonant switched capacitor converter.

FIG. 51 is a diagram illustrating an example of an electronic device 700 including the resonant switched capacitor converter 100. A preferred example of the electronic device 700 is a server. An internal circuit 710 is designed to operate at 12 V since a 12-V power line was originally drawn into the server. The internal circuit 710 may include a central processing unit (CPU), a memory, an interface circuit of a local area network (LAN), a DC/DC converter that steps down a voltage of 12 V, and the like.

In recent years, in order to reduce the current flowing through an electric wire, a movement to replace the bus voltage from 12 V to 48 V has been promoted. In this case, the power supply circuit 720 that steps down the power supply voltage of 48 V to 12 V or 24 V is required. The resonant switched capacitor converter 100 can be suitably used for such a power supply circuit 720.

The electronic device 700 is not limited to the server, and may be an in-vehicle device. A battery of a conventional automobile is mainly 12 V or 24 V, but a 48-V system may be adopted in a hybrid vehicle, and in this case, a power supply circuit that converts a battery voltage of 48 V into 12 V or 24 V is also required. In such a case, the resonant switched capacitor converter 100 having the gain of ½ times can be suitably used.

In addition, the electronic device 700 may be an industrial device, an OA device, or a consumer device such as an audio device.

Embodiment 5

Figure 52:
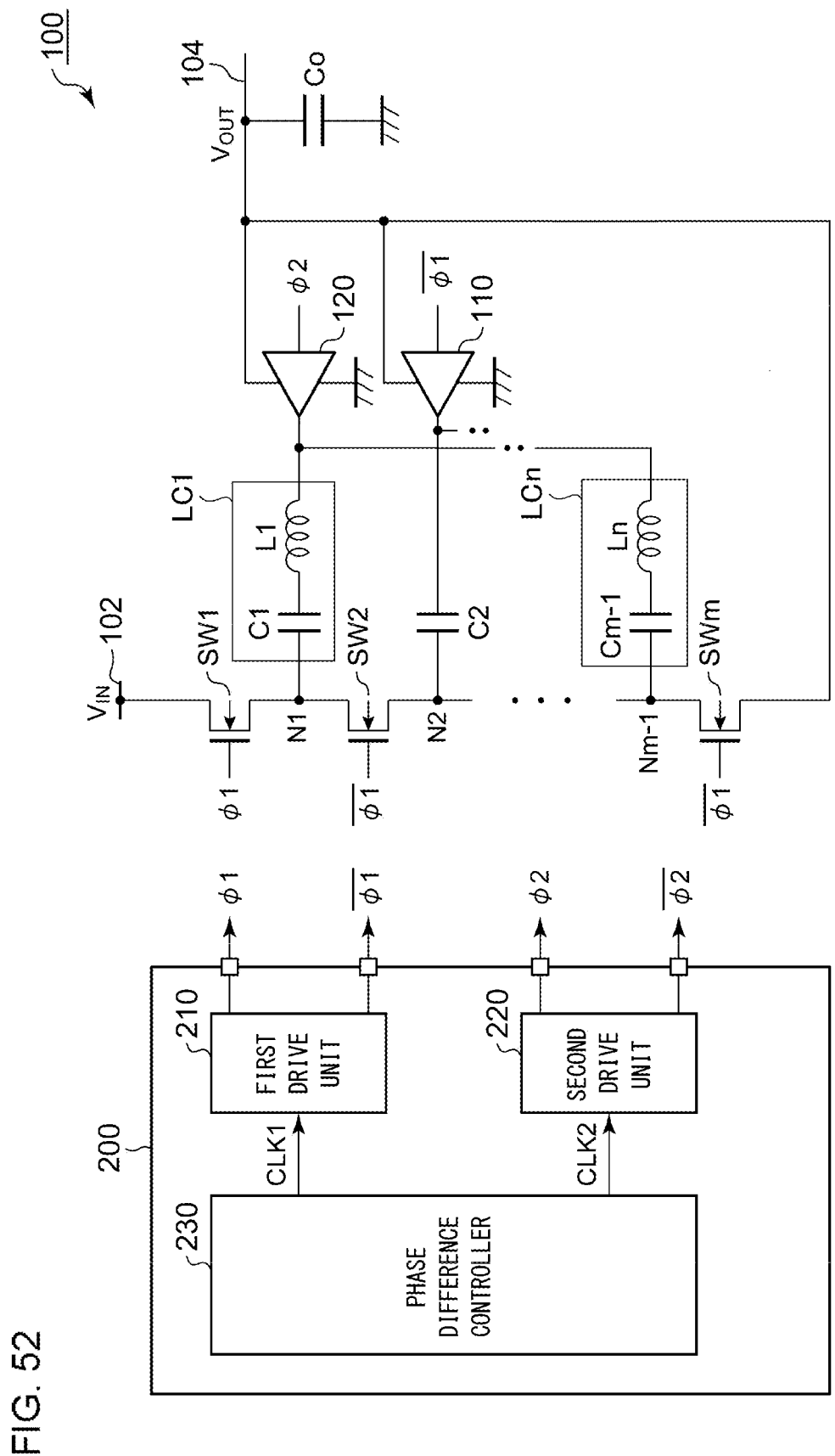
FIG. 52 is a circuit diagram of a switched capacitor converter according to Embodiment 5.

FIG. 52 is a circuit diagram of a switched capacitor converter 100 according to Embodiment 5. The switched capacitor converter 100 steps down an input voltage $V_{IN}$ supplied to the input line 102, and generates a stepped-down output voltage $V_{OUT}$ in the output line 104.

The switched capacitor converter 100 includes an input line 102, an output line 104, a ground line 106, m (m≥3) switches SW1 to SWm, n (n≥2) LC circuits (also referred to as an LC resonant circuit or an LC tank circuit) LC1 to LCn, k (k≥1, k+n=m−1) capacitors C2, C4, and the like, a first switching circuit 110, a second switching circuit 120, and a controller integrated circuit (IC) 200.

The m switches SW1 to SWm are connected in series between the input line 102 and the output line 104. Although not limited thereto, the m switches SW1 to SWm can be configured by transistors such as MOSFETs. The m switches SW1 to SWm may be integrated in the controller IC 200. Two adjacent connection nodes of the plurality of switches SW1 to SWm are referred to as N1, N2, . . . , and Nm−1 in order from the node closer to the input line 102.

The n (n≥2) LC circuits LC1, LC2, . . . , and LCn each include a capacitor and an inductor connected in series. Specifically, the i-th (1≤i≤n) LC circuit LCi includes a capacitor C(2×i−1) and an inductor Li. The first end of the i-th LC circuit LCi is connected to an odd-numbered corresponding connection node N(2×i−1) among the connection nodes N1 to Nm−1.

A first end of a j-th (1≤j≤k) capacitor C(2×j) among the k capacitors C2, C4, . . . , and C(2×k) is connected to an even-numbered corresponding one N(2×j) among the plurality of connection nodes N1 to Nm−1.

The first switching circuit 110 applies the output voltage $V_{OUT}$ of the output line 104 or the ground voltage (0 V) of the ground line 106 to the second end of each of the k capacitors C2, C4, . . . , and C(2×k).

The second switching circuit 120 applies the output voltage $V_{OUT}$ or the ground voltage 0 V to the second end of each of the n LC circuits LC1 to LCn.

The controller IC 200 includes a first drive unit 210, a second drive unit 220, and a phase difference controller 230.

The first drive unit 210 alternately switches, according to the first clock CLK1, between (i) the state φ1 in which the odd-numbered SW1, SW3, and the like among the m switches SW1 to SWm are turned on, the even-numbered SW2, SW4, and the like are turned off, and the first switching circuit 110 applies the ground voltage (0 V), and (ii) the state φ1B in which the odd-numbered SW1, SW3, and the like are turned off, the even-numbered SW2, SW4, and the like are turned on, and the first switching circuit 110 applies the output voltage $V_{OUT}$. B indicates logic inversion and is indicated by a bar in the drawing.

In response to the second clock CLK2, the second drive unit 220 alternately switches between the state φ2 in which the second switching circuit 120 applies the output voltage $V_{OUT}$ and the state φ2B in which the second switching circuit applies the ground voltage.

The phase difference controller 230 controls a phase difference φd between the first clock CLK1 and the second clock CLK2.

Figure 53:
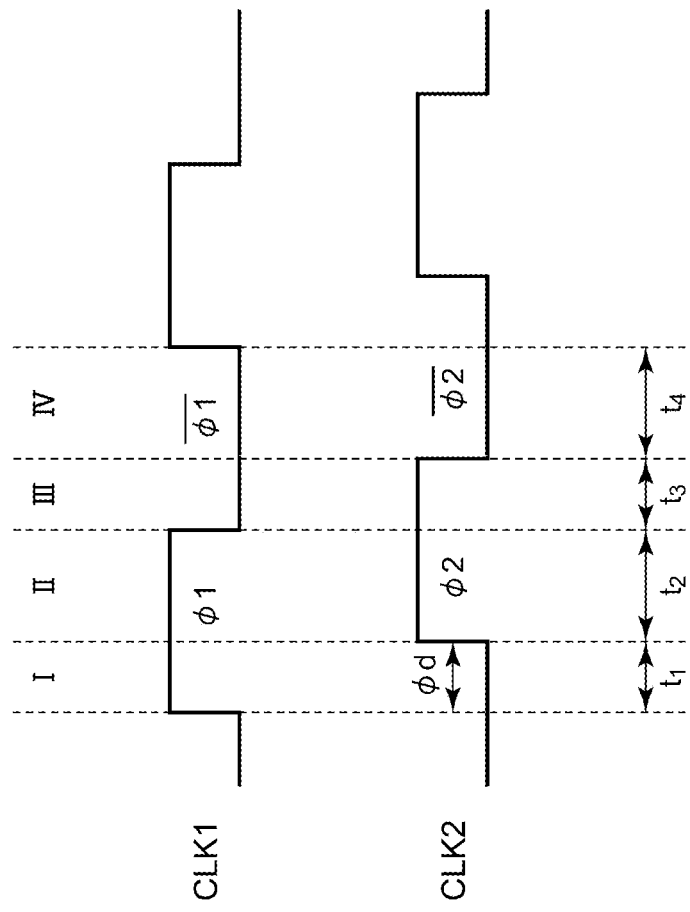
FIG. 53 is a time chart illustrating an operation of the switched capacitor converter in FIG. 52.

FIG. 53 is a time chart illustrating an operation of the switched capacitor converter 100 in FIG. 52. The switched capacitor converter 100 transitions through four states I to IV.

First State I
First drive unit 210 is in state φ1, and second drive unit 220 is in state φ2B
Second State II
First drive unit 210 is in state φ1, and second drive unit 220 is in state φ2
Third State III
First drive unit 210 is in state φ1B, and second drive unit 220 is in state φ2
Fourth State IV
First drive unit 210 is in state φ1B, and second drive unit 220 is in state φ2B When the phase difference φd is changed, the ratio between the time of the first state I and the third state III and the time of the second state II and the fourth state IV changes.

Hereinabove, the basic configuration of the switched capacitor converter 100 has been described. Next, the operation of the switched capacitor converter 100 will be described, but it is easier to understand when the number m of transistors is embodied. Therefore, hereinafter, the configuration and operation of the case of m=4, n=2, and k=1 will be described.

Figure 54:
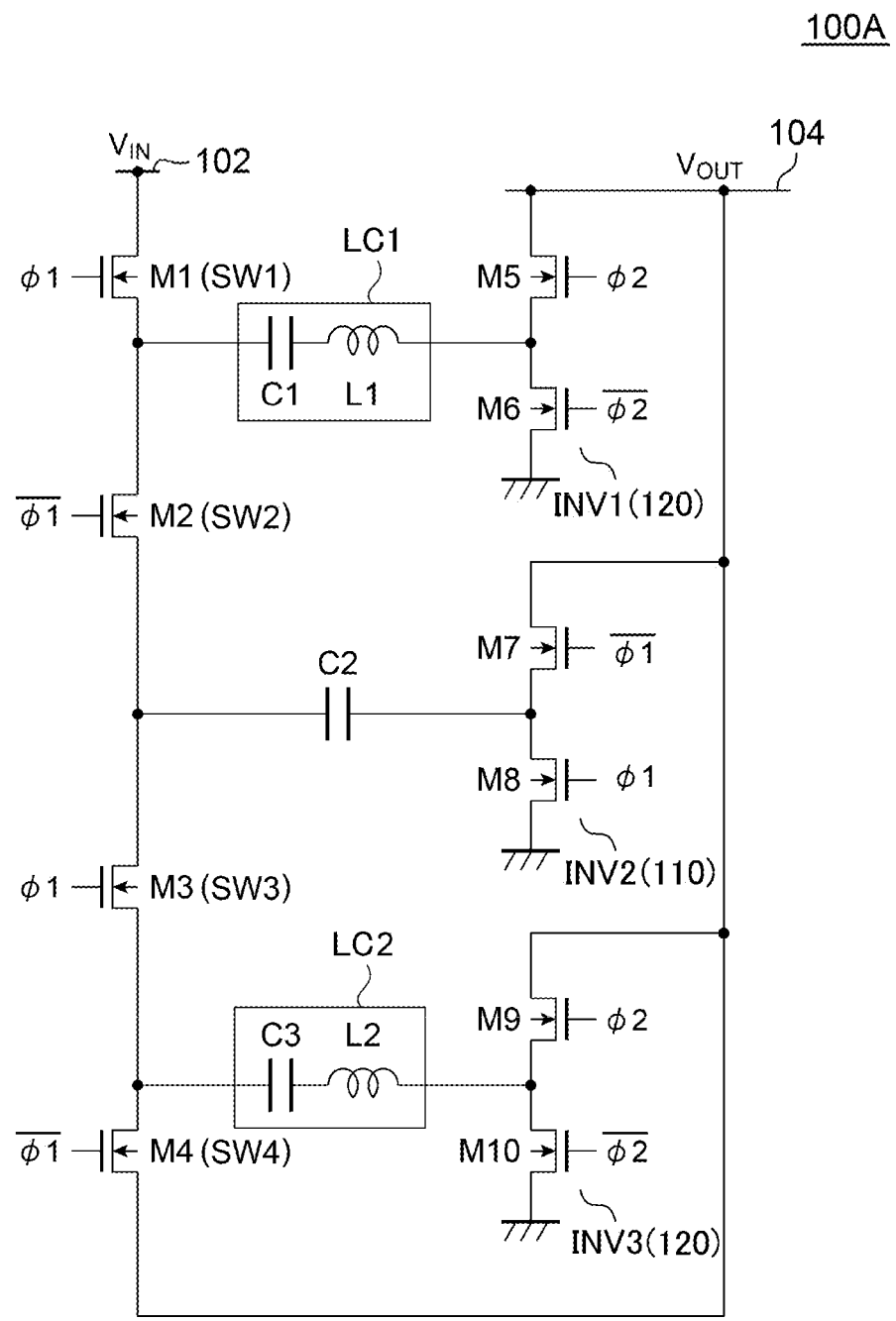
FIG. 54 is a circuit diagram of a switched capacitor converter according to an example.

FIG. 54 is a circuit diagram of a switched capacitor converter 100A according to an example. The controller IC 200 is omitted. The first transistor M1 to the fourth transistor M4 correspond to the first switch SW1 to the fourth switch SWm in FIG. 52.

The LC circuit LC1 includes a capacitor C1 and an inductor L1. The LC circuit LC2 includes a capacitor C3 and an inductor L2.

The first switching circuit 110 includes k (1) inverters INV2 corresponding to k (1) capacitors C2. The inverter INV2 includes a seventh transistor M7 that is a high-side transistor and an eighth transistor M8 that is a low-side transistor.

The second switching circuit 120 includes n (2) inverters INV1 and INV3 corresponding to n (2) LC circuits LC1 and LC2. The output node of the inverter INV1 is connected to the second end of the corresponding LC circuit LC1, and includes a fifth transistor M5 which is a high-side transistor and a sixth transistor M6 which is a low-side transistor. The output node of inverter INV3 is connected to the second end of the corresponding LC circuit LC2, and includes a ninth transistor M9 that is a high-side transistor and a tenth transistor M10 that is a low-side transistor.

The first transistor M1, the third transistor M3, and the eighth transistor M8 are turned on in the state φ1 and turned off in the state φ1B.

The second transistor M2, the fourth transistor M4, and the seventh transistor M7 are turned off in the state φ1 and turned on in the state φ1B.

The fifth transistor M5 and the ninth transistor M9 are turned on in the state φ2 and turned off in the state φ2B.

The sixth transistor M6 and the tenth transistor M10 are turned off in the state φ2 and turned on in the state φ2B.

Next, an operation of the switched capacitor converter 100A in FIG. 54 will be described.

Figure 55:
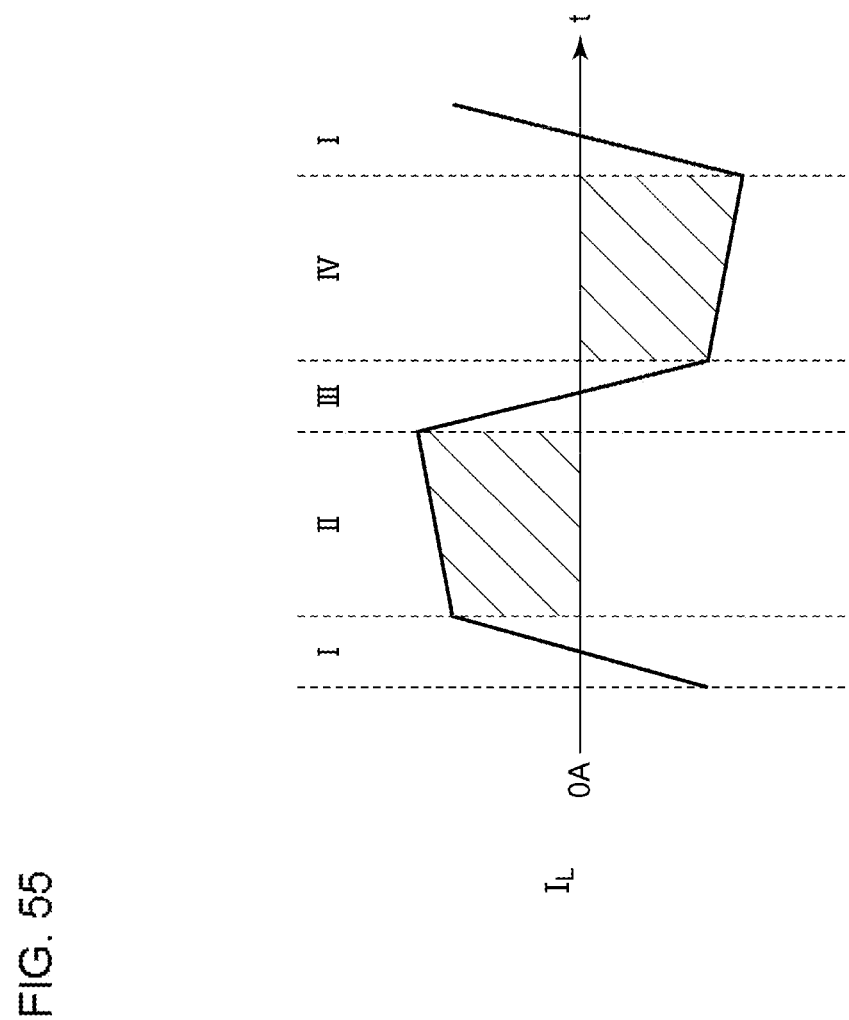
FIG. 55 is a waveform diagram of the coil current $I_L$ flowing through the inductor in the states I to IV.

FIG. 55 is a waveform diagram of the coil current $I_L$ flowing through the inductor in the states I to IV. It should be noted that the currents flowing through the plurality of inductors L1 and L2 are similar. In the first state I, the coil current $I_L$ increases, and in the third state III, the coil current $I_L$ decreases. In the second state II and the fourth state IV, since the voltage across the inductor is close to zero, the coil current $I_L$ hardly changes. As can be seen from the waveform of the coil current $I_L$, the switched capacitor converter 100 is not operating in the resonant state.

The first state I to the fourth state IV will be described in detail.

Figure 56:
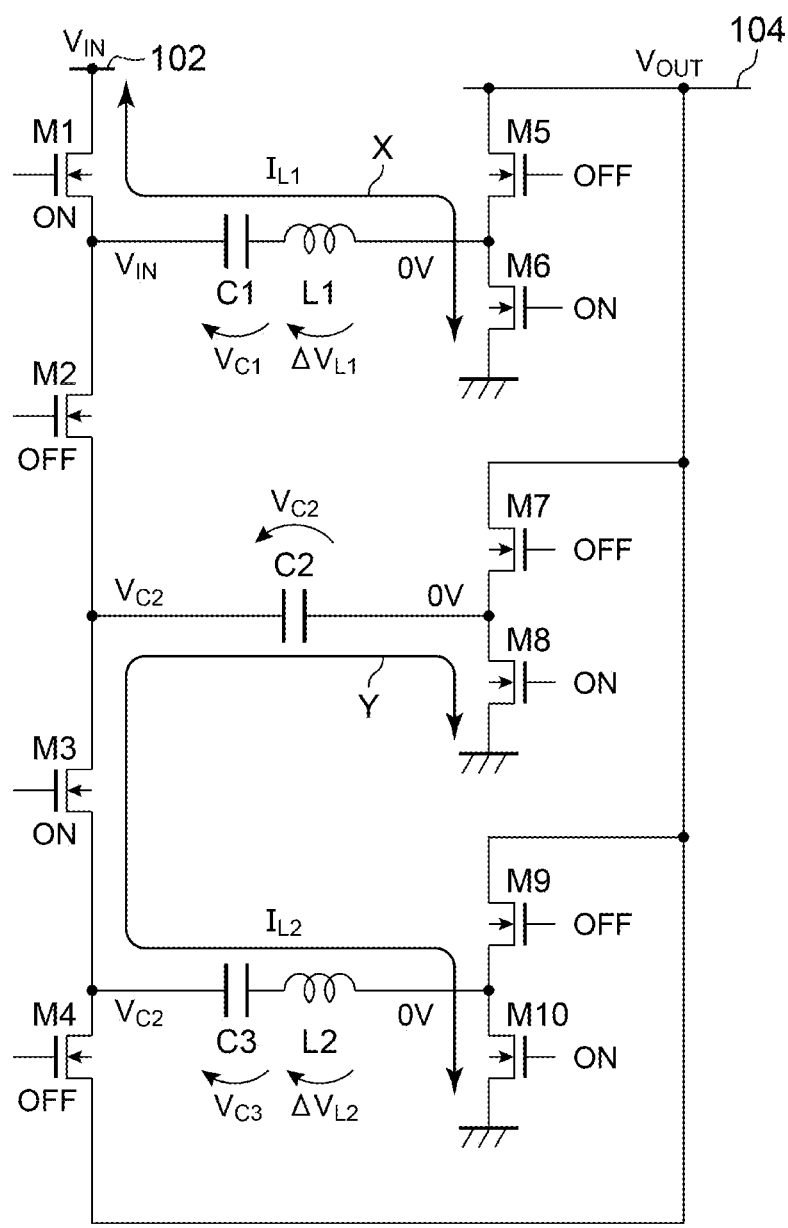
FIG. 56 is a diagram illustrating the first state I of the switched capacitor converter in FIG. 54.

FIG. 56 is a diagram illustrating the first state I of the switched capacitor converter 100A in FIG. 54. The coil current $I_{L1}$ flows through the path X, and the coil current $I_{L2}$ flows through the path Y.

Focusing on the first inductor L1, the voltage $\Delta V_{L1}$ across the first inductor L1 is expressed as $$\Delta V_{L1} = V_{IN} - V_{C1}.$$

When C1=C2=C3, the following relational expressions are established in the steady state.

$$V_{C1} = V_{IN} \times 3/4$$

$$V_{C2} = V_{IN} \times 2/4$$

$$V_{C3} = V_{IN} \times 1/4$$

$$V_{OUT} = V_{IN} \times 1/4$$

Then, in the first state I, the voltage $\Delta V_{L1}$ across the first inductor L1 is $$\Delta V_{L1} = V_{IN} - V_{C1} = V_{IN}/4,$$

and the coil current $I_L$ increases with the slope of $\Delta V_{L1}/L = V_{IN}/(4 \times L)$.

Focusing on the second inductor L2, the voltage $\Delta V_{L2}$ across the second inductor L2 is expressed as $\Delta V_{L2} = V_{C2} - V_{C3} = V_{IN}/4$. Therefore, the coil current $I_{L2}$ also increases with the slope of $\Delta V_{L2}/L = V_{IN}/(4 \times L)$.

The coil currents $I_{L1}$ and $I_{L2}$ are negative immediately after the transition to the first state I and increase with time and then become positive.

The currents $I_{L1}$ and $I_{L2}$ flowing in the first state I are not supplied to the load.

Figure 57:
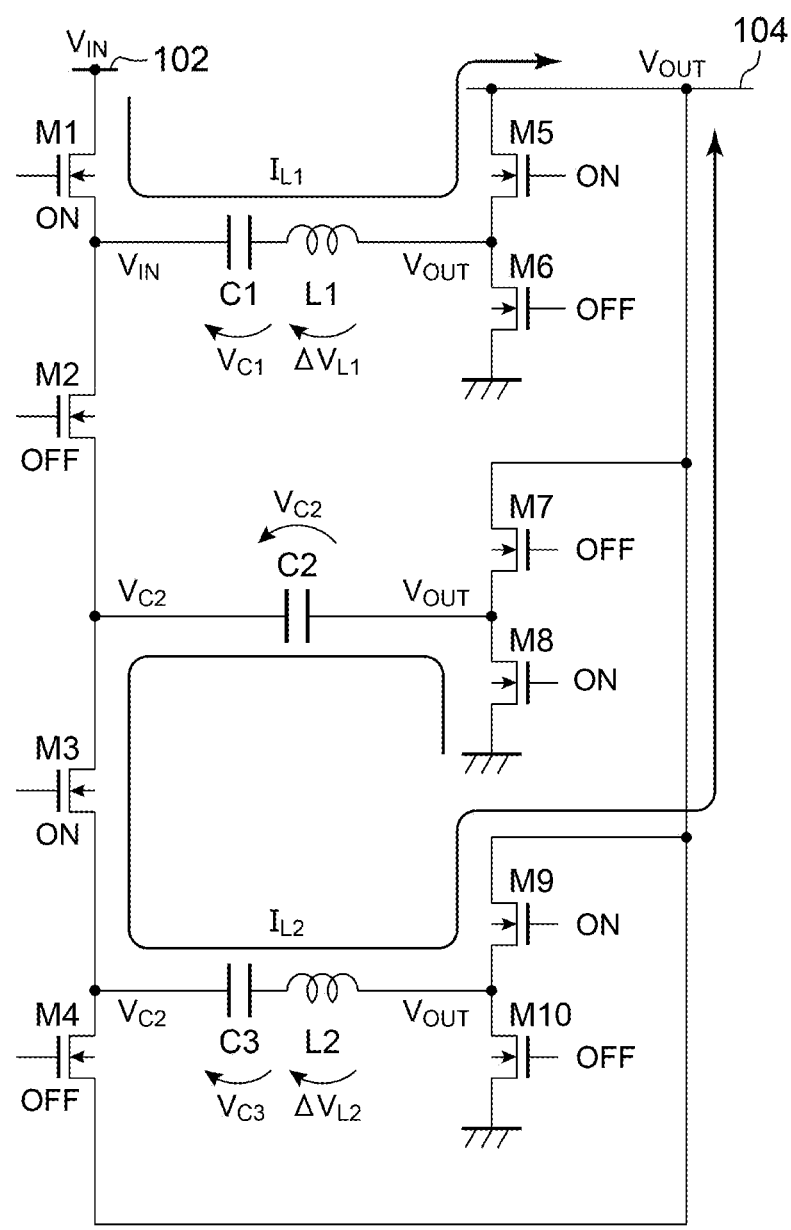
FIG. 57 is a diagram illustrating the second state II of the switched capacitor converter in FIG. 54.

FIG. 57 is a diagram illustrating the second state II of the switched capacitor converter 100A in FIG. 54.

Focusing on the first inductor L1, the voltage $\Delta V_{L1}$ across the first inductor L1 is $$\Delta V_{L1} = (V_{IN} - V_{C1}) V_{OUT} \approx 0 V.$$

Therefore, the coil current $I_{L1}$ does not change.

Focusing on the second inductor L2, the voltage $\Delta V_{L2}$ across the second inductor L2 is $$\Delta V_{L2} = (V_{C2} V_{C3}) V_{OUT} \approx 0 V.$$

Therefore, the coil current $I_{L2}$ does not change.

The currents $I_{L1}$ and $I_{L2}$ flowing in the second state II are supplied to the load.

Figure 58:
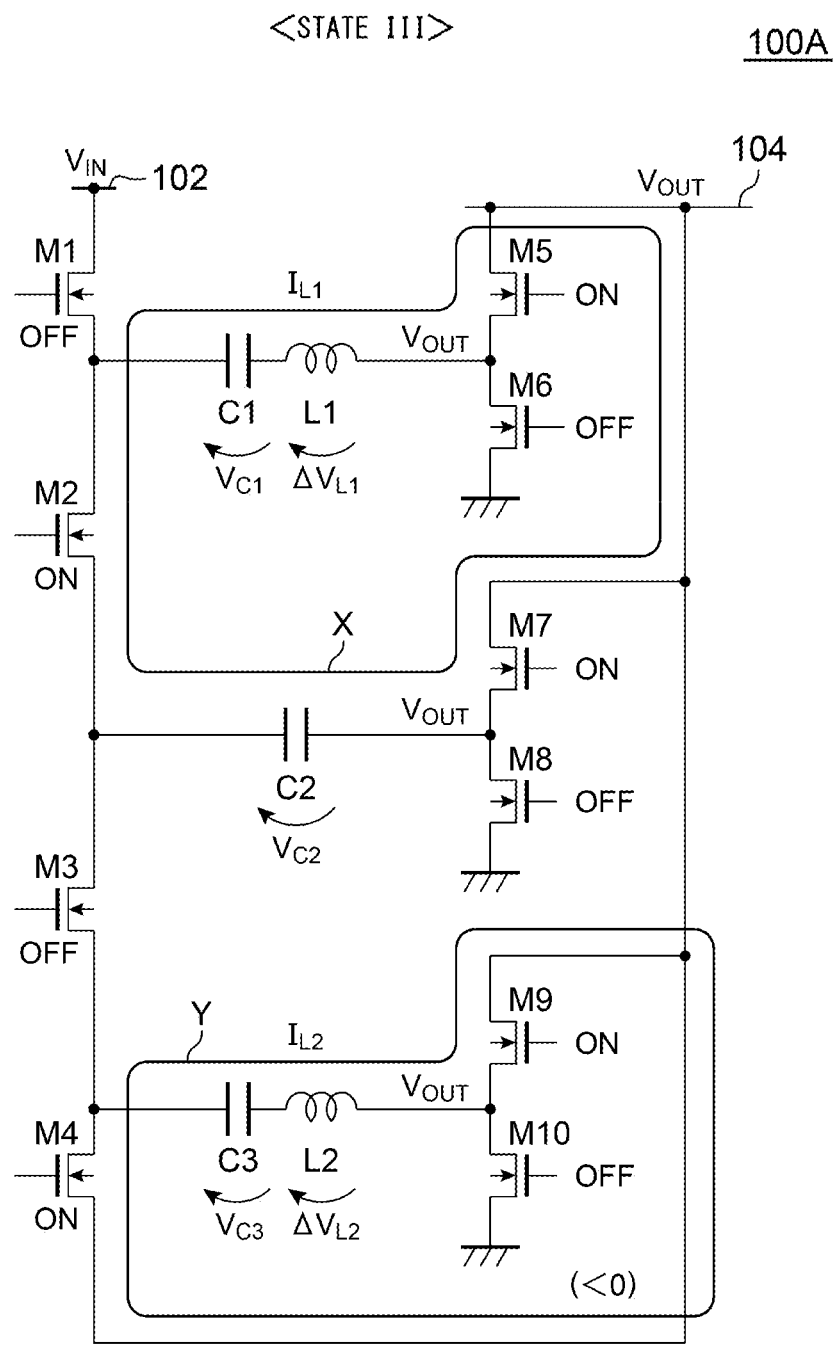
FIG. 58 is a diagram illustrating the third state III of the switched capacitor converter in FIG. 54.

FIG. 58 is a diagram illustrating the third state III of the switched capacitor converter 100A in FIG. 54. In the third state III, the voltage $\Delta V_{L1}$ across the first inductor L1 is $$\Delta V_{L1} = V_{C2} - V_{C1} = -V_{IN}/4,$$

and the coil current $I_L$ decreases with the slope of $\Delta V_{L1}/L = V_{IN}/(4 \times L)$.

Focusing on the second inductor L2, the voltage $\Delta V_{L2}$ across the second inductor L2 is $\Delta V_{L2} = -V_{C3} = -V_{IN}/4$. Therefore, the coil current $I_{L2}$ also decreases with the slope of $\Delta V_{L2}/L = V_{IN}/(4 \times L)$.

In the third state III, the coil current $I_{L1}$ flows to the loop X, and the current $I_{L2}$ flows to the loop Y. No current is supplied to the load.

Figure 59:
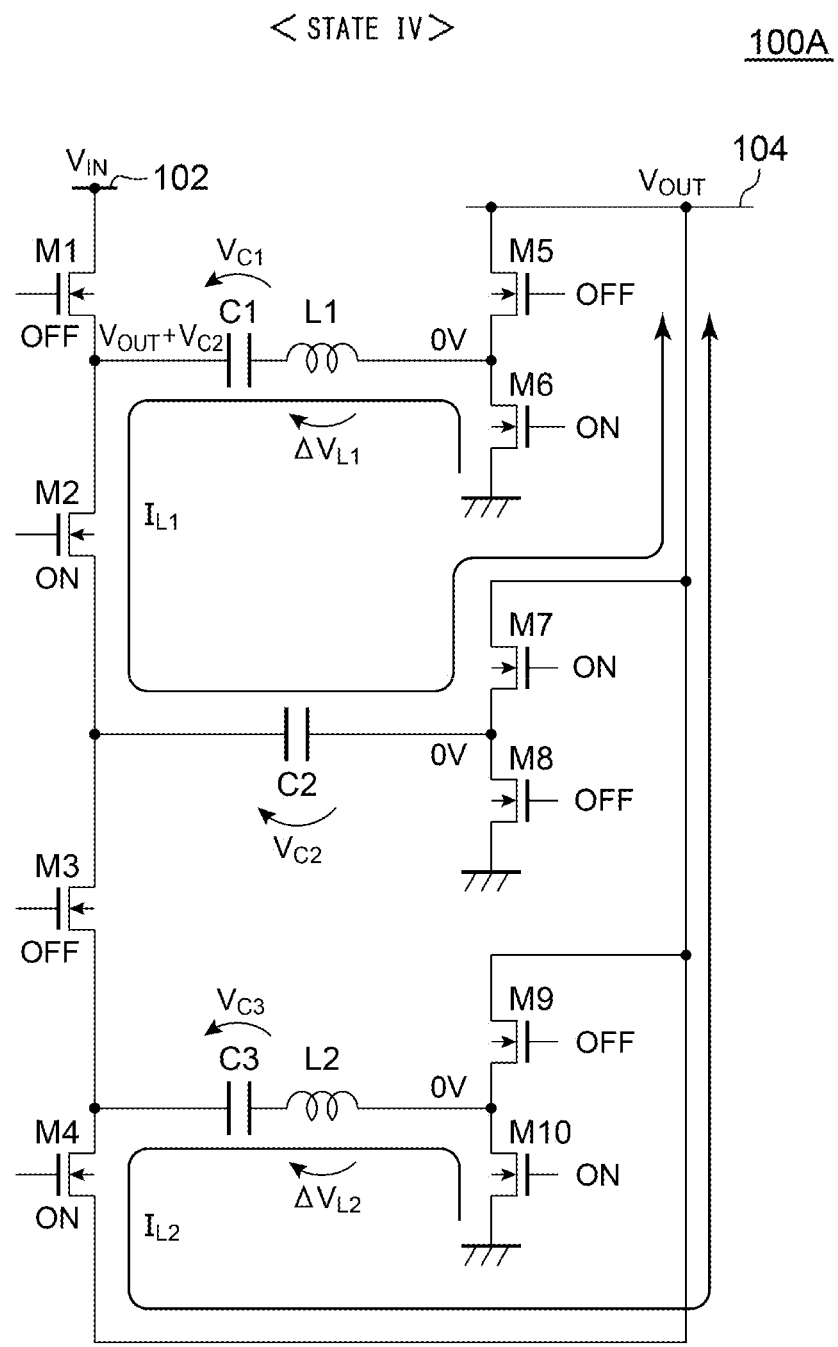
FIG. 59 is a diagram illustrating the fourth state IV of the switched capacitor converter in FIG. 54.

FIG. 59 is a diagram illustrating the fourth state IV of the switched capacitor converter 100A in FIG. 54.

Focusing on the first inductor L1, the voltage $\Delta V_{L1}$ across the first inductor L1 is $$\Delta V_{L1} = (V_{OUT} + V_{C2} V_{C1}) \approx 0.$$

Therefore, the coil current $I_{L1}$ does not change.

Focusing on the second inductor L2, the voltage $\Delta V_{L2}$ across the second inductor L2 is $$\Delta V_{L2} = (V_{OUT} V_{C3}) \approx 0 V.$$

Therefore, the coil current $I_{L2}$ does not change.

The currents $I_{L1}$ and $I_{L2}$ flowing in the fourth state IV are supplied to the load.

Referring to FIG. 55, the coil currents $I_{L1}$ and $I_{L2}$ flowing in the second state II and the fourth state IV, that is, hatched regions are supplied to the load as power.

The switched capacitor converter 100A operates as described above. According to the switched capacitor converter 100A, zero voltage switching can be realized, and efficiency can be improved.

Figure 60:
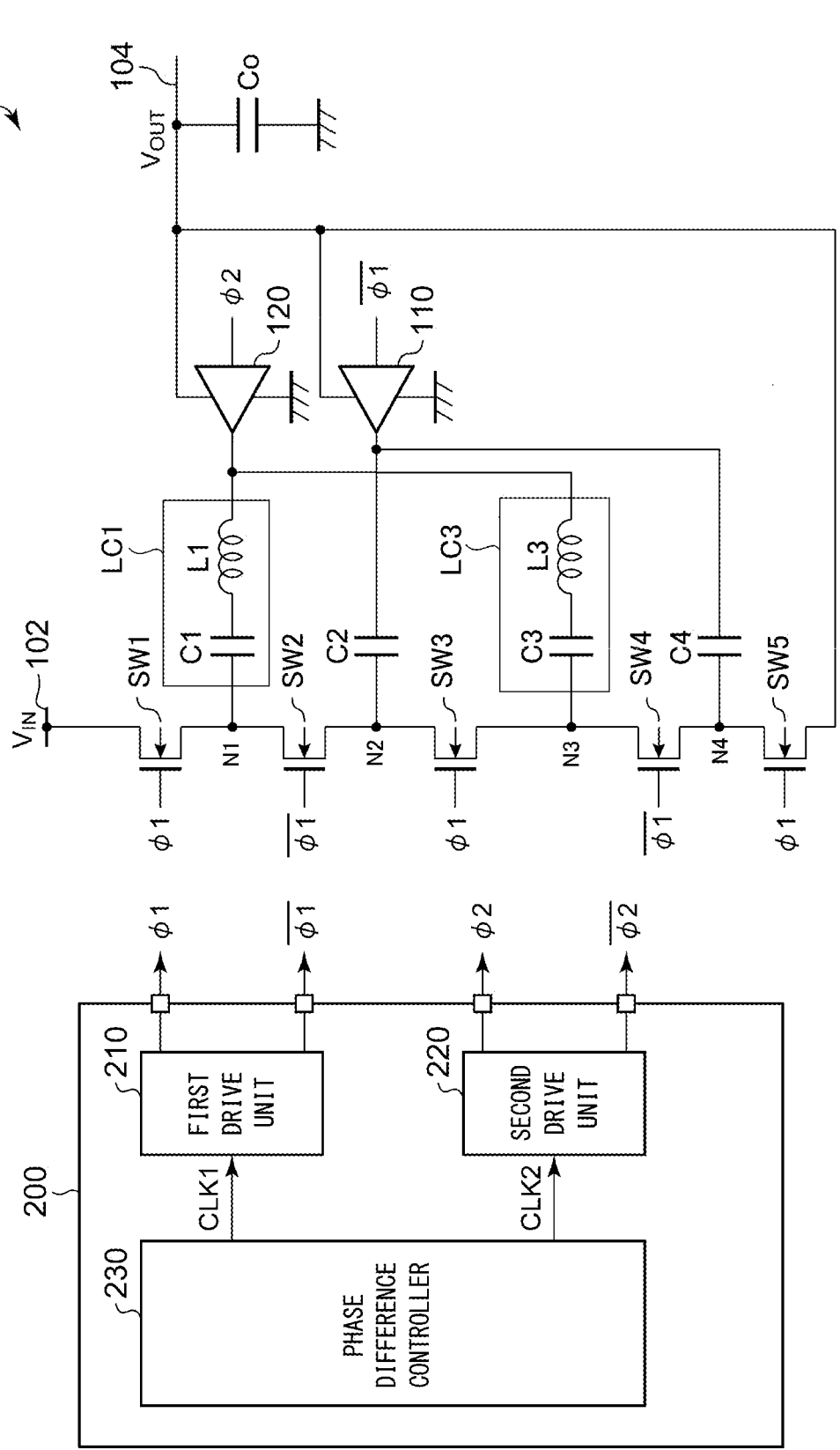
FIG. 60 is a circuit diagram of a switched capacitor converter according to an example.

FIG. 60 is a circuit diagram of a switched capacitor converter 100B according to an example. In this example, m=5, n=2, k=2, and the switched capacitor converter 100B includes the first switch SW1 to the fifth switch SW5, the LC circuits LC1 to LC2, the capacitors C2 and C4, the first switching circuit 110, and the second switching circuit 120.

The LC circuit LC1 includes a capacitor C1 and an inductor L1. The LC circuit LC2 includes a capacitor C3 and an inductor L2.

The first switching circuit 110 may include k (2) inverters corresponding to k (2) capacitors C2 and C4, similarly to the example of FIG. 54. Similarly, the second switching circuit 120 may include n (2) inverters corresponding to n (2) LC circuits LC1 and LC2.

Figure 61:
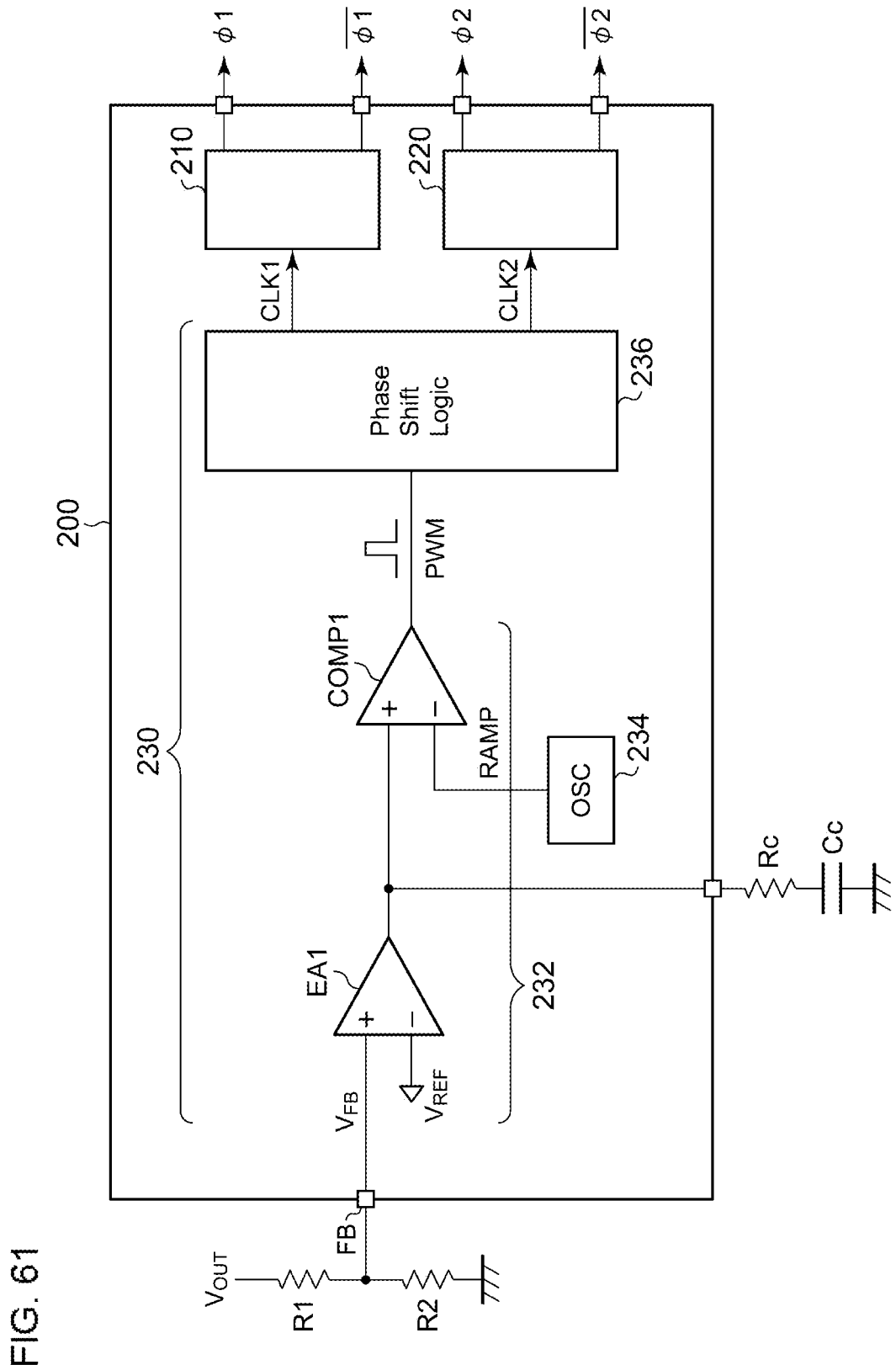
FIG. 61 is a circuit diagram illustrating a configuration example of the controller IC.

FIG. 61 is a circuit diagram illustrating a configuration example of the controller IC 200. The phase difference controller 230 feedback-controls the phase difference φd such that an error between an output of the switched capacitor converter 100 and a target state of the output approaches 0. In this example, the controller IC 200 performs constant voltage control to stabilize the output voltage $V_{OUT}$ to the target voltage $V_{OUT(REF)}$.

A feedback signal $V_{FB}$ indicating the output voltage $V_{OUT}$ is input to the feedback pin FB of the controller IC 200. For example, the feedback signal $V_{FB}$ is a voltage obtained by dividing the output voltage $V_{OUT}$ by the resistors R1 and R2.

The resistors R1 and R2 may be omitted, and the output voltage $V_{OUT}$ may be directly input to the feedback pin FB as the feedback signal $V_{FB}$.

The phase difference controller 230 feedback-controls the phase difference φd such that an error between feedback signal $V_{FB}$ indicating the output voltage $V_{OUT}$ of the switched capacitor converter 100 and the reference voltage $V_{REF}$ approaches 0.

The phase difference controller 230 includes a pulse width modulator 232, an oscillator 234, and a phase shift logic circuit 236. The oscillator 234 generates a clock signal CKL having a predetermined frequency. In addition, the oscillator 234 generates a ramp signal RAMP (triangular wave or sawtooth wave) having the same frequency as the clock signal CLK.

The pulse width modulator 232 generates a pulse width modulation signal (PWM signal) whose pulse width changes such that an error between the feedback signal $V_{FB}$ and the reference voltage $V_{REF}$ approaches 0. The pulse width modulator 232 includes, for example, an error amplifier EA1 and a PWM comparator COMP1. The error amplifier EA1 amplifies an error between the feedback signal $V_{FB}$ and the reference voltage $V_{REF}$. The resistor Rc and the capacitor Cc for phase compensation are connected to the output of the error amplifier EA1.

The PWM comparator COMP1 compares an output (error signal $V_{ERR}$) of the error amplifier EA1 with the ramp signal RAMP to generate a PWM signal.

The phase shift logic circuit 236 receives the PWM signal and the clock signal CLK and generates a first clock CLK1 and a second clock CLK2 having a phase difference corresponding to the pulse width of the pulse PWM signal.

Figure 62:
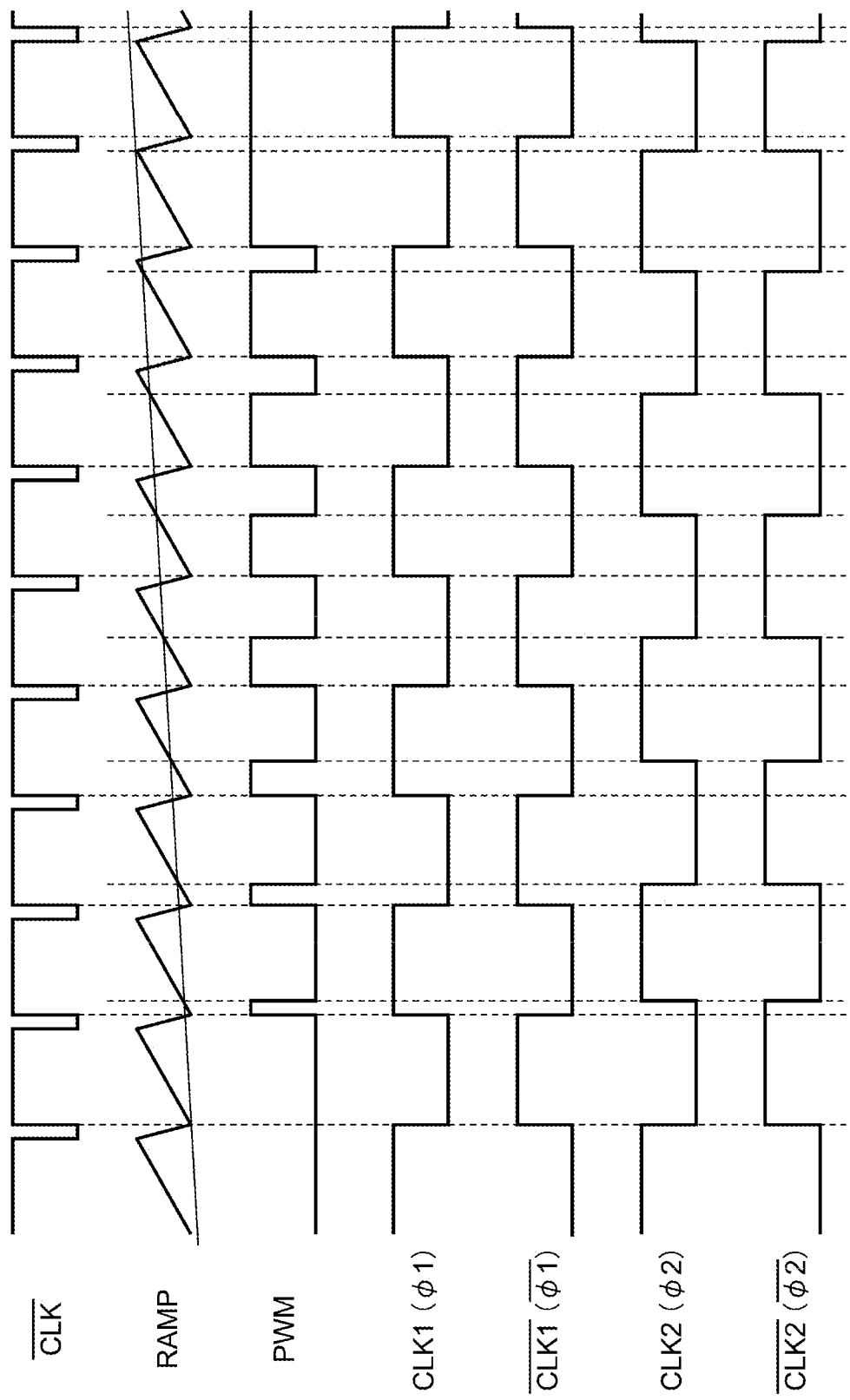
FIG. 62 is a time chart illustrating the operation of the controller of FIG. 61.

FIG. 62 is a time chart illustrating the operation of the controller IC 200 of FIG. 61. For example, the first clock CLK1 transitions from low to high and from high to low according to the positive edge of the PWM signal, and the second clock CLK2 transitions from high to low and from low to high according to the negative edge of the PWM signal. That is, the frequencies of the first clock CLK1 and the second clock CLK2 are ½ of the frequency of the clock CLK generated by the oscillator 234.

Application

Figure 63:
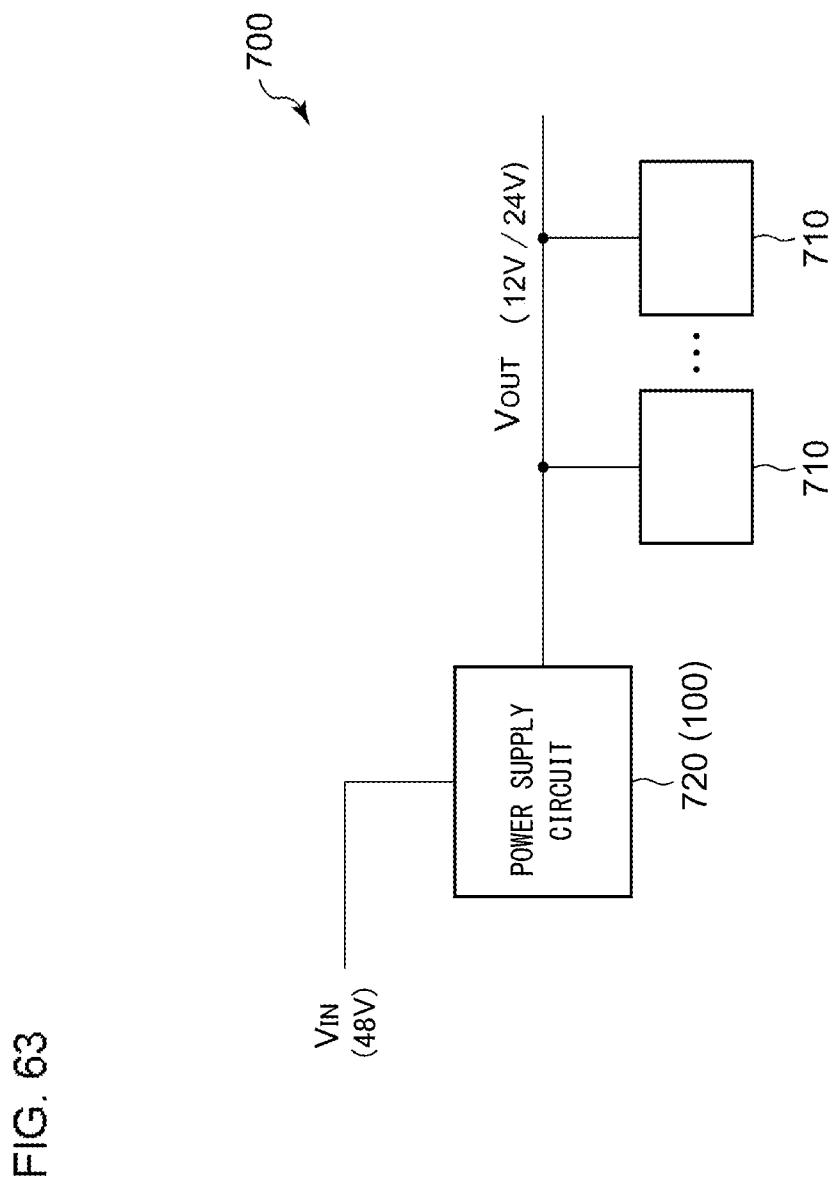
FIG. 63 is a view illustrating an example of an electronic device including the switched capacitor converter.

FIG. 63 is a view illustrating an example of an electronic device 700 including the switched capacitor converter 100. A preferred example of the electronic device 700 is a server. An internal circuit 710 is designed to operate at 12 V since a 12-V power line was originally drawn into the server. The internal circuit 710 may include a central processing unit (CPU), a memory, an interface circuit of a local area network (LAN), a DC/DC converter that steps down a voltage of 12 V, and the like.

In recent years, in order to reduce the current flowing through an electric wire, a movement to replace the bus voltage from 12 V to 48 V has been promoted. In this case, the power supply circuit 720 that steps down a power supply voltage of 48 V to 12 V is required. The above-described switched capacitor converter 100 having the gain of ¼ times can be suitably used for such a power supply circuit 720.

The electronic device 700 is not limited to the server, and may be an in-vehicle device. A battery of a conventional automobile is mainly 12 V or 24 V, but a 48-V system may be adopted in a hybrid vehicle, and in this case, a power supply circuit that converts a battery voltage of 48 V into 12 V or 24 V is also required. In such a case, the switched capacitor converter 100 of ½ times or ¼ times can be suitably used.

In addition, the electronic device 700 may be an industrial device, an OA device, or a consumer device such as an audio device.

APPENDIX

1. The technology related to Embodiment 1 and FIG. 1 to FIG. 13 can be understood as follows.

Item 1.1

A controller circuit for a resonant switched capacitor converter, the controller circuit comprising:

a frequency controller structured to control a switching frequency based on an output voltage of the resonant switched capacitor converter.

Item 1.2

The controller circuit according to Item 1.1 wherein the frequency controller controls the switching frequency such that the output voltage of the resonant switched capacitor converter approaches a maximum value.

Item 1.3

The controller circuit according to Item 1.1, wherein the frequency controller changes the switching frequency in a first direction in a next frequency control cycle when the output voltage of the resonant switched capacitor converter increases as a result of changing the switching frequency in the first direction, and changes the switching frequency in a second direction opposite to the first direction in a next frequency control cycle when the output voltage of the resonant switched capacitor converter decreases.

Item 1.4

The controller circuit according to Item 1.1, wherein the frequency controller changes the switching frequency in a region where the switching frequency is higher than a resonant frequency of the resonant switched capacitor converter.

Item 1.5

The controller circuit according to Item 1.4 wherein the frequency controller changes the switching frequency such that the output voltage of the resonant switched capacitor converter approaches a target voltage.

Item 1.6

The controller circuit according to any one of Items 1.1 to 1.4, which is integrally integrated on one semiconductor substrate.

Item 1.7

A resonant switched capacitor converter comprising the controller circuit according to any one of Items 1.1 to 1.6.

Item 1.8

An electronic device comprising the resonant switched capacitor converter according to Item 1.7.

Item 1.9

A method for controlling a resonant switched capacitor converter, the method comprising:

detecting an output voltage of the resonant switched capacitor converter; and changing a switching frequency based on the output voltage.

Item 1.10

The control method according to Item 1.9, wherein the changing of the switching frequency involves controlling the switching frequency such that the output voltage of the resonant switched capacitor converter approaches a maximum value.

Item 1.11

The control method according to Item 1.9, wherein, in the changing of the switching frequency, the switching frequency changes in a region where the switching frequency is higher than a resonant frequency of the resonant switched capacitor converter.

2. The technology related to Embodiment 2 and FIG. 14 to FIG. 28 can be understood as follows.

Item 2.1

A controller circuit for a resonant switched capacitor converter, the resonant switched capacitor converter including:
- a first switch and a second switch connected in series between an input line and an output line;
- a third switch and a fourth switch connected in series between the output line and a ground line; and
- a capacitor and an inductor connected in series across the second switch and the third switch, wherein
- in a first mode, the controller circuit sequentially repeats:
- a first state in which the first switch and the third switch are turned on and the second switch and the fourth switch are turned off;
- a second state in which the second switch and the fourth switch are turned on and the first switch and the third switch are turned off; and
- a third state in which the first switch, the second switch, the third switch, and the fourth switch are off.

Item 2.2

The controller circuit according to Item 2.1, wherein
in a second mode, the controller circuit sequentially repeats:
- a state in which the first switch and the fourth switch are turned on and the second switch and the third switch are turned off;
- a state in which the first switch and the third switch are turned on and the second switch and the fourth switch are turned off;
- a state in which the second switch and the third switch are turned on and the first switch and the fourth switch are turned off; and
- a state in which the second switch and the fourth switch are turned on and the first switch and the third switch are turned off.

Item 2.3

The controller circuit according to Item 2.2, wherein the controller circuit switches between the first mode and the second mode according to a state of a load.

Item 2.4

The controller circuit according to any one of Items 2.1 to 2.3, wherein the controller circuit transitions to the first mode when an output current of the resonant switched capacitor converter becomes 0.

Item 2.5

The controller circuit according to any one of Items 2.1 to 2.4, wherein the controller circuit transitions to the first state when an output voltage of the resonant switched capacitor converter drops to a threshold voltage in the third state during operation in the first mode.

Item 2.6

The controller circuit according to any one of Items 2.1 to 2.5, wherein a length of the first state is fixed during operation in the first mode.

Item 2.7

The controller circuit according to any one of Items 2.1 to 2.6, wherein the controller circuit transitions to the third state when the current of the inductor becomes 0 in the second state during operation in the first mode.

Item 2.8

The controller circuit according to any one of Items 2.1 to 2.7, which is integrally integrated on one semiconductor substrate.

Item 2.9

A resonant switched capacitor converter comprising the controller circuit according to any one of Items 2.1 to 2.8.

Item 2.10

An electronic device comprising the resonant switched capacitor converter according to Item 2.9.

Item 2.11

A method for controlling a resonant switched capacitor converter, the resonant switched capacitor converter including:
- a first switch and a second switch connected in series between an input line and an output line;
- a third switch and a fourth switch connected in series between the output line and a ground line; and
- a capacitor and an inductor connected in series across the second switch and the third switch, the control method sequentially repeats:
- a state in which the first switch and the third switch are turned on and the second switch and the fourth switch are turned off;
- a state in which the second switch and the fourth switch are turned on and the first switch and the third switch are turned off; and
- a state in which the first switch, the second switch, the third switch, and the fourth switch are turned off 3. The technology related to Embodiment 3 and FIG. 29 to FIG. 41 can be understood as follows.

Item 3.1

A controller circuit for a resonant switched capacitor converter, the controller circuit comprising:
- an oscillator structured to generate a clock signal;
- a drive circuit structured to drive a plurality of switches constituting a switch circuit of the resonant switched capacitor converter according to the clock signal; and
- an overcurrent protection circuit structured to change a frequency of the clock signal in a direction away from a resonant frequency when an overcurrent state of the resonant switched capacitor converter is detected.

Item 3.2

The controller circuit according to Item 3.1, further comprising a frequency controller structured to control an oscillation frequency of the oscillator based on an output voltage of the resonant switched capacitor converter in a steady state.

Item 3.3

The controller circuit according to Item 3.2, wherein the frequency controller controls an oscillation frequency of the oscillator such that the output voltage of the resonant switched capacitor converter approaches a maximum value in a steady state.

Item 3.4

The controller circuit according to Item 3.3, wherein the frequency controller changes the oscillation frequency of the oscillator in a first direction in a next frequency control cycle when the output voltage of the resonant switched capacitor converter increases as a result of changing the oscillation frequency of the oscillator in the first direction, and changes the oscillation frequency of the oscillator in a second direction opposite to the first direction in a next frequency control cycle when the output voltage of the resonant switched capacitor converter decreases.

Item 3.5
The controller circuit according to Item 3.2, wherein the frequency controller changes the oscillation frequency of the oscillator in a region where the oscillation frequency of the oscillator is higher than the resonant frequency of the resonant switched capacitor converter in a steady state.

Item 3.6
The controller circuit according to Item 3.5, wherein the frequency controller changes an oscillation frequency of the oscillator such that the output voltage of the resonant switched capacitor converter approaches a target voltage in a steady state.

Item 3.7
The controller circuit according to any one of Items 3.1 to 3.6, which is integrally integrated on one semiconductor substrate.

Item 3.8
A resonant switched capacitor converter comprising the controller circuit according to any one of Items 3.1 to 3.7.

Item 3.9
An electronic device comprising the resonant switched capacitor converter according to Item 3.8.

Item 3.10
A method for controlling a resonant switched capacitor converter, the method comprising:
  detecting an output current of the resonant switched capacitor converter; and
  changing a switching frequency of the resonant switched capacitor converter in a direction away from a resonant frequency when the output current exceeds a predetermined threshold.

4. The technology related to Embodiment 4 and FIG. 42 to FIG. 51 can be understood as follows.

Item 4.1
A controller circuit of a three-level converter, the three-level converter including:
  a first switch, a second switch, a third switch, and a fourth switch connected in series between an input line and a ground line;
  a capacitor connected across the second switch and the third switch; and
  an inductor connected between a connection node of the second switch and the third switch and an output line, wherein
  the controller circuit repeats:
  a first state in which the first switch and the second switch are turned on;
  a second state in which the first switch and the third switch are turned on;
  a third state in which the third switch and the fourth switch are turned on; and
  a fourth state in which the second switch and the fourth switch are turned on,
  in the order of the first state, the second state, the third state, the first state, the fourth state, and the third state.

Item 4.2
The controller circuit according to Item 4.1, wherein a time of the first state is equal to a time of the third state, and a time of the second state is equal to a time of the fourth state.

Item 4.3
The controller circuit according to Item 4.1 or 4.2, wherein the controller circuit is capable of controlling lengths of the first state and the third state according to a state of a load.

Item 4.4
The controller circuit according to any one of Items 4.1 to 4.3, further comprising a feedback controller structured to feedback-control at least the lengths of the first state and the third state so as to reduce an error between an output voltage generated in the output line and a target level.

Item 4.5
The controller circuit according to Item 4.4, wherein the feedback controller includes:
  an error amplifier structured to amplify an error between an output voltage generated in the output line and a target level;
  a pulse modulator structured to generate a pulse signal according to an output of the error amplifier; and
  a state control unit structured to switch the first state to the fourth state in response to the pulse signal.

Item 4.6
The controller circuit according to any one of Items 4.1 to 4.5, which is integrally integrated on one semiconductor substrate.

Item 4.7
A resonant switched capacitor converter comprising the controller circuit according to any one of Items 4.1 to 4.6.

Item 4.8
An electronic device comprising the resonant switched capacitor converter according to Item 4.7.

Item 4.9
A method for controlling a three-level converter, the three-level converter including:
  a first switch, a second switch, a third switch, and a fourth switch connected in series between an input line and a ground line;
  a capacitor connected across the second switch and the third switch; and
  an inductor connected between a connection node of the second switch and the third switch and an output line, wherein
  the control method sequentially repeats:
  a first state in which the first switch and the second switch are turned on;
  a second state in which the first switch and the third switch are turned on;
  a third state in which the third switch and the fourth switch are turned on;
  the first state;
  a fourth state in which the second switch and the fourth switch are turned on; and the third state.

Item 4.10
The control method according to Item 4.9, further comprising performing feedback control on at least lengths of the first state and the third state so as to reduce an error between an output voltage generated in the output line and a target level.

5. The technology related to Embodiment 5 and FIG. 52 to FIG. 63 can be understood as follows.

Item 5.1
A controller circuit for a switched capacitor converter, the switched capacitor converter including:
  an input line;
  an output line;
  a ground line;
  m (m≥3) switches connected in series between the input line and the output line;
  n (n≥2) LC circuits, each of the LC circuits including a capacitor and an inductor connected in series, a first end of each of the LC circuits being connected to an odd-numbered corresponding one of connection nodes of the m switches; and k (k≥1, k+n=m−1) capacitors, each first end of which is connected to an even-numbered corresponding one of connection nodes of them switches;

a first switching circuit structured to apply an output voltage of the output line or a ground voltage of the ground line to a second end of each of the k capacitors; and a second switching circuit structured to apply the output voltage or a ground voltage of the ground line to a second end of each of the n LC circuits, the controller circuit comprising:

a first drive unit structured to alternately switch, according to a first clock, between (i) a state in which an odd-numbered switch among the m switches is turned on and an even-numbered switch is turned off, and the first switching circuit applies the ground voltage, and (ii) a state in which an odd-numbered switch among the m switches is turned off, an even-numbered switch is turned on, and the first switching circuit applies the output voltage;

a second drive unit structured to alternately switch between a state in which the second switching circuit applies the output voltage and a state in which the second switching circuit applies the ground voltage according to a second clock; and a phase difference controller structured to control a phase difference between the first clock and the second clock.

Item 5.2

The controller circuit according to Item 5.1, wherein the phase difference controller feedback-controls the phase difference such that an error between a feedback signal and a reference signal corresponding to an output of the switched capacitor converter approaches 0.

Item 5.3

The controller circuit according to Item 5.2, wherein, the phase difference controller includes:

a pulse width modulator structured to generate a pulse width modulation signal whose pulse width changes such that the error between the feedback signal and the reference signal approaches zero; and a phase shift logic circuit structured to generate a first clock and a second clock having a phase difference corresponding to a pulse width of the pulse width modulation signal.

Item 5.4

The controller circuit according to any one of Items 5.1 to 5.3, wherein M=4.

Item 5.5

The controller circuit according to any one of Items 5.1 to 5.4, wherein the first switching circuit includes k first inverter circuits, and each of the k first inverter circuits includes:

an output node connected to the corresponding one of the second ends of the k capacitors;

a high-side transistor connected between the output node and the output line; and a low-side transistor connected between the output node and the ground line, the second switching circuit includes n second inverter circuits, and each of the n second inverter circuits includes:

an output node connected to the corresponding one of the second ends of the n LC circuits;

a high-side transistor connected between the output node and the output line; and a low-side transistor connected between the output node and the ground line.

Item 5.6

The controller circuit according to any one of Items 5.1 to 5.5, wherein the m switches are N-channel MOSFETs (Metal Oxide Semiconductor Field Effect Transistor).

Item 5.7

The controller circuit according to any one of Items 5.1 to 5.6, which is integrally integrated on one semiconductor substrate.

Item 5.8

A switched capacitor converter comprising the controller circuit according to any one of Items 5.1 to 5.7.

Item 5.9

A switched capacitor converter comprising:

an input line;

an output line;

a ground line;

a first transistor, a second transistor, a third transistor, and a fourth transistor connected in series between the input line and the output line;

a first capacitor and a first inductor connected in series between a connection node of the first transistor and the second transistor and a first switching node;

a second capacitor connected between a connection node of the second transistor and the third transistor and a second switching node;

a third capacitor and a second inductor connected in series between a connection node of the third transistor and the fourth transistor and a third switching node;

a fifth transistor connected between the output line and the first switching node; and a sixth transistor connected between the first switching node and the ground line;

a seventh transistor connected between the output line and the second switching node;

an eighth transistor connected between the second switching node and the ground line;

a ninth transistor connected between the output line and the third switching node;

a tenth transistor connected between the third switching node and the ground line;

a first drive unit structured to switch a set of the first transistor and the third transistor and a set of the second transistor and the fourth transistor in opposite phases;

a second drive unit structured to switch a set of the fifth transistor, the seventh transistor, and the ninth transistor and a set of the sixth transistor, the eighth transistor, and the tenth transistor in opposite phases; and a phase difference controller structured to control a phase difference of switching between the first drive unit and the second drive unit.

Item 5.10

The switched capacitor converter according to Item 5.9, wherein the phase difference controller feedback-controls the phase difference such that an error between an output of the switched capacitor converter and a target state of the output approaches 0.

Item 5.11

The switched capacitor converter according to Item 5.10, wherein the phase difference controller includes a pulse width modulator structured to generate a pulse width modulation signal whose pulse width changes such that the error between the output of the switched capacitor converter and a target state of the output approaches 0, and controls the phase difference according to the pulse width of the pulse width modulation signal.

Item 5.12

An electronic device comprising the switched capacitor converter according to any one of Items 5.8 to 5.11.

Item 5.13

A method for controlling a switched capacitor converter, the switched capacitor converter including:
- an input line;
- an output line;
- a ground line;
- m (m≥3) switches connected in series between the input line and the output line;
- n (n≥2) LC circuits, each of the LC circuits including a capacitor and an inductor connected in series, a first end of each of the LC circuits being connected to an odd-numbered corresponding one of connection nodes of the m switches;
- k (k≥1, k+n=m−1) capacitors, each first end of which is connected to an even-numbered corresponding one of connection nodes of them switches;
- a first switching circuit structured to apply an output voltage of the output line or a ground voltage of the ground line to a second end of each of the k capacitors; and
- a second switching circuit structured to apply the output voltage or a ground voltage of the ground line to a second end of each of the n LC circuits, the control method comprising:

alternately switching, according to a first clock, a state in which an odd-numbered switch among the m switches is turned on and an even-numbered switch is turned off, and the first switching circuit applies the ground voltage, and (ii) a state in which an odd-numbered switch among the m switches is turned off, an even-numbered switch is turned on, and the first switching circuit applies the output voltage;

alternately switching a state in which the second switching circuit applies the output voltage and a state in which the second switching circuit applies the ground voltage according to a second clock; and controlling a phase difference between the first clock and the second clock.

Item 5.14

The control method according to Item 5.13, wherein, in the controlling of the phase difference, the phase difference is feedback-controlled such that an error between an output of the switched capacitor converter and a target state of the output approaches 0.

The technologies according to some embodiments disclosed in the present specification can be arbitrarily combined as long as no collision or inconsistency occurs.

It is to be understood by those skilled in the art that the embodiments are exemplary, various modifications exist in combinations of each component and each processing process, and such modifications are also included in the present disclosure and may constitute the scope of the present invention.

What is claimed is:

1. A controller circuit for a resonant switched capacitor converter, the controller circuit comprising:
a frequency controller structured to control a switching frequency based on an output voltage of the resonant switched capacitor converter, wherein the frequency controller changes the switching frequency in a first direction in a next frequency control cycle when the output voltage of the resonant switched capacitor converter increases as a result of changing the switching frequency in the first direction, and changes the switching frequency in a second direction opposite to the first direction in a next frequency control cycle when the output voltage of the resonant switched capacitor converter decreases.

2. The controller circuit according to claim 1, wherein the frequency controller controls the switching frequency such that the output voltage of the resonant switched capacitor converter approaches a maximum value.

3. The controller circuit according to claim 1, wherein the frequency controller changes the switching frequency in a region where the switching frequency is higher than a resonant frequency of the resonant switched capacitor converter.

4. The controller circuit according to claim 3, wherein the frequency controller changes the switching frequency such that the output voltage of the resonant switched capacitor converter approaches a target voltage.

5. The controller circuit according to claim 1, wherein the controller circuit is integrally integrated on one semiconductor substrate.

* * * * *